US012783646B2

(12) United States Patent
Bai et al.

(10) Patent No.: US 12,783,646 B2
(45) Date of Patent: *Nov. 3, 2026

(54) MACHINE-LEARNING ASSISTED ADAPTIVE THRESHOLDING RECOMMENDATIONS IN INFORMATION TECHNOLOGY SERVICE INTELLIGENCE (ITSI)

(71) Applicant: Cisco Technology, Inc., San Jose, CA (US)

(72) Inventors: Houwu Bai, San Jose, CA (US); Kristal Curtis, San Francisco, CA (US); Isha Gandhi, New York, NY (US); Ankur Ashok Kath, San Francisco, CA (US); Everett Kotler, Alameda, CA (US); Joshua Mak, Daly City, CA (US); Om Rajyaguru, San Diego, CA (US); Matthew Scott, New York, NY (US); Vishwambhar Upadhyay, Fremont, CA (US); Vatsal Ashvinbhai Vora, Ahmedabad (IN)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/074,231

(22) Filed: Mar. 7, 2025

(65) Prior Publication Data

US 2026/0267965 A1 Sep. 10, 2026

(51) Int. Cl.
*G06F 21/55* (2013.01)
*G06F 11/32* (2006.01)

(52) U.S. Cl.
CPC .......... *G06F 21/552* (2013.01); *G06F 11/324* (2013.01); *G06F 2201/81* (2013.01); *G06F 2221/034* (2013.01)

(58) Field of Classification Search
CPC .. G06F 21/552; G06F 11/324; G06F 16/2477; G06F 16/258; G06F 16/24578; G06F 16/248
See application file for complete search history.

(56) References Cited

U.S. PATENT DOCUMENTS 7,937,344 B2 5/2011 Baum et al.
8,112,425 B2 2/2012 Baum et al.
(Continued)

FOREIGN PATENT DOCUMENTS

CN 112231531 A 1/2021
WO 2025019611 A1 1/2025

OTHER PUBLICATIONS

Boniol P., et al., "Dive into Time-Series Anomaly Detection: A Decade Review", arXiv:2412.20512v1 [cs.LG], Cornell University archive, Dec. 29, 2024, pp. 1-51.
(Continued)

*Primary Examiner* — Vance M Little
(74) *Attorney, Agent, or Firm* — Rutan & Tucker, LLP; Kyle M. St. James

(57) ABSTRACT

One implementation of the disclosure is directed to an Information Technology Service Intelligence (ITSI) that provides methods for automatically generating one or more severity level thresholds for a metric represented by a time-series data set through adaptive thresholding. One implementation may include operations to retrieve a historical time-series data set that represents a KPI or metric being monitored, perform an adaptive threshold generation process for the time-series data set that includes automatically selecting a seasonality pattern that corresponds to the time-series data set and determining a set of thresholds based thereon. Selecting a seasonality pattern may involve, for each candidate seasonality pattern, computing a silhouette score that indicates how closely a candidate seasonality
(Continued)

pattern corresponds to the time-series data set. Based on the selected seasonality pattern, a plurality of severity level thresholds may be determined using a statistical computation such as standard deviation, quantile, percentile, range, etc.

20 Claims, 27 Drawing Sheets

(56) References Cited

U.S. PATENT DOCUMENTS

| | | | | |
|---|---|---|---|---|
| 8,751,529 | B2 | 6/2014 | Zhang et al. | |
| 8,788,525 | B2 | 7/2014 | Neels et al. | |
| 9,215,240 | B2 | 12/2015 | Merza et al. | |
| 9,286,413 | B1 | 3/2016 | Coates et al. | |
| 10,127,258 | B2 | 11/2018 | Lamas et al. | |
| 11,082,439 | B2 | 8/2021 | Salunke et al. | |
| 12,373,466 | B2 | 7/2025 | Bai et al. | |
| 2016/0189186 | A1* | 6/2016 | Fabrikant | G06Q 30/0205 705/7.34 |
| 2017/0220938 | A1 | 8/2017 | Sainani et al. | |
| 2017/0364851 | A1 | 12/2017 | Maheshwari et al. | |
| 2019/0098106 | A1 | 3/2019 | Mungel et al. | |
| 2019/0163806 | A1 | 5/2019 | Bauer et al. | |
| 2020/0410009 | A1 | 12/2020 | Kolev et al. | |
| 2021/0042382 | A1 | 2/2021 | Freeman et al. | |
| 2021/0209625 | A1* | 7/2021 | Thomas | G06Q 30/0202 |
| 2025/0028618 | A1* | 1/2025 | Bai | G06F 11/3419 |
| 2025/0111256 | A1 | 4/2025 | Rosenoer | |

OTHER PUBLICATIONS

Splunk Enterprise 8.0.0 Overview, available online, retrieved May 20, 2020 from docs.splunk.com.

Splunk Cloud 8.0.2004 User Manual, available online, retrieved May 20, 2020 from docs.splunk.com.

Splunk Quick Reference Guide, updated 2019, available online at https://www.splunk.com/pdfs/solution-guides/splunk-quick-reference-guide.pdf, retrieved May 20, 2020.

Carraso, David, "Exploring Splunk," published by CITO Research, New York, NY, Apr. 2012.

Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.

International Search Report and Written Opinion for International Application No. PCT/US2026/018193, mailed Apr. 28, 2026, 13 Pages.

* cited by examiner

2000

MACHINE-LEARNING ASSISTED ADAPTIVE THRESHOLDING RECOMMENDATIONS IN INFORMATION TECHNOLOGY SERVICE INTELLIGENCE (ITSI)

RELATED APPLICATIONS

Any and all applications for which a foreign or domestic priority claim is identified in the Application Data Sheet as filed with the present application are incorporated by reference under 37 CFR 1.57 and made a part of this specification.

BACKGROUND

Currently, enterprises conduct entity and/or service monitoring operations by frequently or continuously tracking performance, availability, and security of entities deployed or services offered by the enterprise to ensure that business objectives and user expectations are met. This monitoring may involve the gathering of metrics that may be used to determine a health of a particular entity deployed or service offered by the enterprise or a series of related services.

As an illustrative example, monitoring may involve performance monitoring, where metrics associated with operability of certain entities or services are evaluated to ensure that the entity or service is running efficiently. Additionally, the monitoring may involve resource-based evaluations to confirm that resource(s) associated with a monitored entity or service is available, secure, compliant with local or governmental regulations, and utilized in an effective and efficient manner. Besides performance-based evaluations, monitoring is conducted to track metrics that directly impact user satisfaction, such as delays and service reliability for example, to ensure a positive user experience. Hence, performance monitoring assists enterprises in maintaining robust, secure and efficient services that enable continued growth and stability for the enterprise.

BRIEF DESCRIPTION OF THE DRAWINGS

Illustrative examples are described in detail below with reference to the following figures.

DETAILED DESCRIPTION

Figure 1:
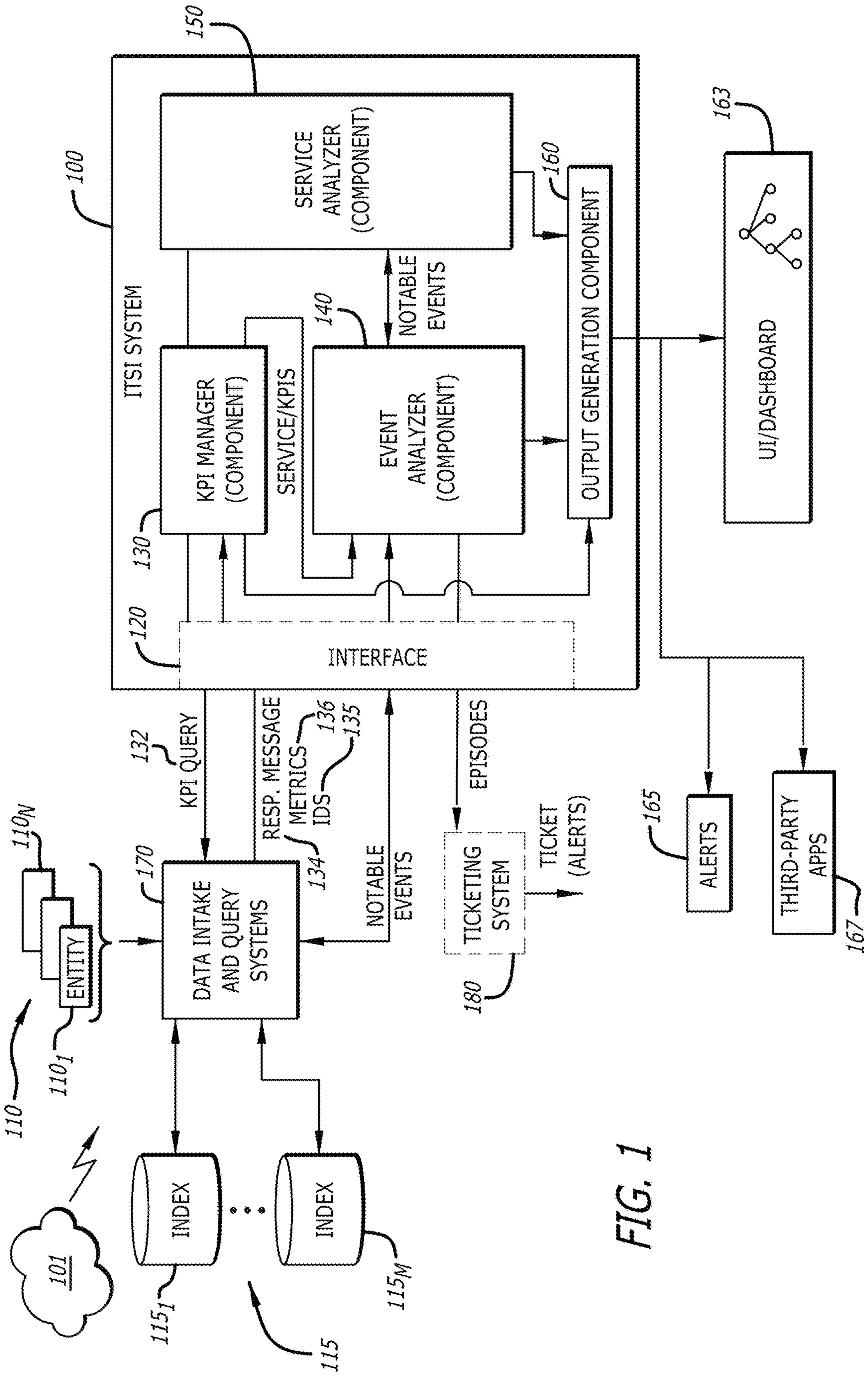
FIG. 1 a diagram of a network environment including an Information Technology Service Intelligence (ITSI) system, and a data intake and query system according to some examples.

Service monitoring for organizations is a complex and multi-faceted process that is aimed to ensure optimal performance and reliability. Conventional service monitoring software often provides an information technology (IT) administrator with limited visibility of the entire service framework for an organization, which may involve thousands of services. As a result, in many cases, administrators tend to experience difficulties in identifying and diagnosing (i.e., troubleshooting) service-related issues in real time. Also, as organizations further grow and the network environments become more complex, conventional service monitoring software will be unable to scale effectively, which may cause performance bottlenecks and missed alerts.

More specifically, monitoring key performance indicators (KPIs) of a computer or network system provides valuable insight into the health and behavior of the computer, network component, or network system, each an entity. However, determining normal behavior for a single entity is difficult given the multitude of variables such as functionality, operability, user characteristics, hardware capabilities, etc. Thus, static thresholding across all entities is unreasonable and would result in many false positives and/or false negatives. Beyond variations in the behavior of each entity, variations exist typically in how each entity behaves over time according to seasonal factors such as the time of year, day of week, hour of day, etc.

These challenges underscore the need for more advanced, integrated monitoring solutions leveraging machine-learning based (ML-based) logic to provide comprehensive visibility and proactive insights into the services offered by an organization.

One implementation of the disclosure is directed to an Information Technology Service Intelligence (ITSI) that provides methods for automatically generating one or more severity level thresholds for a metric represented by a time-series data set through adaptive thresholding. In some implementations, the systems and methods perform operations to retrieve a historical time-series data set that represents a KPI or metric being monitored, perform an adaptive threshold generation process for the time-series data set that includes automatically detecting a seasonality pattern and determining a set of thresholds based on the seasonality pattern. As discussed in further detail below, a seasonality pattern may be selected from a plurality of candidate seasonality patterns. Detection of a seasonality pattern that most closely corresponds to the time-series data set may involve, for each candidate seasonality pattern, partitioning the time-series data set into subsequences (blocks of time) in accordance with the candidate seasonality pattern, clustering the subsequences (and the data points within each subsequences), and computing a silhouette score for the that indicates a quality of clustering, which in turn may be used as an indication of how closely a candidate seasonality pattern corresponds to the time-series data set, where a higher the silhouette score indicates a higher likelihood that the candidate seasonality pattern most closely corresponds to the time-series data set. Thus, a candidate seasonality pattern having a highest silhouette score among the candidate of seasonality patterns may be selected as the seasonality pattern corresponding to the time-series data set. Based on the seasonality pattern, a plurality of severity level thresholds may be determined using a statistical computation such as standard deviation, quantile, percentile, range, etc.

Techniques described herein provide methods for improving threshold generation for metrics and KPIs. As the number of entities within a network environment continues to rapidly increase, the number of metrics and KPIs to monitor increases at a greater rate. As discussed throughout the disclosure, determining appropriate thresholds for each metric and KPI that accurately generate alerts according to anomalous behavior or further according to various severity levels is not feasible without automation. One technique described below describes the automation of generating adaptive thresholds for a time-series data set based on selection of a seasonality pattern corresponding to the time-series data set using machine-learning to cluster subsequences of the time-series partitioned according to the seasonality pattern. A technical benefit of such a technique is the automated nature of such generation making the entire process feasible, and optionally, on an iterative basis, e.g., daily, which enables the thresholding process to adapt to changes in the times-series over time. These and other technical benefits of the techniques disclosed herein will be evident from the discussion of the example implementations that follow. Techniques disclosed herein improve the accuracy of the automated generation of thresholds for monitoring metrics and KPIs, which reduces alert fatigue by reducing the number of false positives and provides a more scalable approach to threshold configuration and management.

I. Terminology

In the following description, certain terminology is used to describe aspects within the disclosure. For example, in certain situations, the terms "logic" and "component" are representative of hardware, firmware, or software that is configured to perform one or more functions. As hardware, logic (or component) may include circuitry having data processing or storage functionality. Examples of such circuitry may include, but are not limited or restricted to, one or more hardware processors (e.g., a microprocessor with one or more processor cores, a digital signal processor, a programmable gate array, a microcontroller, an application specific integrated circuit "ASIC," etc.), a semiconductor memory, or combinatorial elements.

Alternatively, logic (or component) may be software, such as executable code in the form of an executable application, a graphical user interface (GUI), an Application Programming Interface (API), a subroutine, a function, a procedure, an applet, a servlet, a routine, source code, object code, a shared library/dynamic library, or one or more instructions. The software may be stored in any type of a suitable non-transitory storage medium or transitory storage medium (e.g., electrical, optical, acoustical, or other forms of propagated signals such as carrier waves, infrared signals, or digital signals). Examples of the non-transitory storage medium may include, but are not limited or restricted to, a programmable circuit; semiconductor memory; non-persistent storage such as volatile memory (e.g., any type of random access memory "RAM"); or persistent storage such as non-volatile memory (e.g., read-only memory "ROM,"

power-backed RAM, flash memory, phase-change memory, etc.), a solid-state drive, hard disk drive, an optical disc drive, or a portable memory device.

A "computing device" may be generally construed as electronics with data processing capability and/or a capability of connecting to any type of network, such as a public network (e.g., Internet), a private network (e.g., a wireless data telecommunication network, a local area network "LAN," etc.), or a combination of networks. Examples of a computing device may include, but are not limited or restricted to, the following: a server, an endpoint device (e.g., a laptop, a smartphone, a tablet, a desktop computer, a netbook, networked wearable, or any general-purpose or special-purpose, user-controlled electronic device); a mainframe; a router; or the like.

A "message" generally refers to information transmitted in one or more electrical signals that collectively represent electrically stored data in a prescribed format. Each message may be an exchange of data over a wired or wireless communication path, such as one or more packets, frames, HTTP-based transmissions, or any other series of bits having the prescribed format.

As described herein, an "entity" is a component in a network environment. For example, an entity may constitute a physical network resource that provides a particular service, but can also be a cloud or virtual resource, application, user, or the like. Examples of entities may include, but are not limited or restricted to a host machine, a virtual machine, a switch, a firewall, a router, storage system, a sensor, a web server operating on one or more host machines to provide a web hosting service, an operating system (OS) or OS process, a software application, and/or a software instance.

A "service" is a set of interconnected components (e.g., applications, host machines, etc.), which are configured to offer a specific service to an organization. Services can be internal (e.g., an enterprise email system) or customer facing (e.g., organization website). Stated differently, a service involves a logical mapping of physical or logical resources directed to an operation conducted by an enterprise. For example, a service can be any of the following: (i) an application or group of applications; (ii) an infrastructure tier such as a web database or network tier; (iii) a business service such as online store; and/or (iv) a single process such as instance of an application running on a host. Some services may have dependencies on other services. The health of the service may be monitored, in part, through key performance indicators (KPIs) to ensure that operations associated with the service are operating as expected (normal state) and not in a degraded state.

The term "KPI" (key performance indicator) is a reoccurring save search, which returns a value of a metrics (KPI value), such as central processing unit (CPU) load percentage, user count, revenue trends, sales, response time, or the like. A KPI is used to monitor the health of a service. KPIs may be created by an administrator or pre-configured for specific service types, where the search query is generated to recover the underlying data associated with that KPI.

The term "metric" refers to a measurable value such as raw performance: input/output operations per second, CPU load, or memory utilization to provide a few examples. A KPI serves to provide a meaning to a metric, which typically involves the attachment of one or more thresholds to the metric. For example, a CPU load of 80% may be flagged as a critically high number, which is determined through comparison of the metric CPU load to one or more thresholds. A metric may be derived for a particular entity, e.g., CPU load of a particular CPU. Additionally, a metric for a plurality of entities may be aggregated ("aggregate entity metric") and a KPI may be derived from the aggregate entity metric ("aggregate entity KPI"). An example of an aggregate entity metric may be a statistical function applied to the CPU load of a plurality of CPUs, such as an average taken for the CPU load across the plurality of CPUs at a particular point in time. The aggregate entity metric measuring the average CPU load across the plurality of CPUs may be compared to one or more thresholds, which derives an aggregate entity KPI that indicates a severity level for the aggregate entity metric of CPU load as normal, high, critical, etc.

The term "seasonality pattern" generally refers to a set of parameters corresponding to values of data points comprising a time-series data set indicating an expected pattern of the values of the data points.

The term "computerized" generally represents that any corresponding operations are conducted by hardware in combination with software and/or firmware. The character set "(s)" denotes one or more items. For example, the term "component(s)" denotes one or more components. The term "processor(s)" denotes one or more processors.

Lastly, the terms "or" and "and/or" as used herein are to be interpreted as inclusive or meaning any one or any combination. Therefore, "A, B, or C" or "A, B, and/or C" mean "any of the following: A; B; C; A and B; A and C; B and C; A, B, and C." An exception to this definition will occur only when a combination of elements, functions, steps, or acts are in some way inherently mutually exclusive.

II. Threshold Recommendation Through Adaptive Threshold Generation

Referring now to FIG. 1, a diagram of a network environment including an Information Technology Service Intelligence (ITSI) system, and a data intake and query system is shown according to some examples. The network environment is provided with an ITSI system 100 configured to conduct analytics on services to support one or more entities 1101-110, (and may be referred to collectively or individually as, "the entities 110" or "an entity 110," respectively) and provide visualization on the health of such services is shown. In general, the ITSI system 100 features analytic and Information Technology (IT) management software that assists administrators in predicting incidents associated with entities or services provided by an enterprise in order to identify and remediate such incidents, which may occur even before customers are impacted. In some implementations, predictive analytics may be utilized to identify incidents prior to occurrence enabling the resolution of an issue within or affecting the network environment to prevent an incident from occurring. The ITSI system 100 may be configured to correlate data collected from monitoring sources and delivers a single, real-time view of relevant services reducing the alert noise and proactively preventing outages. In some implementations, delivering of the view of relevant services may involve machine learning techniques.

Herein, the ITSI system 100 features an interface 120, a KPI management component (hereinafter, "KPI manager") 130, an event analytics component 140 (hereinafter, "event analyzer"), a service analyzer component 150 (hereinafter, "service analyzer"), and an output generation component 160. The ITSI system 100 is communicatively coupled to a data intake inquiry system 170 that receives and ingests data from entities 1101-110N and stores the data into selected indices 1151-115M. Further discussion of the data intake inquiry system may be found below with reference to at least FIG. 22.

Each entity 110 broadly represents a distinct source of data that can be consumed by the data intake and query system 170. The entities 110 may be positioned within the same geographic area or within different geographic areas such as different regions of a public cloud network. As noted above, examples of entities 110 may include, without limitation or restriction, a host machine, a virtual machine, a CPU, a switch, a firewall, a router, storage system, a sensor, a web server operating on one or more host machines to provide a web hosting service, an OS or OS process, a software application, and/or a software instance. Each entity generates measurable values that when coupled with a timestamp and are collected over time result in a time series data set of the particular metric for a particular entity. Herein, according to one implementation of the disclosure, the entities 110 provide streaming data (also referred to as a "data stream") to the intake system 170 via the network 101, where the data stream may be time-series data and be processed by network components such as the ITSI system 100.

The KPI manager 130 is configured to generate KPI query messages 132, which may be initiated aperiodically or periodically in accordance with a scheduled routine. The KPI query messages 132 are intended to obtain ascertain metrics from one or more targeted entities 1101-110N. Responsive to a KPI query message 132, a targeted entity 1101 may be configured to provide a KPI response message 134, which includes an identifier 135 of the targeted entity 110; and one or more metrics 136 as requested by the KPI query message 132. The identifier 135 and performance metric(s) 136 may be used to generate KPIs associated with the entity along with service KPIs that may include KPIs from entities associated with that service along with KPIs associated with entities pertaining to another service.

The event analyzer 140 is configured to ingest events from across the network environment and for other monitoring sources to provide a unified operational console for all events and service-impacted issues. The events event analyzer 140 is configured to handle a large number of events concurrently received by the ITSI system 100. Given that some of these events might be related to each other, the event analyzer 140 is configured to generate one or more episodes by grouping related, notable events grouped together based on a set of aggregation policies (e.g., predefined rules) to assist in identifying problems associated with those events from which alerts are generated. The alerts are provided to a ticketing system from which administrators are notified of degraded services that need remediation.

For the event analyzer 140, an episode may represent a group of events occurring as part of a larger sequence or occurring as part of an incident or period of time. The aggregation policies enable the ITSI system 100 to focus on key event groups and perform actions based on certain triggered conditions, such as consolidated duplicative events, suppressing alerts, closing episodes when a clearing event is received, and the like.

As still shown in FIG. 1, the service analyzer 150 is configured to monitor and visualize the health of the enterprise searches based on the KPIs computed by the KPI manager 120. More specifically, the service analyzer 150 offers two comprehensive visualizations (tile-based and node-based) of the monitored services, where each service is assigned an overall service health score (ranging from 0-100 for example). Herein, as described below, the overall service health score is based on the severity levels of the KPIS associated with that service and dependency services along with an importance value assigned to each of these KPIs. The service analyzer 140 is further configured to enable an administrator to filter services and KPIs based on various criteria, such as severity health score level, service depth (level of dependency), and the like.

The output generation component 160 is communicatively coupled to the event analyzer 140 to receive graphical representations associated with the services pertaining to episodes under review. The output generation component 160 is further communicatively coupled to the service analyzer 150 to render those services in a tile-based graphical representation or a node-based graphical representation based on selection by the user, as shown in the representation 190. The output generation component 160 may be configured to provide a dashboard or other interface 163 and/or an alert 165. The ITSI system 100 may also be configured to provide instructions to one or more third-party applications ("apps") 167 to take specific, automated action.

The components present within the network environment of FIG. 1 may be communicatively coupled via network(s) 101. The network(s) 101 may correspond to a single network or span a plurality of different networks. Further, when representative of a plurality of different networks, the network(s) 101 may be implemented as private and/or public networks, one or more LANs, WANs, BLUETOOTH®, cellular networks, intranetworks, and/or internetworks using any of wired, wireless, terrestrial microwave, satellite links, etc., and may include the internet Referring now to FIG. 2, a block diagram illustrating an example operational flow of information between logic components within the KPI management logic 130 is shown according to some examples. The KPI management logic (KPI manager) 130 may be configured to (i) transmit KPI queries 132 to the data intake and query system 170, (ii) receive response messages 134 from the data intake and query system 170, and (ii) facilitate processing of metrics 136 by communicating the metrics 136 and corresponding entity IDs 135 to a threshold management logic 230 and/or a service generation logic 220. In addition to the service generation logic 220 and the threshold management logic 230, the KPI manager 130 is shown to include a threshold data store 235 and a KPI data state 240, which is configured to store historical metrics 242, entity-KPI mappings 244, and service-KPI mappings 246.

As will be discussed below in further detail, the threshold management logic 230 is configured to receive entity IDs 135 and metrics 136 from the KPI generation logic 210 and generate and/or monitor thresholds associated with metrics and/or KPIs. For instance, the threshold management logic 230 may be configured to generate a set of thresholds for a new entity 110 deployed within the network environment of FIG. 1, a KPI associated with a newly defined service, etc., or update previously generated thresholds. In some implementations, the threshold management logic 230 may receive metrics 136 for an entity and at a regular interval, such as on a daily basis, process metrics for the entity that include metrics over an extended time period such as a week or month. The time period may a rolling time period such that update includes the last 30 days or last 7 days, for example. As a result, each update serves to adapt to current metrics of the entity. A similar methodology may be deployed with KPIs and/or aggregates of a particular performance metric generated by a plurality of entities (e.g., for an aggregate entity metric).

The threshold management logic 230 may perform the generation or updating of thresholds for a metric of an entity, a KPI, an aggregate entity metric, etc., by querying the KPI data store 240 with a query 202 that includes an identifier that identifies the metric or KPI for which the thresholds will be generated or updated. The threshold management logic 230 may receive a query result 204 that includes metrics such as historical metrics corresponding to the metric and/or metrics associated with the KPI identified in the query 202.

Further, the threshold management logic 230 may determine a severity level for a particular metric or KPI based on the metrics 136 received from the KPI generation logic 210. For example, metrics 136 may be received by the KPI generation logic at regular intervals such as every 30 or 60 seconds, every 5, 10, 15, 30 minutes, every hour or on a multiple hour basis, etc. The metrics 136 may then be provided to the threshold management logic 230, which assesses the metrics 136 relative to current thresholds and assigns a severity level 206 to the performance metric or KPI (which may be based on an aggregation or other combination of multiple metrics).

Additionally, the service generation logic 220 may be configured to receive the entity KPIs (or performance metrics) and the severity levels 206, along with entities IDs 135 (not shown) from the KPI manager 130. With the data received from the KPI manager 130, the service generation logic 220 is configured to determine the KPIs associated with each of the service, where the KPIs may be based on targeted service KPI(s) and/or dependent service KPI(s). The KPIs relied upon for the service may be maintained within a service-KPI mapping 246, which may be updated based on changes to KPI values utilized by the service. The entity-KPI mapping 244 includes a similar mapping between the entities and their corresponding KPIs.

Figure 3:
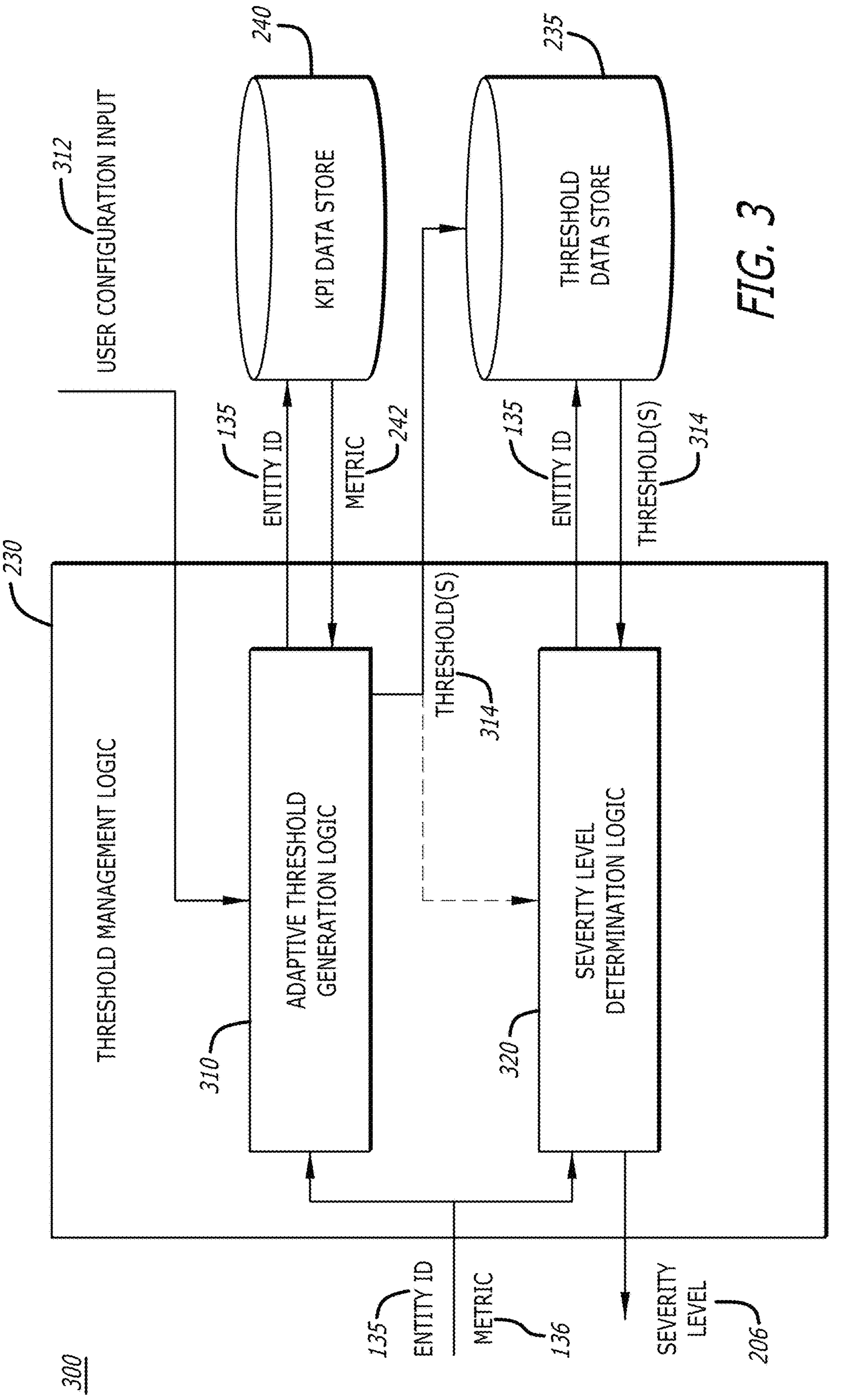
FIG. 3 is a block diagram illustrating an example operational flow of information between logic components within the threshold management logic according to some examples.

Referring to FIG. 3, a block diagram illustrating an example operational flow of information between logic components within the threshold management logic is shown according to some examples. The network portion 300 of FIG. 3 illustrates detail of the logic components forming the threshold management logic 230 and the operability thereof. In particular, the threshold management logic 230 is shown to include an adaptive threshold generation logic 301 and a severity level determination logic 320.

The adaptive threshold generation logic 310 may be configured, upon execution of one or more processors (not shown) to receive input data such as one or more entity IDs 135 and metrics (metrics) 136 corresponding to the entity IDs 135. Based on the input data, the adaptive threshold generation logic 310 may generate one or more thresholds for the metric 136, which may involve generation of thresholds to recommend to an IT administrator, security operations center (SOC) analyst, or other ITSI user that correspond to one or more severity levels of the metric. The generation of such thresholds may be upon an initial configuration of the ITSI system 100 of FIG. 1 or of an entity corresponding to one of the entity IDs 135. In other examples, the generation of such thresholds may be an update to previously generated thresholds, e.g., a process that occurs at a regular interval such as on a daily basis.

In some examples, a single entity ID 135 and a single metric 136, e.g., a time-series data set, of a most-recent time interval (e.g., last 24 days) is received. In such instances, the adaptive threshold generation logic 310 performs operations of retrieving historical metric data such as from the KPI data store 240 by querying for historical metric data 242 based on the entity ID 135. The historical metric data 242 may represent the prior 2-30 days. The adaptive threshold generation logic 310 may then detect one or more seasonality patterns for the metric time-series data set (current and historical), computing a silhouette score for each seasonality pattern, and when the highest computed silhouette score satisfies a silhouette threshold comparison, select the corresponding seasonality pattern to use in generating as a first threshold. Further detail as to selection of a seasonality pattern and determination of severity level(s) is discussed below with reference to at least FIG. 6.

Figure 8:
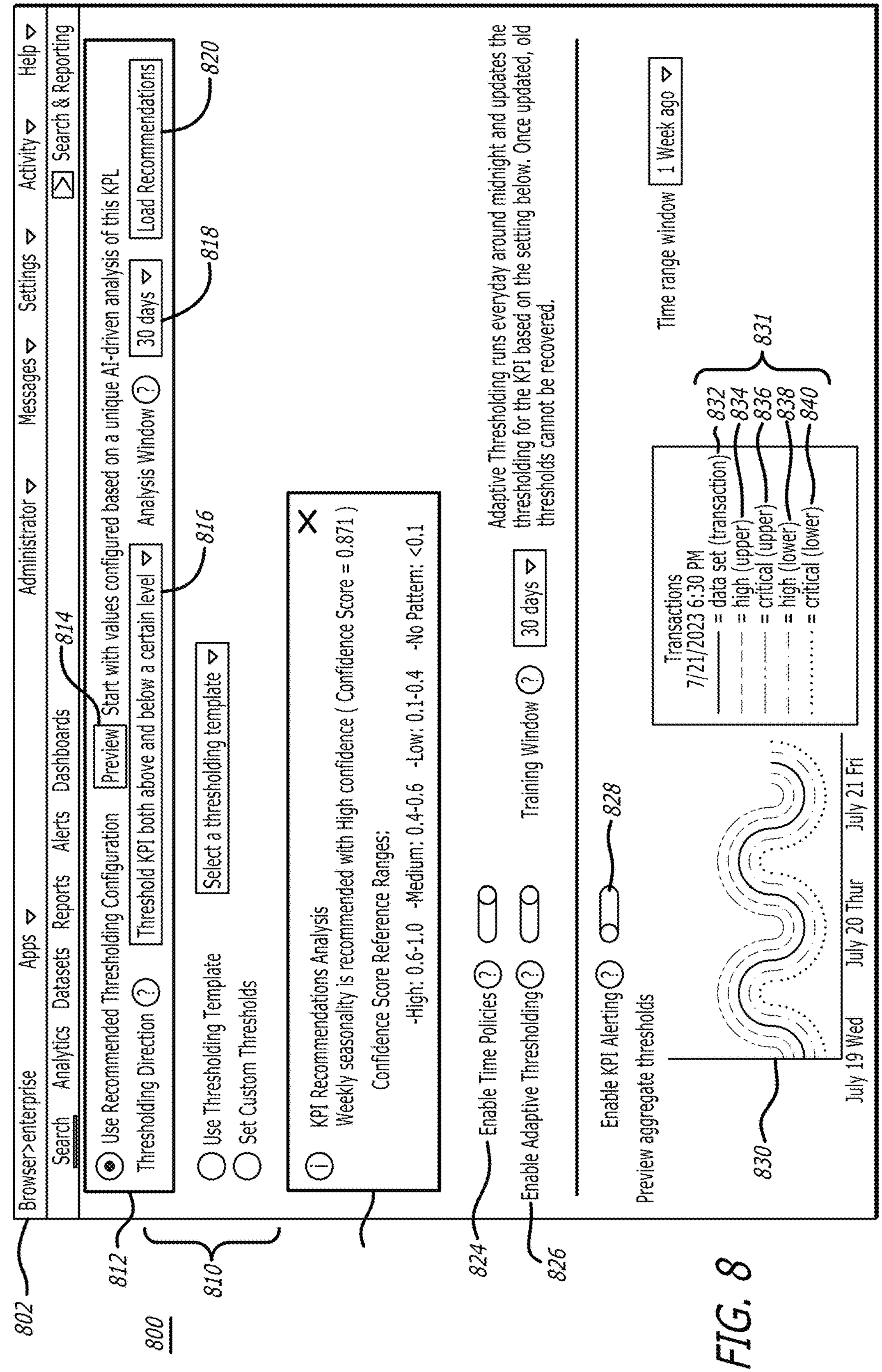
FIG. 8 is a sample graphical user interface for implementing adaptive thresholding by the ITSI system of FIG. 1 according to some examples.

In some examples, the first threshold may be utilized to determine anomalies in the current time-series data set. In other examples, a plurality of thresholds may be generated based on the selected seasonality pattern. For example and with brief reference to FIG. 8, the graphical user interface 800 of FIG. 8 illustrates a “Preview aggregate thresholds” display portion 830 illustrating a plurality of thresholds that distinguish between different severity levels: normal; medium; high; and critical.

In other examples, a plurality of entity IDs 135 and metrics 136 may be received, where the metrics 136 include a time-series data set for each of the entity IDs 135 corresponding to a single metric such as CPU usage, free memory percentage, CPU temperature, etc. The adaptive threshold generation logic 310 may be configured to apply an aggregation function to the plurality of time-series data sets 136, obtain historical metrics 242 for each of the entity IDs 135, apply the aggregation function to each of the historical metrics 242 to generate a single historical time-series data, and detect one or more seasonality patterns, compute silhouette scores for each seasonality pattern, select a seasonality pattern based on the computed silhouette scores and silhouette threshold comparison, and generate one or more severity level thresholds as referenced above. Additional detail as to seasonality pattern detection, silhouette score computation, and severity level threshold generation for an aggregation of time-series data sets is provided with respect to FIG. 5 (aggregation) and FIG. 7.

The severity level determination logic 320 may be configured to receive input data being one or more entity IDs 135 and one or more metrics 136 and may aggregate a plurality of metrics 136 into a single time-series data set in the same manner as the adaptive threshold generation logic 310 (discussed above). The severity level determination logic 320 may receive one or more threshold 314 from the adaptive threshold generation logic 310 corresponding to the input data or may retrieve the thresholds from a threshold data store 235 based on entity ID 135. The severity level determination logic 320 then compares the metric 136 (or aggregated metric) to one or more threshold 314 to determine a severity level thereof. As shown in FIG. 1, data may be provided from the KPI manager 130 (within which the threshold management logic 230 resides) to a output generation component 160, which may generate various graphical user interfaces including a display of the metric 136 (or aggregated time-series data set) and the one or more thresholds. FIG. 8 provides an example display of a time-series data set with a set of thresholds generated by the adaptive threshold generation logic 310, which provides an illustrative context of some operability of the severity level determination logic 320.

Figure 4:
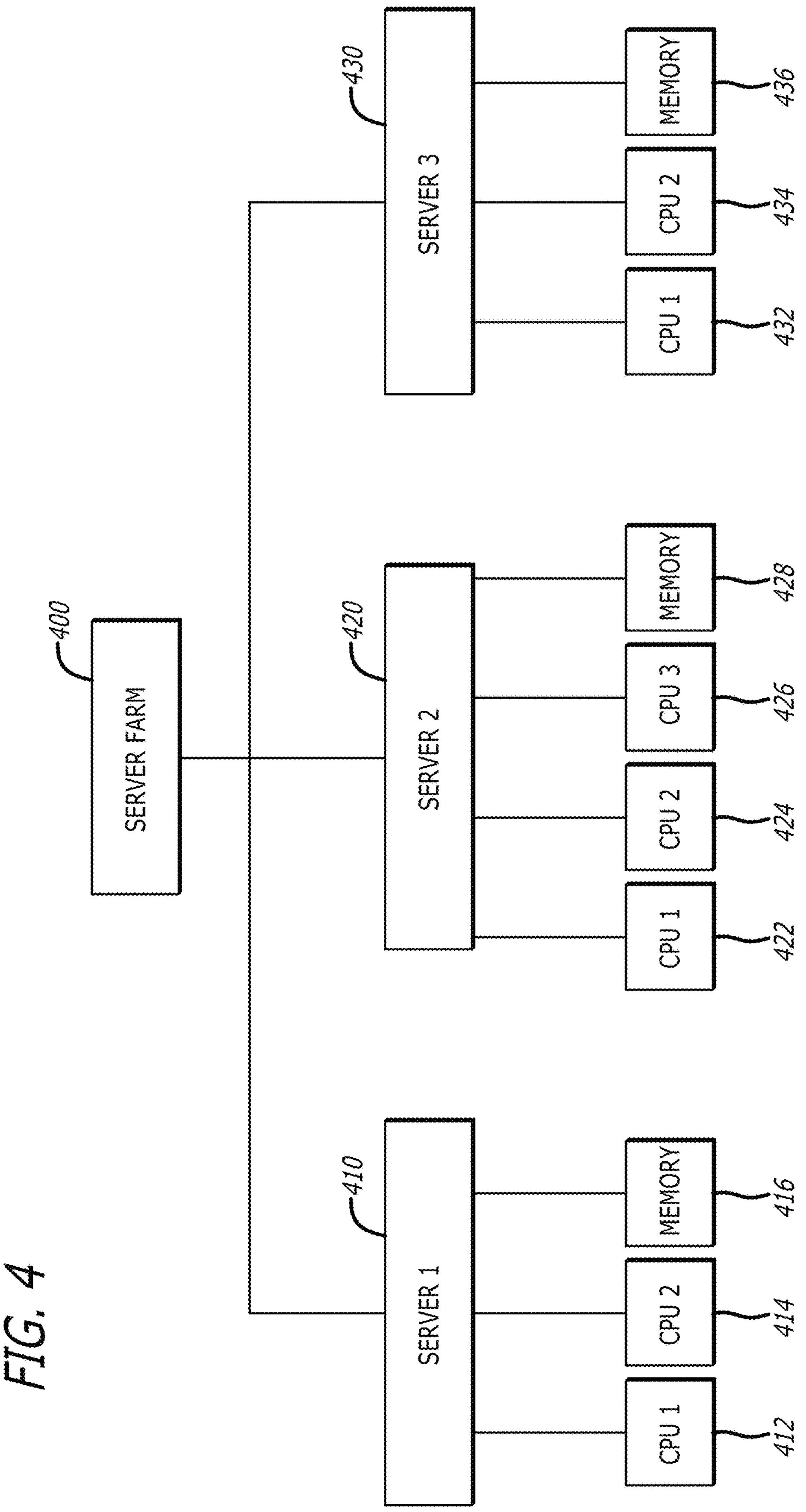
FIG. 4 is a block diagram illustrating an example tier of entities according to some examples.

Referring to FIG. 4, a block diagram illustrating an example tier of entities is shown according to some examples. The discussion in FIG. 3 referenced the potential receipt of multiple metrics (time-series data sets) by the threshold management logic 230. FIG. 4 provides an example illustration of a plurality of related entities with a portion configured to generate various metrics that may be aggregated as discussed above. FIG. 4 represents an example server farm 400 that is comprised of a plurality of servers such as servers 410-430 with each server formed of one or more CPUs and memory. As shown, server 410 is formed of CPU 412, CPU 414, and memory 416. Server 420 is of CPU 422, CPU 424, CPU 426, and memory 428. Server 430 is formed of CPU 432, CPU 434, and memory 436.

As one example, the CPU 412 may have a unique entity identifier, such as a unique serial number (or alternatively called an assembly test process order (ATPO) number) and generate data points over time corresponding to CPU usage or CPU temperate thereby forming a time-series data that serves as a metric received by the threshold management logic 230. In some examples, the metrics 136 received by the threshold management logic 230 may refer to data points indicating CPU usage over time for both the CPUs 412, 414. In such instances, the threshold management logic 230 may perform an aggregation process that aggregates the time-series data sets indicating CPU usage for the CPUs 412, 414 over a common time period into a single time-series data set. As discussed below, example aggregation functions include average, count, distinct count, earliest, latest, maximum, medium, minimum, percentile, sum, standard deviation, etc.

The aggregated time-series data set formed of the metrics from the CPUs 412, 414 may be representative of CPU usage for the server 410. As discussed above, one or more thresholds may be generated by the adaptive threshold generation logic 310 based on an aggregated time-series data set and historical data with the aggregated time-series data set compared to the aggregated time-series data set to determine a severity level thereof. As the entities generating the data that form an aggregated time-series data set are known, users such an ITSI system user may monitor a component such as server 410 by way of an aggregated time-series data set (e.g., for CPU usage) and also drill down into individual entities such as the CPUs 412, 414, such as when a severity level raises to a level of concern. Thus, an ITSI system user may drill down to see which of the entities underlying an aggregate time-series data set are behaving anomalously or at a particular severity level.

Figure 2:
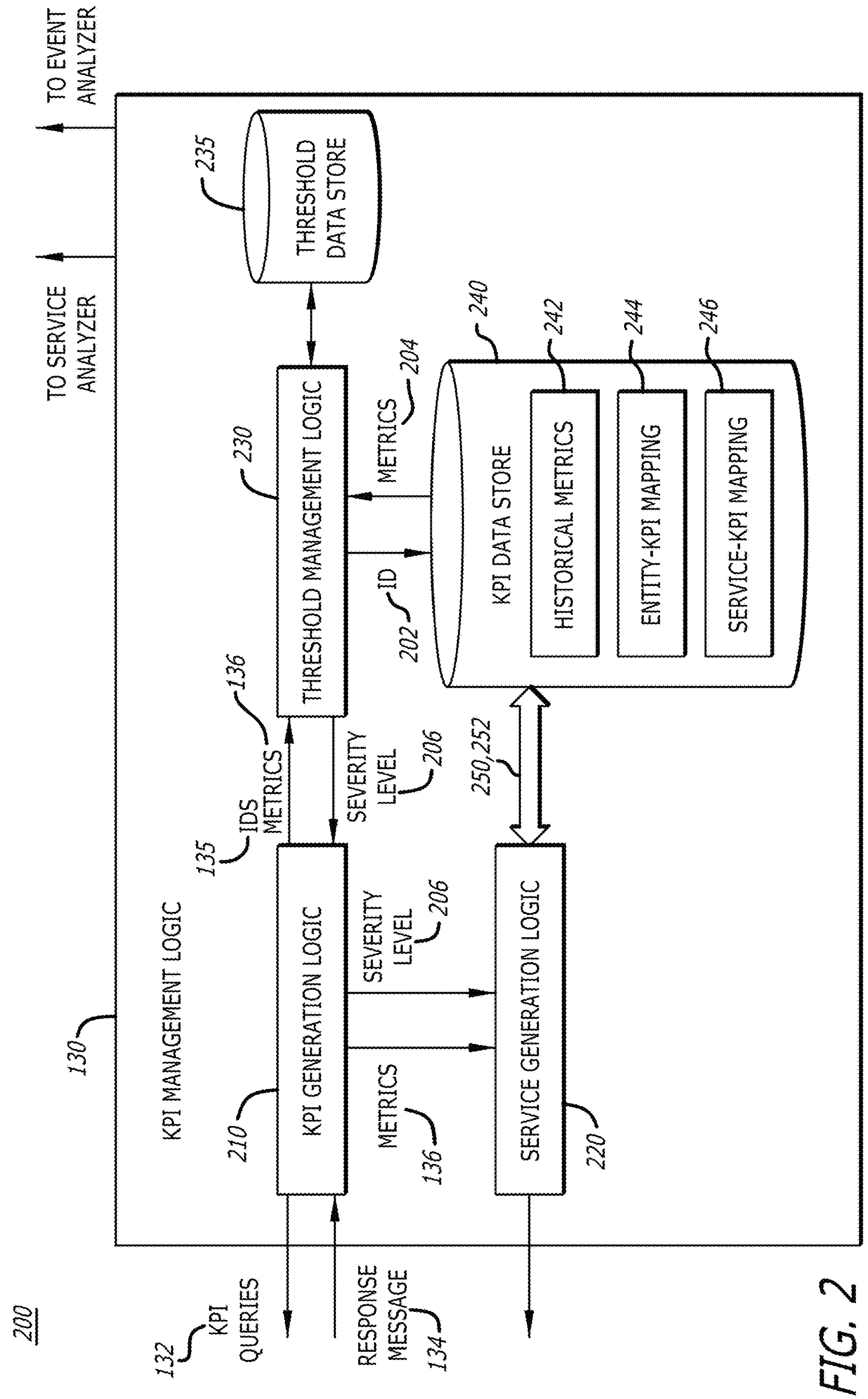
FIG. 2 is a block diagram illustrating an example operational flow of information between logic components within the KPI management logic according to some examples.
Figure 5:
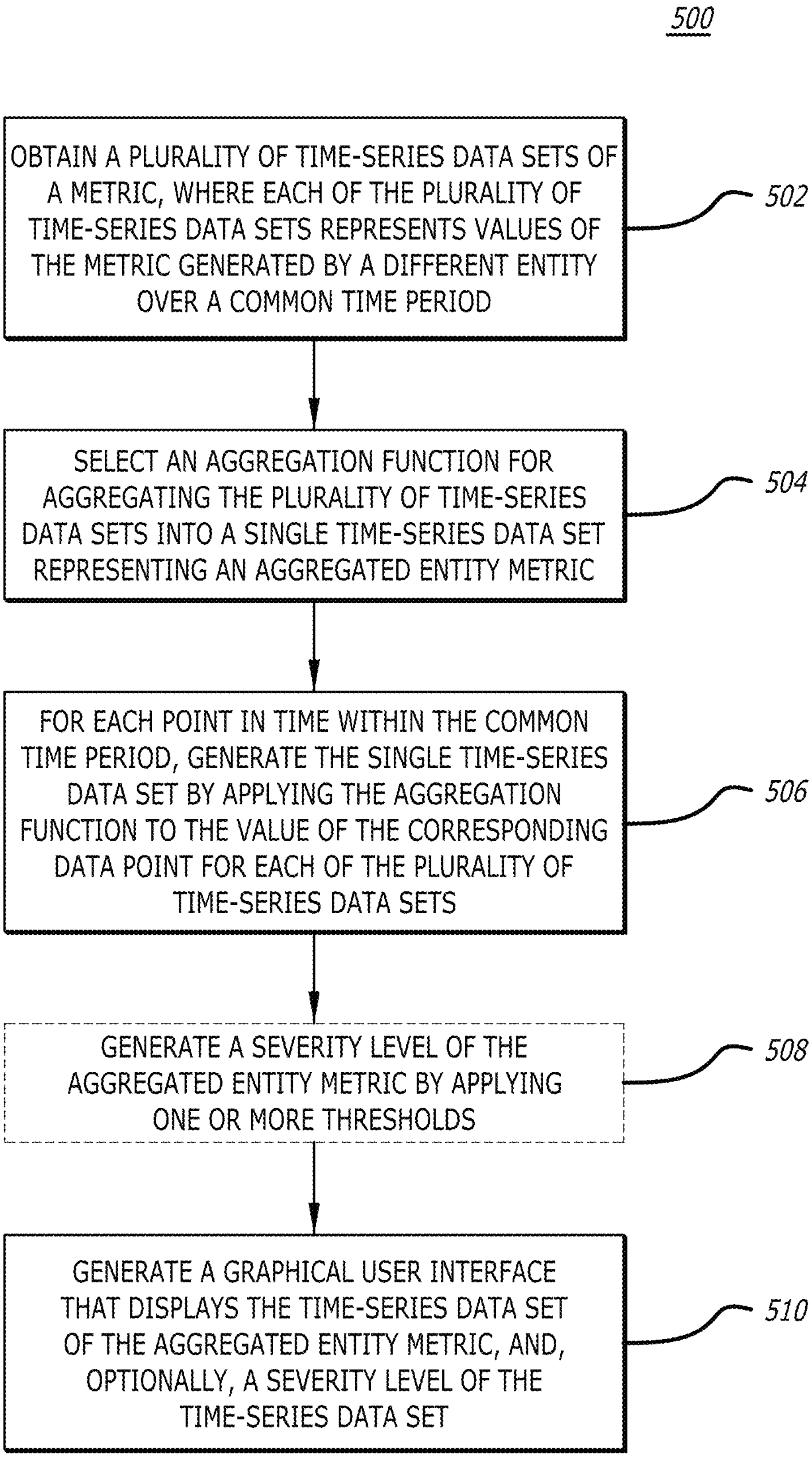
FIG. 5 is a flow diagram illustrating an example process for aggregating a metric of a plurality of entities implemented by the KPI generation logic of FIG. 2 according to some examples.

Referring to FIG. 5, a flow diagram illustrating an example process for aggregating a metric of a plurality of entities implemented by the KPI generation logic of FIG. 2 is shown according to some examples. The example process 500 can be implemented, for example, by a computing device that comprises a processor and a non-transitory computer-readable medium. The non-transitory computer readable medium can be storing instructions that, when executed by the processor, can cause the processor to perform the operations of the illustrated process 500. Alternatively or additionally, the process 500 can be implemented using a non-transitory computer-readable medium storing instructions that, when executed by one or more processors, case the one or more processors to perform the operations of the process 500 of FIG. 5.

Each block illustrated in FIG. 5 represents an operation of the process 500. It should be understood that not every operation illustrated in FIG. 5 is required. In fact, certain operations may be optional to complete aspects of the process 500. The process 500 begins with an operation of obtaining a plurality of time-series data sets of a metric, where each of the plurality of time-series data sets represents values of the metric generated by a different entity over a common time period (block 502).

Additionally, an aggregation function for aggregating the plurality of time-series data sets into a single time-series data set representing an aggregated entity metric is selected (block 504). The selection of the aggregation function may be based a configuration setting, such as within a configuration file, or may be a result of user input selecting one of a predetermined set of possible aggregation functions via a graphical user interface. Example aggregation functions include average, count (e.g., the number of occurrences in a field), distinct count (e.g., the count of distinct values in a field), earliest, latest, maximum, medium, minimum, percentile, sum, standard deviation, etc. In some examples when the percentile aggregation function is utilized, when the KPI is evaluated it takes the average of metric value for each entity as the entity value then takes the percentile (e.g., 95) of all entity values as the service/aggregate value over a selected time period (e.g., selected 5 minute time period). In some examples when the standard deviation aggregation function is utilized, when the KPI is evaluated the standard deviation aggregation function includes taking the average of the metric value for each entity as the entity value then taking the standard deviation of all entity values as the service/aggregate value over a selected time period (e.g., selected last 5 minute time period).

Following selection of the aggregation function, for each point in time within the common time period, a single time-series data set is generated by applying the aggregation function to the value of the corresponding data point for each of the plurality of time-series data sets, e.g., time-series data set of an aggregated entity metric (block 506). Optionally, a severity level of the aggregated entity metric may be generated by applying one or more thresholds (block 508). As discussed throughout the disclosure, one or more severity level thresholds may be generated based on the aggregated entity metric (and corresponding historical data), with each of the severity level thresholds indicating a different level of severity such as normal, medium, high, critical, etc. A graphical user interface may then be generated that displays the time-series data set of the aggregated entity metric, and, optionally, a severity level of the time-series data set (block 510).

Figure 6:
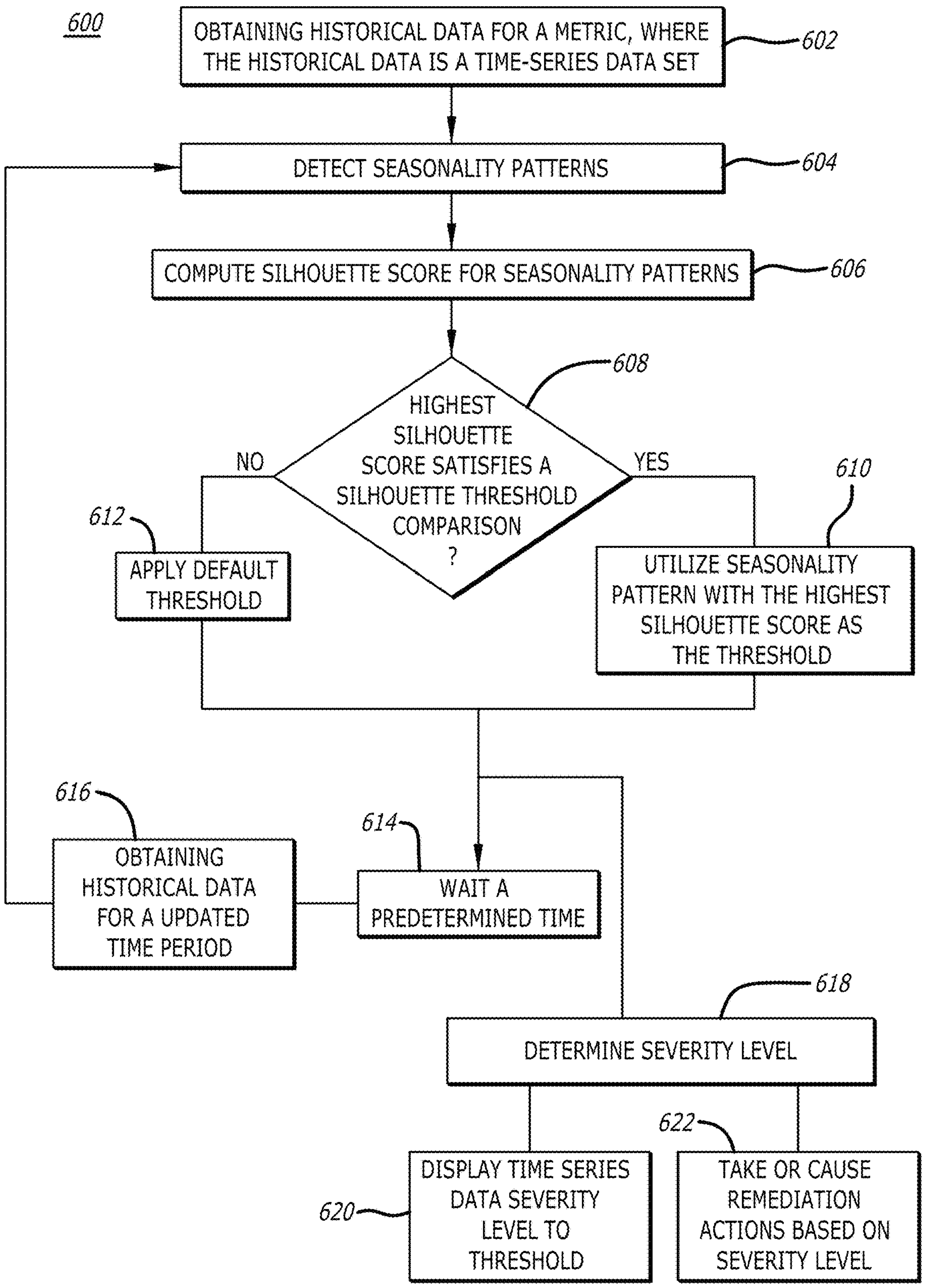
FIG. 6 is a flow diagram illustrating an example process for determining an adaptive threshold for a metric of an entity implemented by the adaptive threshold generation logic of FIG. 3 according to some examples.

Referring to FIG. 6, a flow diagram illustrating an example process for determining an adaptive threshold for a metric of an entity implemented by the adaptive threshold generation logic of FIG. 3 is shown according to some examples. The example process 600 can be implemented, for example, by a computing device that comprises a processor and a non-transitory computer-readable medium. The non-transitory computer readable medium can be storing instructions that, when executed by the processor, can cause the processor to perform the operations of the illustrated process 600. Alternatively or additionally, the process 600 can be implemented using a non-transitory computer-readable medium storing instructions that, when executed by one or more processors, case the one or more processors to perform the operations of the process 600 of FIG. 6.

Each block illustrated in FIG. 6 represents an operation of the process 600. It should be understood that not every operation illustrated in FIG. 6 is required. In fact, certain operations may be optional to complete aspects of the process 600. The process 600 begins with an operation of obtaining historical data for a metric, where the historical data is a time-series data set (block 602). For example, the historical time-series data set may encompass the last 24 hours, 7 days, 30 days, 60 days, etc.

The process 600 continues with detection of one or more seasonality patterns for the historical time-series data set (block 604). In some examples, detection of one or more seasonality patterns may include selection of one or more of a predetermined set of seasonality patterns. In some examples, the seasonality pattern detection may involve evaluating a set of predetermined seasonality patterns against the historical time-series data set, where each of the set of determined seasonality patterns are associated with a silhouette score based on the evaluation. In some examples, the seasonality pattern detection subprocess performs operations that include the partition of the time-series data set into one or more sets of subsequences, where each set of subsequences represents a candidate seasonality pattern. For a given set of subsequences, the subsequences are divided into two or more clusters. A silhouette score is then computed for each subsequence such that a mean, median, or mode of all subsequences within the given set of subsequences may be used as the silhouette score of the set of subsequences (block 606). The silhouette score of the set of subsequences represents a quality of the clustering of the set of subsequences. A high silhouette score indicates that the given set of subsequences is a good seasonality pattern candidate. As an example, a first set of subsequences may refer to daily subsequences, e.g., the time-series data set is divided into subsequences of 24 hour blocks, and a second set of subsequences may refer to half-day subsequences, e.g., the time-series data set is divided into subsequences of 12 hour blocks.

Referring to the set of subsequences having the highest silhouette score, the silhouette score is compared to a silhouette threshold (block 608). When the silhouette score satisfies the silhouette threshold comparison, the seasonality pattern represented by the set of subsequences is utilized in as a threshold (block 610). However, when the silhouette score does not satisfy the silhouette threshold comparison, a default threshold may be applied (block 612). For example, a static threshold may be applied as either an upper and/or a lower bound. In some examples, an average may be taken of all data points over time, and the upper and lower bounds are formed by a standard deviation in either direction from the mean.

Following determination of a threshold based on a seasonality pattern or a default threshold, the process 600 continues toward two paths. A first path includes waiting a predetermined time (e.g., 24 hours), obtaining historical data for the time period day (e.g., obtaining historical data in a rolling time window that accounts for the predetermined wait time), and returning to block 604 to detect seasonality patterns. By continuing the process 600 following each predetermined wait time and obtaining historical data as a rolling time window, the process 600 can generate thresholds that adapt to changes in the metric over time.

A second path includes determining a severity level of the metric (block 618). The severity level may be based on a comparison of the metric to a plurality of thresholds that are determining based on the threshold applied at either block 610 or block 612. The process 600 may then include an operation of generating a graphical user interface that displays the metric (time-series data set), the severity level of the metric, and one or more thresholds (block 620). In some examples, the process 600 may further include an operation of automatically taking remediation actions or causing remediation actions to be performed (block 622). Remediation actions may vary based on the particular metric and entity or entities associated with the metric. Example remediation actions may include diverting processing tasks from one or more processors, diverting storage requests from one or more non-transitory, computer-readable medium storage components, blocking incoming or outgoing network traffic at a particular server (or firewall or other network component), flagging a server or firewall as being the subject of a malware or cyberattack (and automatically blocking incoming/outgoing network traffic, diverting incoming network to a virtual machine for detention due to unusual traffic patterns, etc. In some instances, other examples may include: spinning up additional resources (e.g., more virtual servers) if the existing resources are overloaded, offloading less frequently used data to cold storage to allow for new data to be stored on the resource being monitored (e.g., a database), or automatic rollback to a previous software version (e.g., if error rate or response time KPI is too high).

Figure 7:
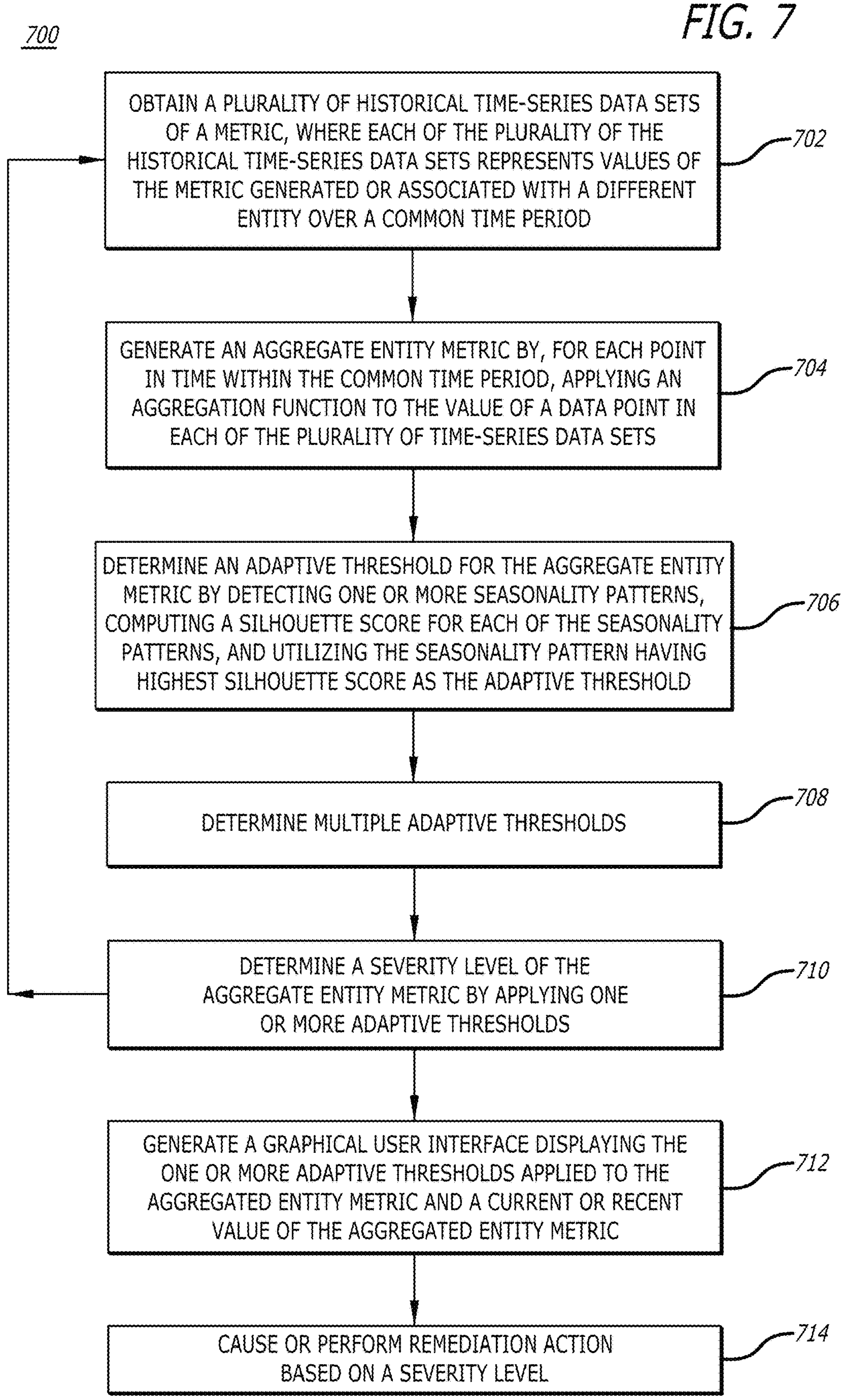
FIG. 7 is a flow diagram illustrating an example process for determining an adaptive threshold for an aggregated entity metric of a plurality entities implemented by the adaptive threshold generation logic of FIG. 3 according to some examples.

Referring to FIG. 7, a flow diagram illustrating an example process for determining an adaptive threshold for an aggregated entity metric of a plurality entities implemented by the adaptive threshold generation logic of FIG. 3 is shown according to some examples. The example process 700 can be implemented, for example, by a computing device that comprises a processor and a non-transitory computer-readable medium. The non-transitory computer readable medium can be storing instructions that, when executed by the processor, can cause the processor to perform the operations of the illustrated process 700. Alternatively or additionally, the process 700 can be implemented using a non-transitory computer-readable medium storing instructions that, when executed by one or more processors, case the one or more processors to perform the operations of the process 700 of FIG. 7.

Each block illustrated in FIG. 7 represents an operation of the process 700. It should be understood that not every operation illustrated in FIG. 7 is required. In fact, certain operations may be optional to complete aspects of the process 700. The process 700 begins with an operation of obtaining a plurality of historical time-series data sets of a metric, where each of the plurality of the historical time-series data sets represents values of the metric generated or associated with a different entity over a common time period (block 702). For example, a plurality CPUs may form a plurality of entities, and the metric may be usage, temperature, etc., where the same metric is monitored for each of the entities.

Subsequently, an aggregate entity metric is generated by, for each point in time within the common time period, applying an aggregation function to the value of a data point in each of the plurality of time-series data sets (block 704). For each, each time-series data set being aggregated includes data points at regular intervals, e.g., every second, every ten seconds, every minute, etc. In generated an aggregate entity metric, an aggregate function is applied to the sets of data points across the plurality of time-series data sets at a particular point in time within the common time period. Examples of aggregate functions include average, count (e.g., the number of occurrences in a field), distinct count (e.g., the count of distinct values in a field), earliest, latest, maximum, medium, minimum, percentile, sum, standard deviation, etc.

Thus, using average as the aggregate function, for a first point in time within the common time period, the average is computed for the values of the data points of the time-series data sets at the first point in time and the aggregate entity metric is assigned the average value at the first point in time. This process repeats for each point in time within the common time period at which data points exist.

In some instances, a time-series data set may not include a data point for a particular point in time due to any of a variety of reasons including downtime of the corresponding entity or failed transmission of the data point to the ITSI system 100. In such instances, the lack of a data point may be ignored. In other instances, pre-processing on the time-series data sets may occur prior to determination of the aggregate entity metric to clean up missing data values by filling in a missing data value with the value of the immediately preceding or immediately subsequent data point, or the value of an average of the immediately preceding and/or immediately subsequent one or more data points.

The following provides alternative methods that may be utilized to interpolate missing data. A first alternative method is spline based interpolation, which includes constructing a polynomial piecewise function that passes through all of the known data points (non-null) and tries to be smooth at the connections between polynomial segments. For example, spline based interpolation may utilized a cubic spline (3rd degree polynomial), which provides for both local extrema and potential inflection points between segments (which are the two main features of piecewise lines). This method is generically suited for most data (especially those without obvious seasonal patterns). A second alternative method is Fourier interpolation, which includes decomposing a time series dataset into a sum of sine/cosine functions and then attempting to reconstruct the time series signal. This method considers seasonal patterns and simultaneously interpolates over the whole dataset at once (as opposed to interpolation performed locally over small segments in the spline based method).

It may be advantageous to not only be able to monitor the metric at a per-entity level (e.g., how each individual CPU is performing with respect to the metric), but it may also be advantageous to monitor the metric at an aggregated level to understand how the plurality of CPUs is performing as a collective with respect to the particular metric. For example, an ITSI user may desire to quickly assess that the collective of CPUs is performing at a normal level, which is often the case, while also understanding when, at a glance, the collective is performing at a level outside of the normal range thereby requiring further analysis (or triggering an automated remediation action). This greatly improves the ability of the ITSI user to perform the job of monitoring entity status. Thus, as a result of the aggregation process described herein, an ITSI user may quickly assess the status of how a collective of entities are performing with respect to a particular metric and, in the event that the aggregation of the metric indicates that the collective is performing anomalously (or at a particular severity level), the ITSI user may drill down to a per-entity level.

An adaptive threshold is then determined for the aggregate entity metric by detecting one or more seasonality patterns, computing a silhouette score for each of the seasonality patterns, and selecting the seasonality pattern having the highest silhouette score as the seasonality pattern with which the time series data times will be partitioned into non-uniform segments, which is followed by the adaptive threshold process (block 706). Additional detail as to determination of a normal operating range (e.g., a first adaptive threshold, or first severity level threshold) is discussed below with respect with FIGS. 9A-9C.

A plurality of adaptive thresholds is then determined based on one of a plurality of approaches (block 708). Once a first adaptive threshold is determined as discussed above, a plurality of additional thresholds may be determined based thereon. For example, the first adaptive threshold discussed above may refer to the threshold between a normal level of performance and a first severity level, such as a medium level of severity, which may be an indication that the metric is outside of a normal operating range. Stated differently, the first adaptive threshold may mark a boundary between a normal operating range and a second operating range ("medium severity") adjacent to the normal range, which may cause little concern for an ITSI user, especially if the metric returns to the normal operating range. A second threshold may then indicate a threshold between the medium severity range and a third operating range, which may be represent a high level of severity. Additional thresholds may also be generated that form additional thresholds between further operating ranges, which addition one example being a critical level, e.g., requiring immediate attention. In some instances, any of the approaches discussed below may be utilized as a default approach. In some instances, the approach for determining the plurality of thresholds may be obtained through querying a configuration file, which may be stored in the threshold data store 235. In yet other instances, user input may be received by the threshold management logic 230 (and more broadly the ITSI system 100) indicating a user selection of an approach via a graphical user interface.

The plurality of thresholds may be generated in one of many ways, which may include utilizing the mean of the values of the data points within each subsequence as partitioned according to the selected seasonality pattern to compute a standard deviation and where a series of multipliers are utilized to generate the plurality of thresholds. The standard deviation algorithm shows how much variation from the mean exists in the data set; thus, basing the severity level thresholds around a mean of the values of the data points in each subsequence. The plurality of severity level thresholds may be based on a plurality of multipliers, which may be positive or negative. Positive values produce thresholds above the mean and negative values provide thresholds below the mean.

In other examples, the plurality of severity level thresholds may be computed using a quantile algorithm, which places thresholds at various percentiles according to historical data. For example, a set of medium severity level thresholds may be set for values falling below the twentieth percentile (0.20) and above the 80th percentile (0.80), a set of high severity level thresholds may be set for values falling below the tenth percentile (0.10) and above the 90th percentile (0.90), and a set of critical severity level thresholds may be set for values falling below the first percentile (0.01) and above the $99^{th}$ percentile (0.99). Severity level thresholds generated using a quantile approach may be resistant to large outliers in historical data, which makes the quantile approach advantageous for wider variances. In some embodiments, recommendations for the percentiles may be automatically generated by computing the quantiles on the submitted data.

In yet other examples, the plurality of severity level thresholds may be generated through a range algorithm, which bases determination of the thresholds on the minimum and maximum data points from historical data and the span between those values (max-min). Using the range approach, the plurality of thresholds are generated as a multiplier of the span added to the minimum. For example, a value of 0 will set a threshold to the historic data minimum, a value of 1 will set a threshold to the historic data maximum, a value of −1 will set the threshold to the minimum minus the span, and a value of 2 will set the threshold to the maximum plus the span. Using the range approach, outliers in the historical data may impact the span value, which in turn will affect the thresholds. In some embodiments, recommendations for the multipliers may be automatically generated by computing the maximum and minimum of the submitted data.

Subsequently, a severity level of the aggregate entity metric is determined by applying one or more adaptive thresholds (block 710). In other words, a determination is made as to whether the values of the time-series data set of the metric exceed any of the severity level threshold, which indicates the severity level of the metric. In some instances, the process 700 may return to block 702 to repeat the process of generating a severity level of a plurality of time-series data sets obtained using a rolling time window. For example, the process 700 may be repeated at set intervals such as every 5 minutes, 30 minutes, 3 hours, 24 hours, etc. Additionally, a graphical user interface is generated displaying the one or more adaptive thresholds applied to the aggregated entity metric and a current or recent value of the aggregated entity metric (block 712). In some examples, the process 700 may further include an operation of automatically taking remediation actions or causing remediation actions to be performed (block 714). Remediation actions may vary based on the particular metric and entity or entities associated with the metric with numerous examples provided above.

Referring to FIG. 8, a sample graphical user interface for implementing adaptive thresholding by the ITSI system of FIG. 1 is shown according to some examples. The graphical user interface (GUI) 800 is shown to be rendered in a dedicated application interface (app) but may also be accessed via a web browser in some instances. The GUI 800 includes a plurality of display regions including a header region 802, a threshold selection region 810, an information pop-up 822 and a "preview aggregate thresholds" display portion 830. The GUI also includes selectable options to enable time policies 826 and enable adaptive thresholding 826 (which is accompanied with a dropdown enabling user selection of a training window, e.g., 30 days as shown).

In more detail, the threshold selection region 810 is configured to receive user input indicating selection of a methodology for determining thresholds with options of recommended thresholds 812, threshold templates, or custom thresholds. The use of recommended thresholds 812 is shown to be selected, where selection thereof may enable the user to select a "preview" button 814, select a threshold direction (e.g., above, below, or above and below), select an analysis window (e.g., a period of time over which the thresholds are applied to a time-series data set, e.g., 30 days) 818, and select a "load recommendations" button 820.

Selection of the preview button 814 results in running an adaptive thresholding process on one or more time-series data sets of one or more entities, where results correspond to thresholds being generated through the adaptive generation process discussed above and displayed graphically, e.g., as the preview aggregate thresholds display portion 830. While FIG. 8 only shows a single preview of the aggregate thresholds, a plurality may be displayed. In some examples, selection of the preview button 814 may initiate the adaptive threshold generation process to be performed on five (5) time-series data sets with the results being displayed on the GUI 800 for user approval (which may result in selection of the load recommendations button 820). In some examples, the subset of time-series data sets that are previewed may be a time-series data set for a first predetermined number of entities being monitored by the ITSI system 100, where the entities are listed in alphanumeric order and the first subset are selected. In other examples, a subset is selected at random from the alphanumeric listing. In yet other examples, a user may be prompted to select a subset, e.g., select a representative subset of entities (such a pop-up or display region is not shown).

The information pop-up 822 provides information as to the confidence level of a selected seasonality pattern used in determining the thresholds as discussed above. The information pop-up may list the selected seasonality pattern (e.g., "weekly") and a confidence level (e.g., "high"), a confidence score (e.g., "0.871" which my correspond to the silhouette score of the seasonality pattern as discussed above), and the confidence score reference ranges.

The preview aggregate thresholds display portion 830 illustrates a time-series data set 832 over a time frame of one week as well as a plurality of thresholds generated through the adaptive threshold generation process that distinguish between different severity levels: normal; medium; high; and critical. The adaptive thresholds include upper and lower thresholds indicative of a high severity level (thresholds 834, 838, respectively) and upper and lower thresholds indicative of a critical severity level (thresholds 836, 840, respectively). Of course, other thresholds may be established as discussed above.

As will be explained below, a silhouette score-based methodology may be utilized to evaluate one or more predetermined seasonality patterns. As one illustrative example, a time-series data set may be obtained that corresponds to central processing unit (CPU) usage. It may be desirable to perform an anomaly detection process on the time-series data set or determine a severity level of the CPU usage based on one or more thresholds defining severity levels (e.g., normal, high, critical). In anomaly detection examples, a first step in the process is to determine a normal history behavior for the time-series data set and a second step is to determine data points that sit outside of the normal historical behavior. In the severity level example, a similar first step may be performed, a second step may involve determination of a set of thresholds representing different severity levels, and a third step may be comparing the CPU usage time-series data set to the plurality of severity level thresholds. A seasonality pattern detection process may be performed to determine how the time-series data set is typically affected by time of day, day of week, month of year, etc. Based on the detected seasonality pattern, one or more thresholds may be set to determine which data points of the time-series data set are outside of the normal boundary established by the thresholds (anomaly detection) and/or based on a severity of the CPU usage relative to the one or more thresholds.

Still referring to the CPU usage example, a first example seasonality pattern may include a pattern comprised of various time blocks, e.g., 12-hour blocks such as (1) being "on," "in use," or a first usage pattern, and (2) being "off," or a second usage pattern, where the patterns rotate every 12 hours. As was discussed above and will be discussed with an illustrative example below with respect to FIGS. 10A-10B, the silhouette-based methodology may include dividing the CPU usage time-series data set into subsequences according to the first example seasonality pattern, e.g., into 12-hour blocks of "on" and "off." Next, a clustering process is performed that clusters the subsequences into clusters (e.g., based on the seasonality pattern(s) being evaluated as discussed above), and following the clustering, a silhouette score is computed for each subsequence. An overall silhouette score for the first example seasonality pattern may be determined using one of a plurality of statistical functions (e.g., average of silhouette scores, median, average/medium of a middle percentage, etc.). In one exemplary example, the overall silhouette score is computed as the median of the silhouette scores of all subsequences. In some examples, when the overall silhouette score is high (indicating a high-quality clustering), the subsequences containing anomalies will have a relatively low silhouette score.

Figure 9A:
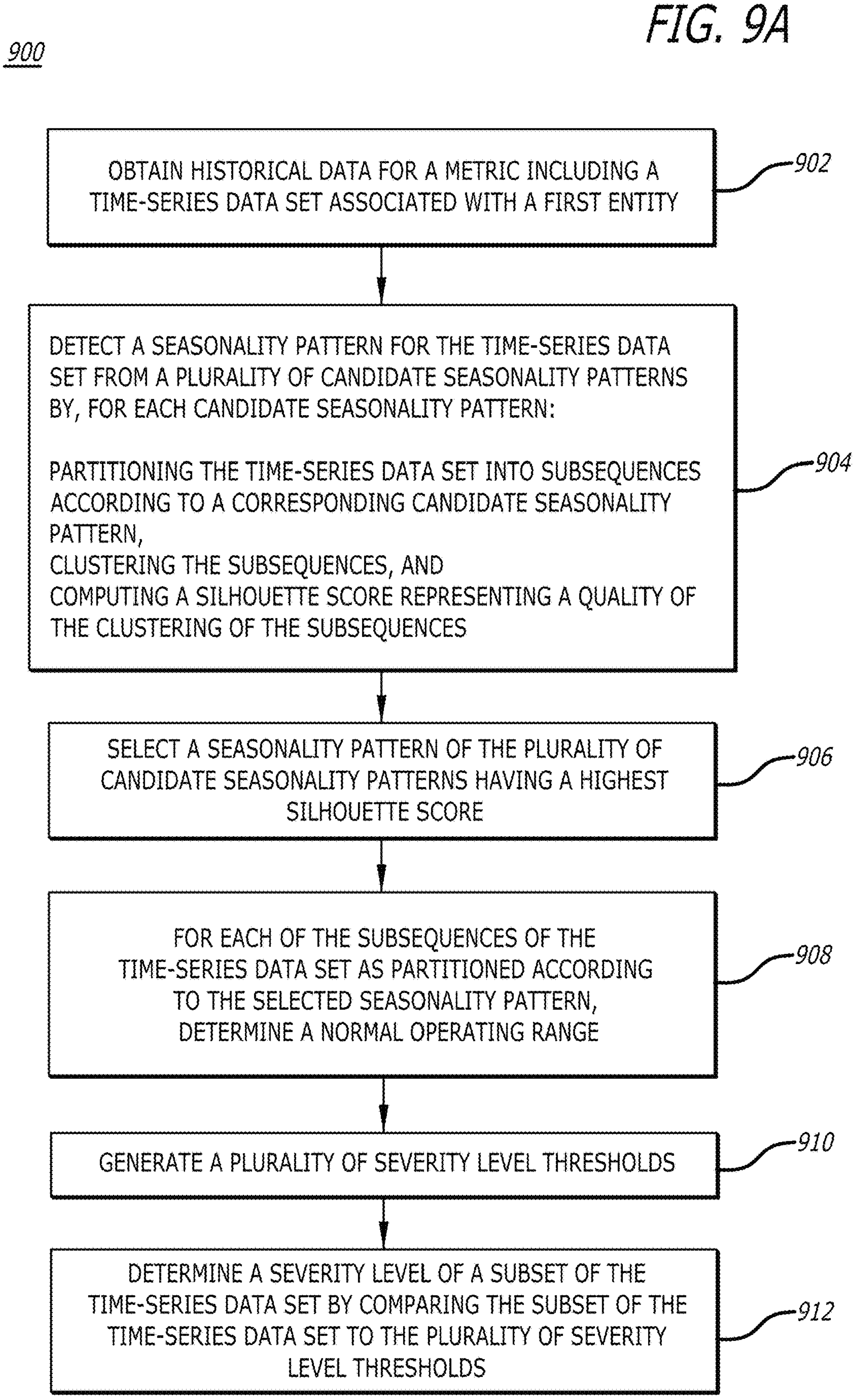
FIG. 9A is a graphical representation of a seasonality pattern corresponding to a sample time-series data and detected anomalies of the time-series data set according to some examples.

Referring to FIG. 9A, a flow diagram illustrating an example process generating a plurality of severity level thresholds implemented by the adaptive threshold generation logic of FIG. 3 is shown according to some examples. As one illustrative example, it may be desirable to automatically determine a set of severity level thresholds for a time-series data set, where the severity level thresholds are adaptive to the values of the time-series data set over time, which may entail the severity level thresholds being routinely updated at set intervals based on historical data spanning a rolling time window such as a past 30 days. Thus, a set of severity level thresholds may be updated on a daily basis at midnight, where the updating includes generation of new thresholds based on historical data from an immediately prior 30 days. Therefore, the severity level thresholds adapt to the values of the data change over time.

As an example, a time-series data set may be representative of a number of network packets received by a particular router (an entity) operating within an enterprise network. It may be desirable to have severity level thresholds update automatically on a daily basis where the updating causes the severity level thresholds to adapt to changes in the amount of network packets received over time (e.g., due to expanded network usage as an enterprise grows, or conversely due to lessening network usage as an enterprise shrinks). As will be discussed below, it may further be desirable to have the severity level thresholds account for seasonality patterns, where the process automatically detects a seasonality pattern that corresponds to the time-series metric.

Continuing the example of monitoring network packets received at a router, the metric may have normal values during weekday business hours, lower values during evening hours when fewer employees are working, and another set of values on weekends when a very low number of people are working. In this scenario, it would be advantageous for the process 900 to automatically detect these three time blocks, and automatically configure appropriate thresholds separately for each block. However, such is not a realistic endeavor for a human due to everchanging values of the time-series metric, the frequency at which the severity level thresholds are to be updated, and the sheer complexity in devising appropriate thresholds that provide accurate ranges indicative of severity levels of the time-series metric (e.g., surges in network packet receipt should be flagged as a particular severity level based on the surge). Thus, the process 900 provides one example implementation for automatically generating severity level thresholds that account for seasonality of the time-series metric and may adapt to changes in the time-series metric through updating of the severity level thresholds at routine intervals while using a rolling time window for the historical data set.

The example process 900 can be implemented, for example, by a computing device that comprises a processor and a non-transitory computer-readable medium. The non-transitory computer readable medium can be storing instructions that, when executed by the processor, can cause the processor to perform the operations of the illustrated process 900. Alternatively or additionally, the process 900 can be implemented using a non-transitory computer-readable medium storing instructions that, when executed by one or more processors, case the one or more processors to perform the operations of the process 900 of FIG. 9. Each block illustrated in FIG. 9 represents an operation of the process 900. It should be understood that not every operation illustrated in FIG. 9 is required. In fact, certain operations may be optional to complete aspects of the process 900. The process 900 begins with an operation of obtaining historical data for a metric including a time-series data set associated with a first entity (block 902).

Figure 9B:
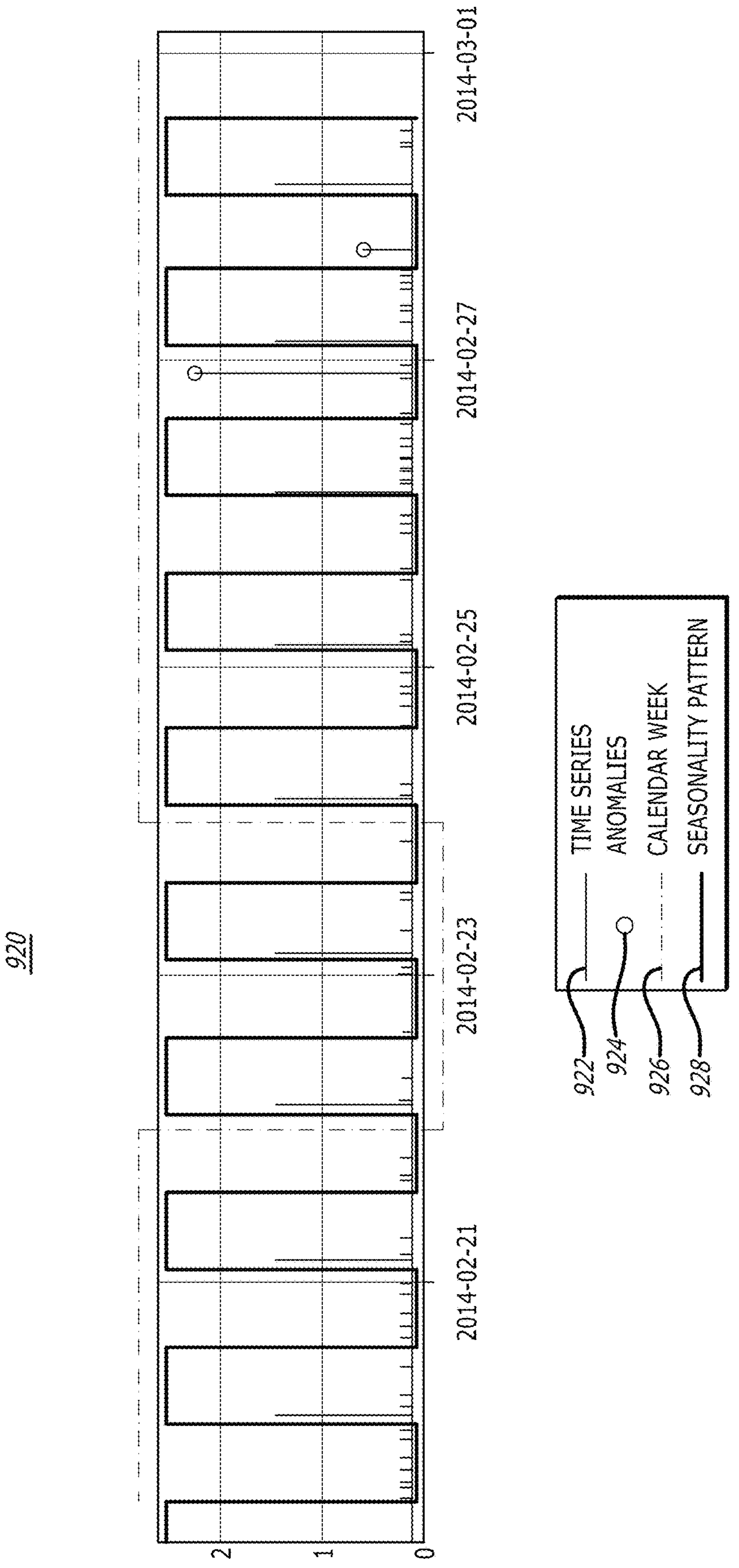
FIG. 9B is a graphical representation of a first cluster of subsequences and a second cluster of subsequences of the time-series data set of FIG. 9A according to some examples.
Figure 9C:
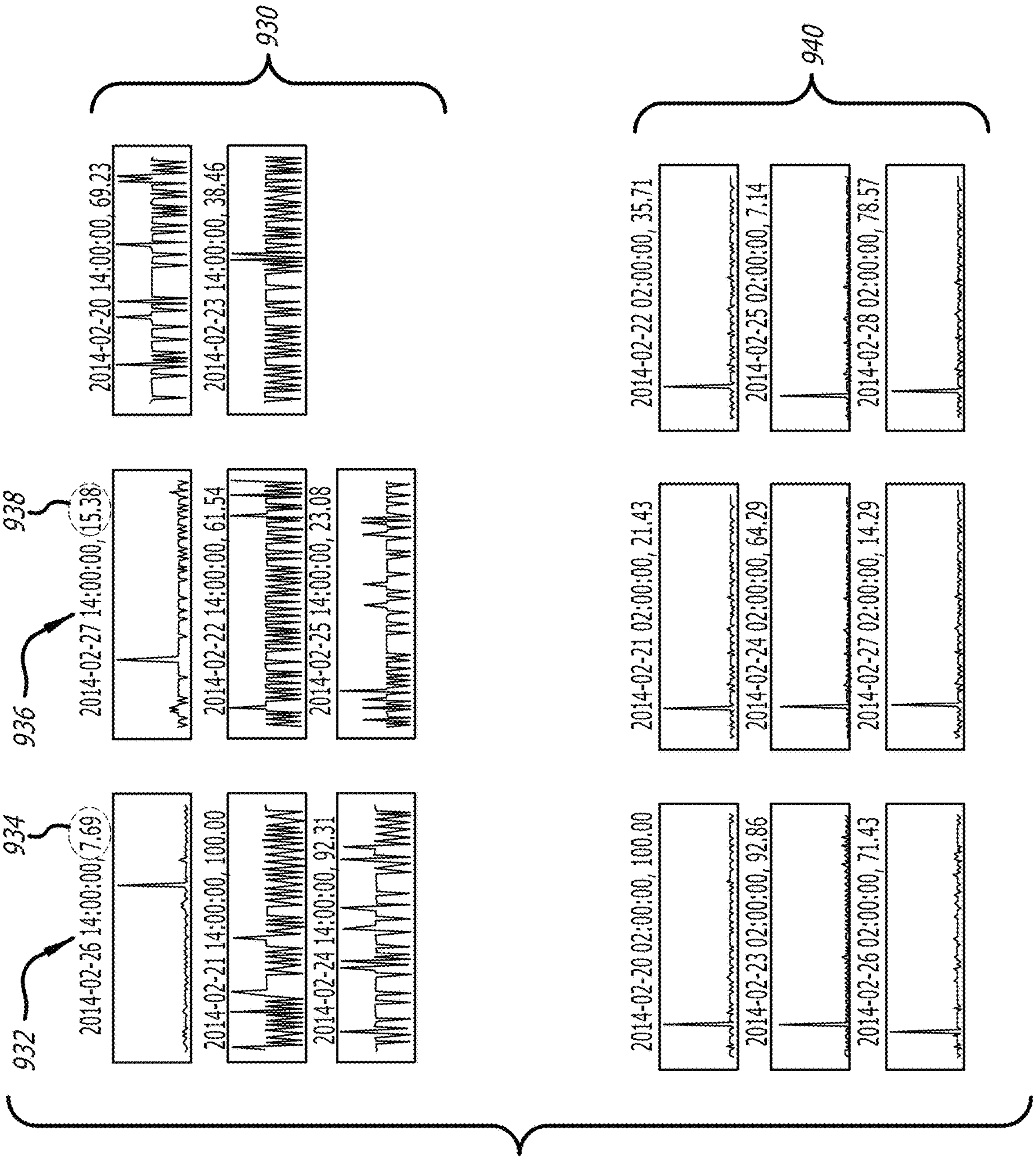
FIG. 9C is a graphical representation of a first cluster of subsequences and a second cluster of subsequences of the time-series data set of FIG. 9B according to some examples.

The process 900 continues with operations to detect a seasonality pattern for the time-series data set from a plurality of candidate seasonality patterns (block 904). In some examples, the seasonality detection process may include operations of, for each candidate seasonality pattern, (i) partition the time-series data set into subsequences according to a corresponding candidate seasonality pattern, (ii) cluster the subsequences, and (iii) compute a silhouette score representing a quality of the clustering of the subsequences. FIG. 9B provides an example illustration of overlaying a sample candidate seasonality pattern on a time-series data. As discussed below, the seasonality pattern 940 in FIG. 9B is comprised of 12-hour blocks with the upper value indicating working hours and the lower values indicating off hours. For the seasonality detection process, the time-series data set is partitioned (subdivided) into subsequences, e.g., subsequences of 12-hour blocks. Stated differently, the partitioning subdivides the time-series data set into subsequences (blocks of time) according to the seasonality pattern, such as 12-hour blocks, and subsequently clusters the subsequences into two or more groups. FIG. 9C provides a sample illustration of the clustering of subsequences into two groups; one for business hours, one for off-hours. The quality of the clustering is determined through computation of a silhouette score as discussed below with respect to FIG. 9B.

While the example a seasonality pattern being comprised of 12-hour blocks rotating between an “on” period and an “off” period, this may be an overly simplistic example. However, the disclosure is not so limited and encompasses patterns of multiple layers, e.g., a first layer pertaining to a single, and a second layer pertaining to a week. Thus, a seasonality pattern may encompass a pattern over a week-long period, such as Monday-Friday as working days and Saturday-Sunday as off days, which represents a first layer in the seasonality pattern. The same seasonality pattern may include a second layer of a day, e.g., 12:00 am-11:59 μm. Within each layer, blocks of time may be considered individually such as 1, 2, 3, 4, or 12-hour blocks of time. While the immediately preceding seasonality pattern example provides more complexity than the 12-hour on/off example, one of ordinary skill in the art should understand the disclosure as encompassing any number of “layers” within a determined seasonality pattern (e.g., yearly, monthly, weekly, daily, hourly, per minute, per second, etc.). Additionally, each layer may be partitioned into individualized time segments, e.g., 1 hour blocks, 10 second blocks, etc., which will depend on the length of time of the layer.

Following the computation of the silhouette score, the seasonality pattern of the plurality of candidate seasonality patterns having the highest silhouette score is selected in furtherance of generating the plurality of severity level thresholds (block 906). Using the times-series data set as partitioned according to the selected seasonality pattern the highest silhouette score, a normal operating range for each subsequence is determined along with a set severity level thresholds (blocks 908, 910).

In a first set of examples, one of a standard deviation computation, a percentile computation, a range computation, or a quantile computation is utilized to determine the plurality of severity level thresholds including the normal operating range (where the normal operating range is the range between the upper and lower closest to the time-series data set).

In a second set of examples, determining a normal operating range may include determining, for each of the subsequences, the mean, standard deviation, and z-value. The z-value is a multiplier of the standard deviation and represents the minimum multiplier such that all normal (benign) data points are contained inside the range [mean−z-value*std, mean±z-value*std]. Following an anomaly detection process that detects any anomalies within a subsequence, the upper and lower bands are determined for the set of normal (benign) data points, which establishes the normal operating range for each subsequence. The z-value is then determined by solving for the z-value such that all normal (benign) points are contained inside the range [mean−z-value*std, mean±z-value*std]. In some implementations, for each point 'x' in the dataset (optionally in the dataset of normal points), the z-value can be computed as [abs (x−mean)/std], where abs( ) refers to an absolute value. In some instances, prior to determining the normal operating range for a subsequence, each initial subsequence may be further sub-divided into shorter time blocks, e.g., 1-hour blocks, 2-hour blocks, etc., with the mean, standard deviation, and Z-value and normal operating range computed for each sub-divided subsequence (e.g., segments). In yet additional examples, an operation is performed that includes determining whether neighboring segments should be combined. Determining whether to combine neighboring segments may include, first, determining the mean and standard deviation of the values of the data points within each segment. Second, for each splitting point (e.g., where one segment ends and the next begins), compare the difference of the two neighboring segments' mean with the minimum of the standard deviation of the two segments. The above may be summarized as:

If abs ($mean_1 - mean_2$)<$\alpha$*min ($std_1 - std_2$), then: the neighboring segments are combined (i.e., the splitting point is abandoned)

The value '$\alpha$' represents a constant, which may be predetermined empirically, and 'std' refers to standard deviation. The collection of the remaining splitting points defines the splitting of the segment blocks. The upper and lower thresholds of the normal operating range of each subsequence (or segment) serve as the first thresholds between a normal operating range and a second defined operating range (e.g., medium, high, critical, anomalous, etc.). Any of standard deviation computation, a percentile computation, a range computation, or a quantile computation may be utilized to determine the additional thresholds beyond the normal operating range.

As an example of the multipliers, a first multiplier having a positive value (e.g., 1) may be applied to the standard deviation to form a first severity level threshold ("normal") and a second multiplier having a positive value (e.g., 2.5) may be applied to the standard deviation to form a second severity level threshold ("critical"). The first and second multipliers having positive values may form upper thresholds. Identical negative values may be utilized as third and fourth multipliers to generate lower "normal" and "critical" thresholds. It should be understood that additional multipliers may be utilized to generate additional thresholds (e.g., normal, medium, high, critical, etc.). Further, in some examples, the positive and negative values for a particular severity level threshold may differ from one another.

Following generation of the plurality of severity level thresholds, a severity level of a subset of the time-series data may be determined by comparing the subset of the time-series data set to the plurality of severity level thresholds (block 912). The subset may refer to one or more subsequences of the time-series data set, which enables a user to easily identify a severity level of the time-series data set at an individual point in time.

In summary of the above discussion about a plurality of severity levels, unlike typical anomaly detection methods that perform a binary classification across all points (i.e., point x is normal, point x+1 is normal, point x+2 is anomalous, etc.), the methodology discussed herein takes the computed z-value and expands it heuristically to get multiple z-values that map out more anomaly boundaries, which then result in the plurality of severity levels. For example, the methodology discussed here may classify points as follows: "point x+1 is normal severity, point x+2 is medium severity, point x+3 is critical severity, point x+4 is high severity, etc." It should be understood that the methodology discussed herein may be extended to an arbitrary cardinality of severity levels, which provides specific technical advantage when the methodology is deployed within an IT security product or IT observability production. For instance, within an IT observability product, many users that have completely different ways of configuring their severity levels, which is now possible with the extendable nature of the z-value into a plurality of severity levels. A second technical advantage of the methodology discussed herein is that the extension of the z-value may be performed bi-directionally (e.g., positive and negative values of the z-value may be utilized, which represents going above and below the mean) as well as unidirectionally (e.g., when a user is only interested in thresholding above the mean or below the mean).

Referring to FIG. 9B, a graphical representation of a seasonality pattern corresponding to a sample time-series data and detected anomalies of the time-series data set is shown according to some examples. FIG. 9B illustrates a sample graphical representation 920 of a time-series data set 922 plotted over time, e.g., a set of days spanning February and March of 2014. The graphical representation 920 also includes a set of anomalies 924, an indication of the calendar week 926 (e.g., upper value represents Monday-Friday and lower value represents Saturday-Sunday), and a seasonality pattern 928 that is being evaluating according to the time-series data set. As shown in FIG. 9B, the seasonality pattern 928 is a half-day pattern, e.g., 12-hour blocks where the upper value indicates working hours, and the lower values indicate off hours. As is shown, the time-series data set 922 includes a daily spike in value. FIG. 9B provides a basic visual understanding as to how a first example seasonality pattern is applied to a time-series data set.

Referring to FIG. 9C, a graphical representation of a first cluster of subsequences and a second cluster of subsequences of the time-series data set of FIG. 9B is shown according to some examples. FIG. 9C illustrates a point in the silhouette-based methodology at which the time-series data set 922 has been divided into subsequences according to the seasonality pattern 928 and where the subsequences have been clustered into clusters 930, 940. As illustrated in FIG. 9C, the two clusters correspond to a candidate seasonality pattern 928 where the cluster 930 includes subsequences pertaining to 12-hr blocks, e.g., time-series data captured daily starting at 14:00 (2:00 μm) and the cluster 940 includes subsequences pertaining to 12-hr blocks, e.g., time-series data captured daily starting at 2:00 (2:00 am). For example, the subsequences of the cluster 930 correspond to a first usage pattern, and the subsequences of the cluster 940 correspond to a second usage pattern (e.g., including a daily usage spike).

FIG. 9C also illustrates a date and timestamp for each subsequence as well as the computed silhouette score. The date, timestamp (start time of subsequence), and silhouette score all appear directly above the corresponding subsequence. For example, a first subsequence 932 within the cluster 930 includes a silhouette score 934 of 7.69 and a second subsequence 936 includes a silhouette score 938 of 15.38. Relative to the silhouette scores of the other subsequences of both clusters 930, 940, the low silhouette scores 934, 938 indicate that the subsequences 932, 938 are likely to include anomalies.

As noted above, the silhouette-based methodology includes further operations of determining an overall silhouette score for the seasonality pattern, such as determining the median silhouette score of all subsequences. The process is then repeated for a plurality of candidate seasonality patterns and the overall silhouette scores of each are compared to one other, whereby the candidate seasonality pattern having the highest overall silhouette score may be selected as the seasonality pattern that corresponds to the time-series data set.

a. Similarity Behavior Analysis

Figure 10:
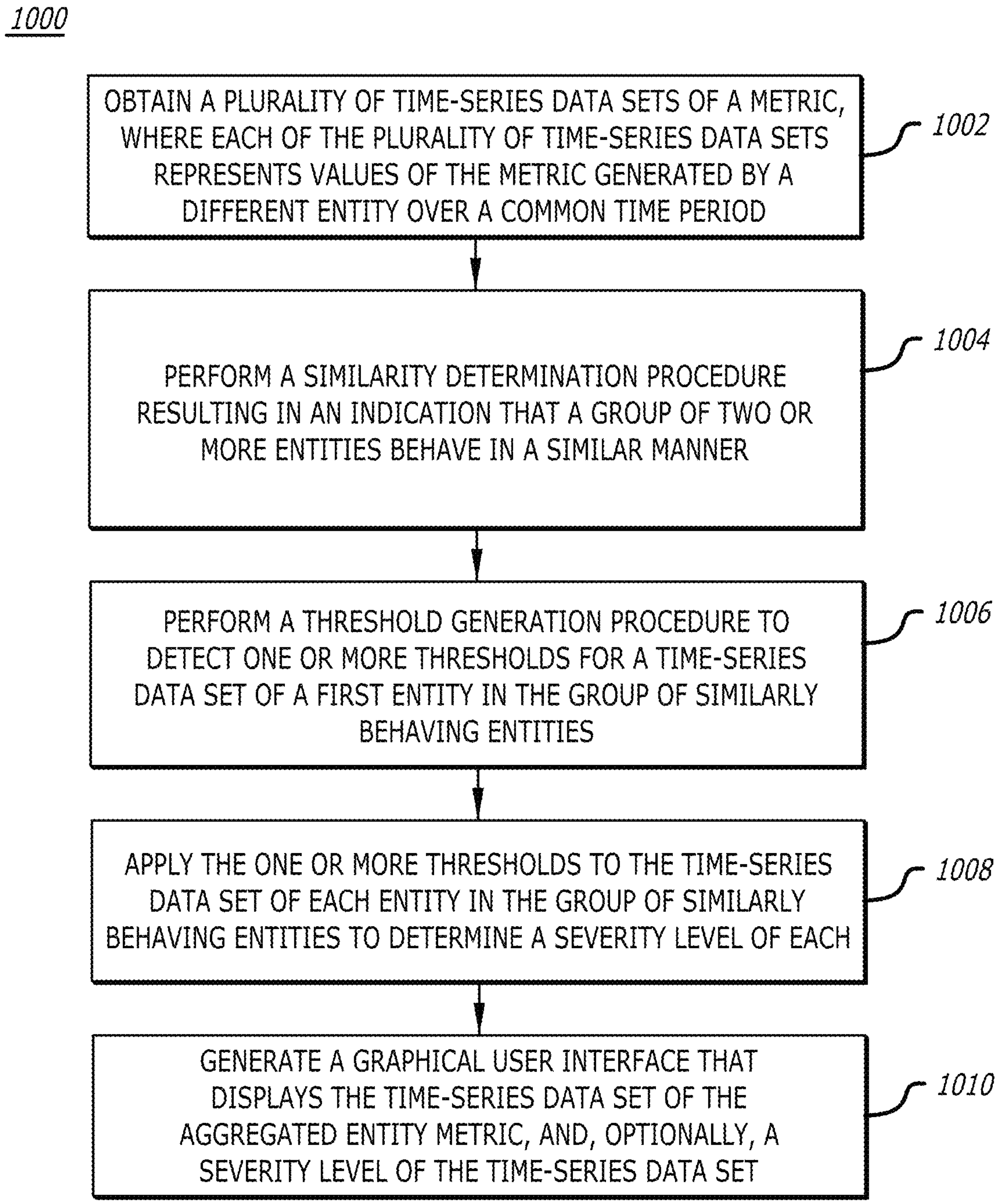
FIG. 10 is a flowchart illustrating example operations for performing a behavioral similarity procedure on a plurality of entities according to an implementation of the disclosure.

Referring now to FIG. 10, a flowchart illustrating example operations for performing a behavioral similarity procedure on a plurality of entities is shown according to an implementation of the disclosure. The example process 1000 can be implemented, for example, by a computing device that comprises a processor and a non-transitory computer-readable medium. The non-transitory computer readable medium can be storing instructions that, when executed by the processor, can cause the processor to perform the operations of the illustrated process 1000. Alternatively or additionally, the process 1000 can be implemented using a non-transitory computer-readable medium storing instructions that, when executed by one or more processors, case the one or more processors to perform the operations of the process 1000 of FIG. 10.

Each block illustrated in FIG. 10 represents an operation of the process 1000. It should be understood that not every operation illustrated in FIG. 10 is required. In fact, certain operations may be optional to complete aspects of the process 1000. The process 1000 begins with an operation of obtaining a plurality of historical time-series data sets of a metric, where each of the plurality of the historical time-series data sets represents values of the metric generated or associated with a different entity over a common time period (block 1002).

A similarity determination procedure may then be performed resulting in an indication that a group of two or more entities behave in a similar manner (block 1004). Behaving (or performing) in a similar manner may include entities of the same component-type generating or being associated with a metric that is within a predetermined range of each other (e.g., within a threshold percentage or values of each other or of a median/mean. In some examples, a clustering algorithm may be utilized that clusters the entities based on time-series data sets, where a cluster represents a group of similarly behaving entities. In some examples, entities that behave similarly may be determined by performing time series clustering to identify a set of entities having similar metric time series, e.g., those defining a cluster.

A threshold generation procedure is then performed to detect one or more thresholds for a time-series data set of a first entity in the group of similarly behaving entities, which are then applied to the time-series data sets of each entity in the group to determine a severity level for each (blocks 1006, 1008). The generation of one or more thresholds for the first entity and application of the same thresholds to the time-series data sets for each entity in the group provides a technical benefit by applying adaptive thresholds (as opposed to a static or default threshold) to a group of entities while reducing the computing resources and time required to generate such thresholds. As the group of entities behave similarly, the ITSI system 100 can utilize the thresholds for a first entity across all entities within the group due to the high likelihood that the thresholds generated for any one entity will have a high correlation to those generated for all others in the group. By applying the thresholds generated for one entity across all others in the group, the process reduces computing resources needed, and time expended in overall threshold generation.

b. KPI Recommendation Based on Behavioral Similarity

Figure 11:
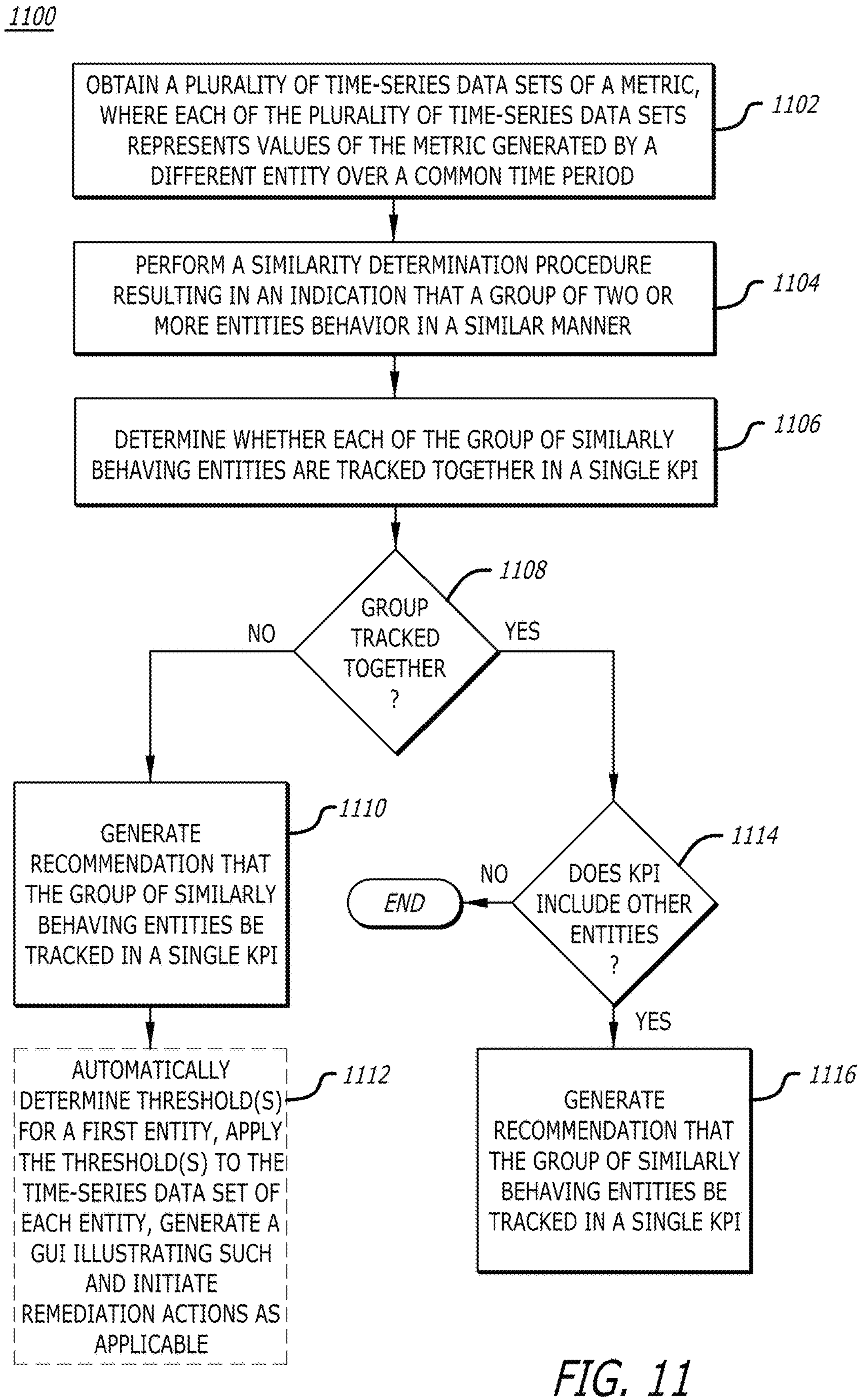
FIG. 11 is a flowchart illustrating example operations for performing a KPI recommendation process for similarly behaving entities according to an implementation of the disclosure.

Referring now to FIG. 11, a flowchart illustrating example operations for performing a KPI recommendation process for similarly behaving entities is shown according to an implementation of the disclosure. The example process 1100 can be implemented, for example, by a computing device that comprises a processor and a non-transitory computer-readable medium. The non-transitory computer readable medium can be storing instructions that, when executed by the processor, can cause the processor to perform the operations of the illustrated process 1100. Alternatively or additionally, the process 1100 can be implemented using a non-transitory computer-readable medium storing instructions that, when executed by one or more processors, case the one or more processors to perform the operations of the process 1100 of FIG. 11.

Each block illustrated in FIG. 11 represents an operation of the process 1100. It should be understood that not every operation illustrated in FIG. 11 is required. In fact, certain operations may be optional to complete aspects of the process 1100. The process 1100 begins with an operation of obtaining a plurality of time-series data sets of a metric, where each of the plurality of time-series data sets represents values of the metric generated by a different entity over a common time period (block 1102).

A similarity determination procedure is then performed resulting in an indication that a group of two or more entities behavior in a similar manner (block 1104). Based on the similarity determination procedure, a determination is made as to whether each of the group of similarly behaving entities are tracked together in a single KPI (block 1106). For example, the ITSI system 100 includes a KPI data store 240 that stores an entity-KPI mapping 244. The KPI management logic 130 may retrieve the entity-KPI mappings for a the similarly behaving entities and determination whether a mathematical intersection exists for a single KPI that includes each of the similarly behaving entities. When the similarly behaving entities are not determined to be group together in a single KPI (no at block 1108), a recommendation may be generated for an ITSI user that indicates the group of similarly behaving entities be tracked in a single KPI (block 1110). The process 1100 may then include operations of automatically determining adaptive thresholds for a first entity, apply the threshold(s) to the time-series data set of each entity, generate a GUI illustrating such, and initiate remediation actions as applicable (block 1112).

When the similarly behaving entities are determined to be group together in a single KPI (yes at block 1108), a determination is made as to whether any entities not included in the group of similarly behaving entities are also included in the single KPI (block 1114). When no additional entities are included (no at block 1114), the process 1100 ends. When additional entities are included (yes at block 1114), a recommendation may be generated for an ITSI user that indicates the group of similarly behaving entities be tracked in a single KPI (block 1116). The process 1100 may then include operations of automatically determining adaptive thresholds for a first entity, apply the threshold(s) to the time-series data set of each entity, generate a GUI illustrating such, and initiate remediation actions as applicable (block 1112).

Figure 12:
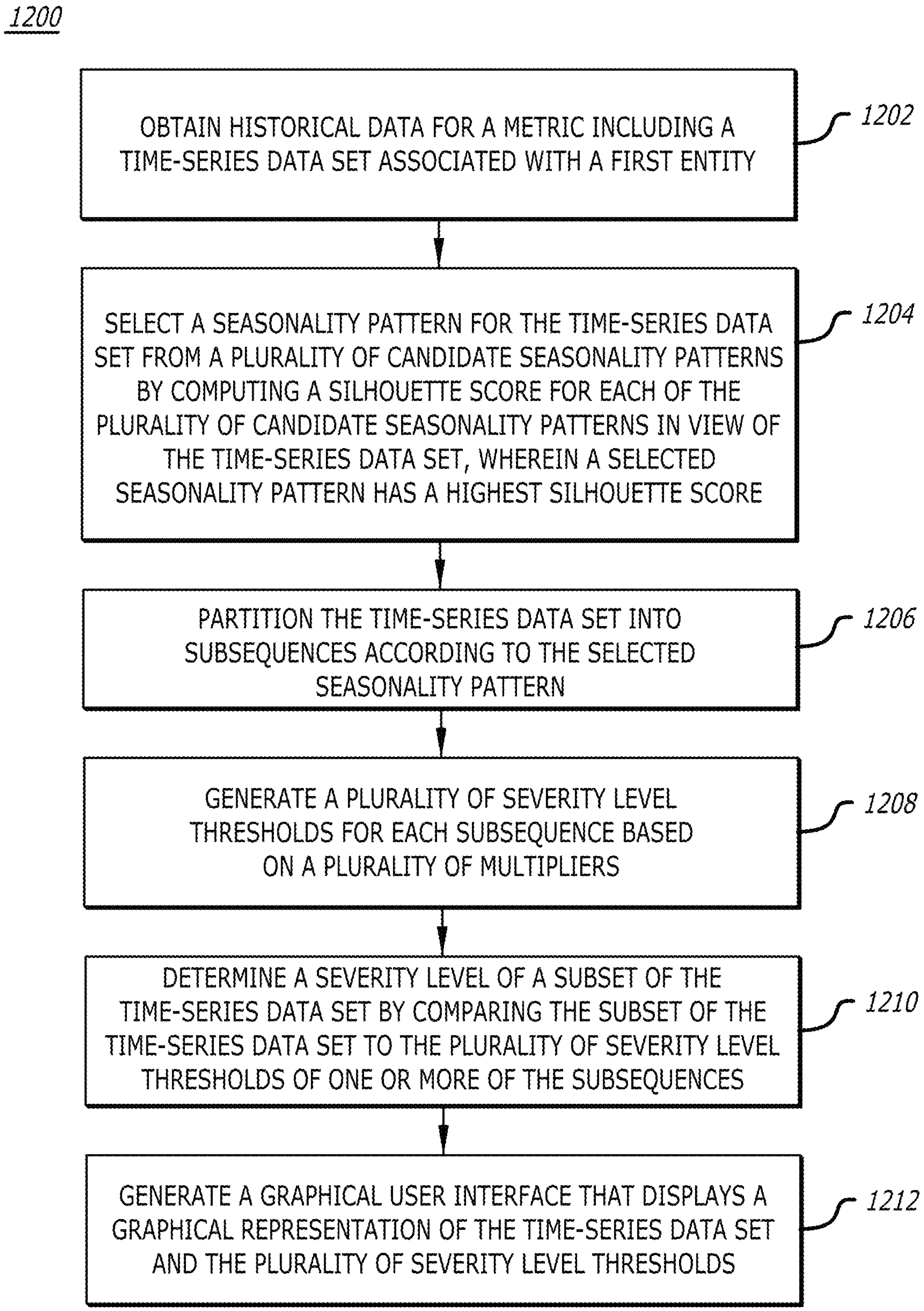
FIG. 12 is a flowchart illustrating example operations for performing an adaptive threshold generation process for a metric generated by or associated with an entity according to an implementation of the disclosure.

Referring to FIG. 12, a flowchart illustrating example operations for performing an adaptive threshold generation process for a metric generated by or associated with an entity is shown according to an implementation of the disclosure. The example process 1200 can be implemented, for example, by a computing device that comprises a processor and a non-transitory computer-readable medium. The non-transitory computer readable medium can be storing instructions that, when executed by the processor, can cause the processor to perform the operations of the illustrated process 1200. Alternatively or additionally, the process 1200 can be implemented using a non-transitory computer-readable medium storing instructions that, when executed by one or more processors, case the one or more processors to perform the operations of the process 1200 of FIG. 12.

Each block illustrated in FIG. 12 represents an operation in the process 1200 performed by, for example, the ITSI system 100 of FIG. 1. It should be understood that not every operation illustrated in FIG. 12 is required. In fact, certain operations may be optional to complete aspects of the process 1200. The discussion of the operations of process 1200 may be done so with reference to any of the previously described figures. The process 1200 begins with an operation of obtaining historical data for a metric including a time-series data set associated with a first entity (block 1202). A seasonality pattern is selected for the time-series data set from a plurality of candidate seasonality patterns by computing a silhouette score for each of the plurality of candidate seasonality patterns in view of the time-series data set, wherein a selected seasonality pattern has a highest silhouette score (block 1204).

Following the selection of the seasonality pattern, the process 1200 includes performance of operations of partitioning the time-series data set into subsequences according to the selected seasonality pattern and generating a plurality of severity level thresholds for each subsequence based on a plurality of multipliers (blocks 1206, 1208). A severity level of a subset of the time-series data set is then determined by comparing the subset of the time-series data set to the plurality of severity level thresholds of one or more of the subsequences (block 1210). A graphical user interface is then generated that displays a graphical representation of the time-series data set and the plurality of severity level thresholds (block 1212).

In some examples, selecting the seasonality pattern for the time-series data includes, for each of the candidate seasonality patterns: partitioning the time-series data set into subsequences according to a corresponding candidate seasonality pattern, clustering the subsequences, and computing the silhouette score representing a quality of the clustering of the subsequences. In some instances, the subset of the time-series data set corresponds to a most recent time period of a time span covered by the time-series data set. The time span covered by the time-series data set may be a 30-day period and the most recent time period may be a most recent 24-hour block. The corresponding candidate seasonality pattern is a daily pattern, and the subsequences correspond to 24-hour blocks.

In some examples, the corresponding candidate seasonality pattern is a weekly pattern, and the subsequences correspond to 7-day blocks. Additional operations of the process 1200 may further comprise, for each of the subsequences, computing a mean of values of each subsequence of the time-series data set, and wherein the plurality of multipliers are generated based on the mean of each subsequence and one of a quantile computation, a standard deviation computation, a range computation, or a percentage computation.

Figure 13:
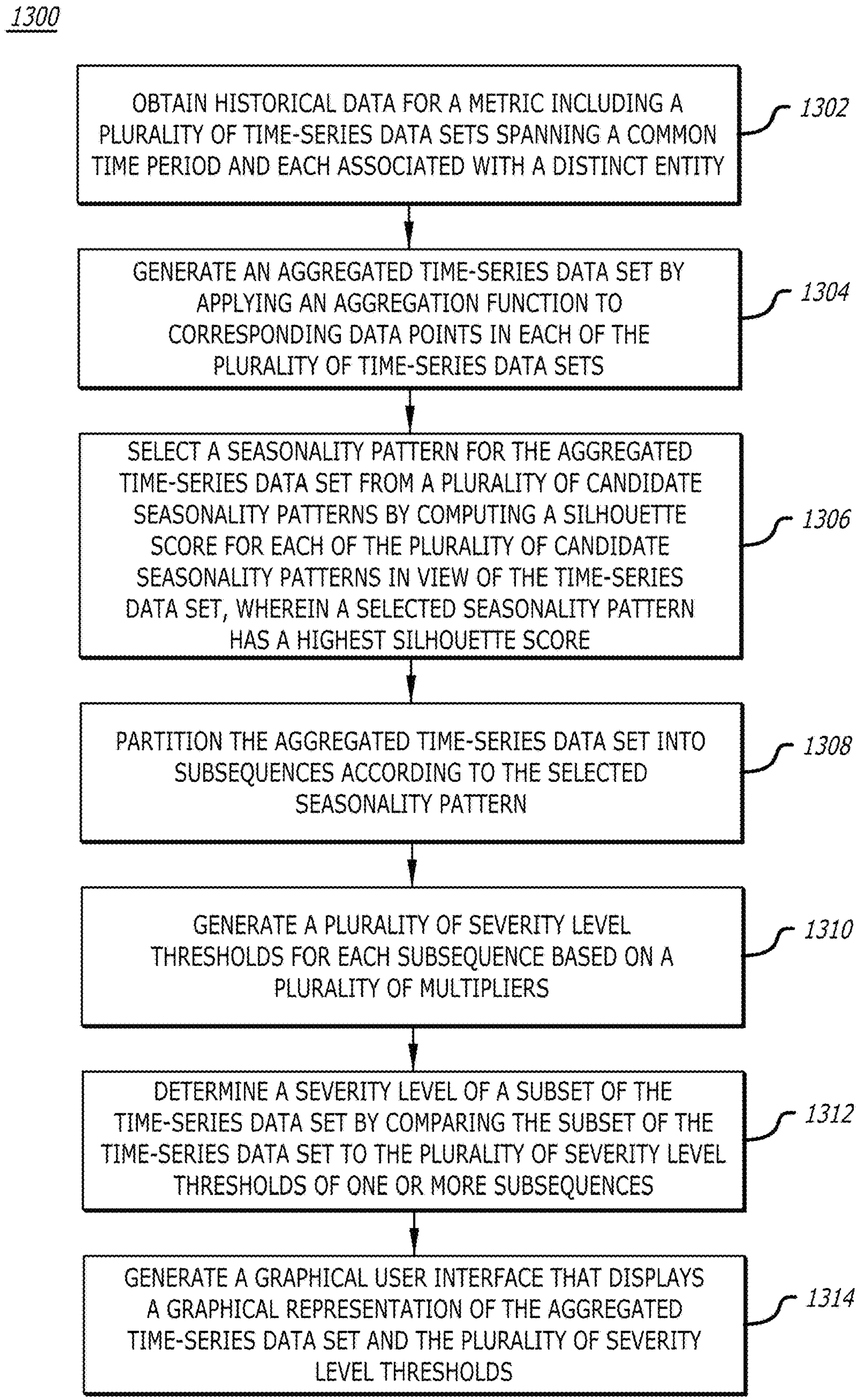
FIG. 13 is a flowchart illustrating example operations for performing an adaptive threshold generation process for an aggregated metric generated by or associated with a plurality of entities according to an implementation of the disclosure.

Referring to FIG. 13, a flowchart illustrating example operations for performing an adaptive threshold generation process for an aggregated metric generated by or associated with a plurality of entities according to an implementation of the disclosure. The example process 1300 can be implemented, for example, by a computing device that comprises a processor and a non-transitory computer-readable medium. The non-transitory computer readable medium can be storing instructions that, when executed by the processor, can cause the processor to perform the operations of the illustrated process 1300. Alternatively or additionally, the process 1300 can be implemented using a non-transitory computer-readable medium storing instructions that, when executed by one or more processors, case the one or more processors to perform the operations of the process 1300 of FIG. 13.

Each block illustrated in FIG. 13 represents an operation in the process 1300 performed by, for example, the ITSI system 100 of FIG. 1. It should be understood that not every operation illustrated in FIG. 13 is required. In fact, certain operations may be optional to complete aspects of the process 1300. The discussion of the operations of process 1300 may be done so with reference to any of the previously described figures. The process 1300 begins with an operation of obtaining historical data for a metric including a plurality of time-series data sets spanning a common time period and each associated with a distinct entity (block 1302). Subsequently, an aggregated time-series data set is generated by applying an aggregation function to corresponding data points in each of the plurality of time-series data sets (block 1304).

The process 1300 further includes selecting a seasonality pattern for the aggregated time-series data set from a plurality of candidate seasonality patterns by computing a silhouette score for each of the plurality of candidate seasonality patterns in view of the time-series data set, wherein a selected seasonality pattern has a highest silhouette score (block 1306).

Following the selection of the seasonality pattern, the aggregated time-series data set is partitioned into subsequences according to the selected seasonality pattern (block 1308). As discussed above with respect to FIGS. 9A-9C, partitioning of the aggregated time-series data includes subdividing the time-series data set into time blocks (subsequences) according to the seasonality pattern. Thus, referring to FIG. 9B, a seasonality pattern is shown overlayed on an example time-series data set with the seasonality pattern being a pattern comprising a number of hours, i.e., a set of 12-hour blocks with the upper value indicating working hours and the lower values indicating off hours. The time-series data set is partitioned (subdivided) into subsequences, e.g., subsequences of 12-hour blocks. Stated differently, the partitioning subdivides the time-series data set into subsequences (blocks of time) according to the seasonality pattern, such as 12-hour blocks, and subsequently clusters the subsequences into two or more groups.

Following the partitioning of the aggregated time-series data set, a plurality of severity level thresholds for each subsequence are generated based on a plurality of multipliers, and a severity level of a subset of the time-series data set is determined by comparing the subset of the time-series data set to the plurality of severity level thresholds of one or more subsequences (blocks 1310-1312). Following the determination of the severity level of at least the subset of the time-series data set, a graphical user interface is generated that displays a graphical representation of the aggregated time-series data set and the plurality of severity level thresholds (block 1314).

In some embodiments, selecting the seasonality pattern for the aggregated time-series data includes, for each of the candidate seasonality patterns, operations are performed including partitioning the aggregated time-series data set into subsequences according to a corresponding candidate seasonality pattern, clustering the subsequences, and computing the silhouette score representing a quality of the clustering of the subsequences.

In some examples, the process 1300 may include an additional operation of clustering the subsequences resulting in two or more clusters, and wherein computing the silhouette score for a first candidate seasonality pattern includes (i) computing a silhouette score for data points of the aggregated time-series data set, and (ii) determining a mean or a medium of the silhouette scores for the data points. In some examples, computing the silhouette score for the first data point of the data points comprising the time-series data set includes: determining, for each cluster, an average distance between the first data point and data points belonging to clusters to which the first data point does not belong, and dividing (a) a difference between (i) a minimum of the average distances between the first data point and the data points belonging to the clusters to which the first data point does not belong, and (ii) an average distance between the first data point and the other data points belonging to a cluster to which the first data point does belong, by (b) a maximum of (i) the minimum of the average distances between the first data point and the data points belonging to the clusters to which the first data point does not belong, and (ii) the average distance between the first data point and the other data points belonging to the cluster to which the first data point does belong.

Generating the plurality of severity level thresholds for each subsequence may be performed based on one of a standard deviation, a quantile algorithm, or a range algorithm. The aggregation function may be one of average, count, distinct count, earliest, latest, maximum, medium, minimum, percentile, sum, or standard deviation. The process 1300 may comprise an additional operation of, responsive to determining of the severity level, initiating an automated remediation operation.

III. Drift Detection

Figure 14:
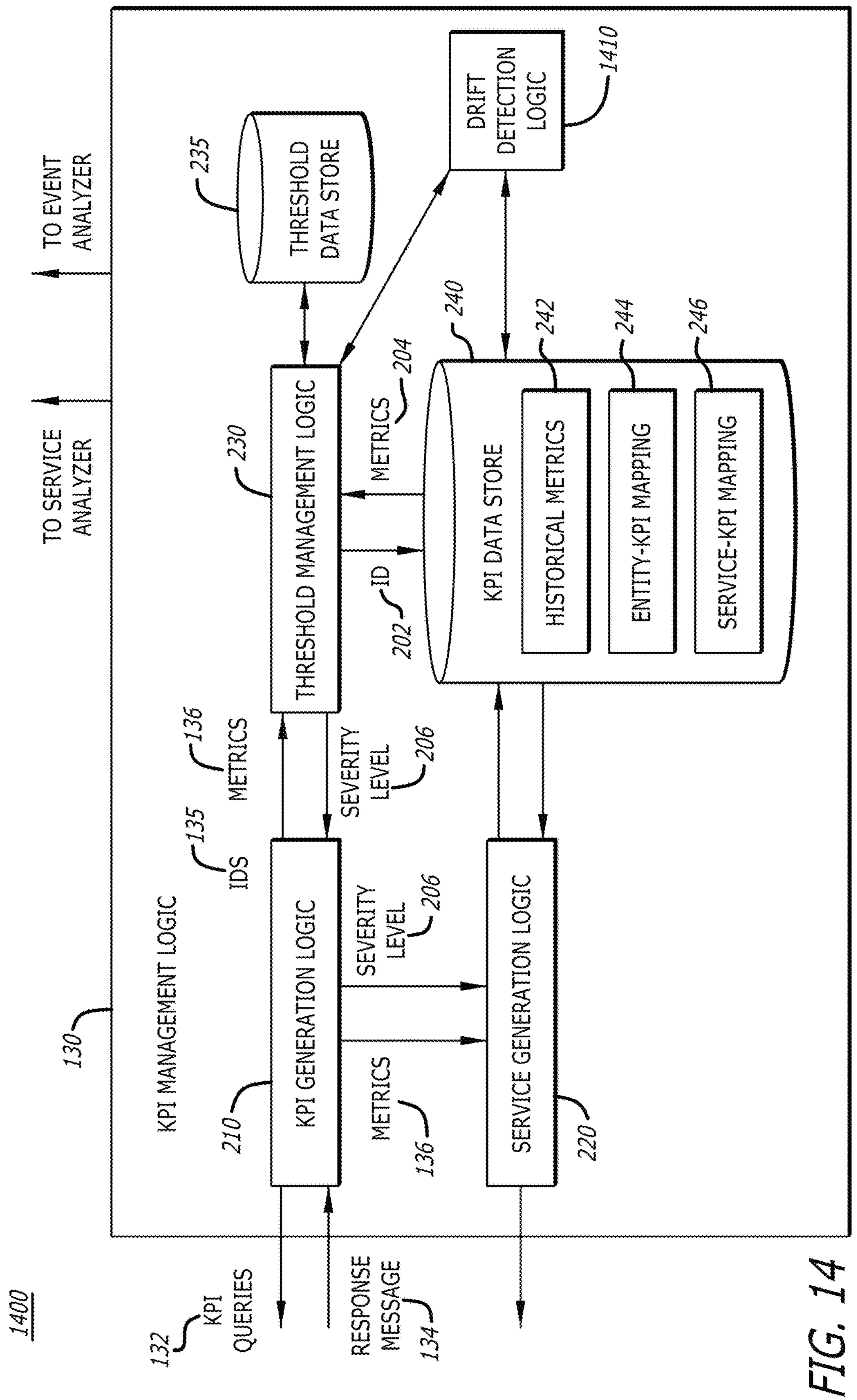
FIG. 14 is a block diagram illustrating an example operational flow of information between logic components within the KPI management logic including a drift detection logic according to some examples.

Referring now to FIG. 14, a block diagram 1400 illustrating an example operational flow of information between logic components within the KPI management logic including a drift detection logic is shown according to some examples. The KPI management logic (KPI manager) 130 is shown to include the same logic components as discussed in the implementation illustrated in FIG. 2 and is shown to further include a drift detection logic 1410. The components illustrated in the KPI manager 130 in FIG. 14 having a common reference numeral as those illustrated in FIG. 2 should be understood to have the same functionality and operate in the same manner as discussed above. For example, the KPI manager 130 of FIG. 14 may be configured to (i) transmit KPI queries 132 to the data intake and query system 170, (ii) receive response messages 134 from the data intake and query system 170, and (ii) facilitate processing of metrics 136 by communicating the metrics 136 and corresponding entity IDs 135 to a threshold management logic 230 and/or a service generation logic 220. In addition to the service generation logic 220 and the threshold management logic 230, the KPI manager 130 is shown to include a threshold data store 235 and a KPI data state 240, which is configured to store historical metrics 242, entity-KPI mappings 244, and service-KPI mappings 246.

In addition to the functionality of the KPI manager 130 discussed above or elsewhere in various implementations, the KPI manager 130 of FIG. 14 includes the drift detection logic 1410 that is configured to monitor changes in time-series data over an extended period of time and detect that a particular metric is experiencing drift, e.g., changing in an amount that exceeds a threshold comparison. The drift detection manager 1410 may operate on predetermined intervals, e.g., executes to review a particular metric or KPI on a daily, weekly, semi-weekly, monthly, etc., basis. In some implementations, the KPI manager 130 may receive user input that prompts the drift detection logic 1410 to initiate a process of analyzing historical data for a metric or KPI. As should be understood, the term metric as used herein refers to a metric generated by or associated with a single entity and an aggregated entity metric formed through an aggregation of metrics generated by or associated with a plurality of entities.

In some implementations, the drift detection logic 1410 may be communicatively coupled with the threshold management logic 230 and the KPI data store 240. The drift detection logic 1410 may operate by retrieving historical data for a particular metric or KPI over an extended period of time from the KPI data store 240, which may be characterized as typically being a longer period of time than is used in generating adaptive thresholds. For example, the adaptive threshold generation process discussed above typically retrieves 30-days of historical time-series data for use in generating the plurality of severity level thresholds. However, the drift detection logic 1410 may retrieve 60 days, 90 days, 180 days, or more of historical data on which to perform a drift detection process. Thus, in a first example, the drift detection logic 1410 retrieves historical time-series data generated over a span of a prior 180-days.

The drift detection logic 1410 may perform various analyses in determining whether data drift of a metric over the extended historical period of time has occurred. As one example analysis, the drift detection logic 1410 may partition the time-series data into subsequences using the seasonality pattern detection discussed above, compute a statistical measure of the data values for each subsequence (where the statistical measure may be a mean, median, mode, max, min, etc.), and, for each subsequence, deploy a machine learning model to determine whether a trend of data drift has occurred by providing the mean values for the set of threshold subsequences over the extended historical time period as input. In another example analysis, the drift detection logic 1410 may partition the time-series data into subsequences using the seasonality pattern detection discussed above and provide the subsequences themselves as input to a machine learning model. Example machine learning models may include a neural network, a support vector machine, a decision tree, random forest, etc. In some instances, such an example may be performed on a daily, a weekly, or a monthly basis as well as other intervals. In such examples, the machine learning model is configured and trained to provide a prediction as to whether data drift has occurred.

As yet another example analysis, the drift detection logic 1410 may partition the time-series data into subsequences using the seasonality pattern detection discussed above, compute the mean of the data values for each subsequence, and for each subsequence, determine the difference between the mean of a subsequence within a most recent 24 hours and the mean of the corresponding subsequence within the oldest 24 hours (e.g., 180 days ago), which provides an indication as to how much the thresholds have changed over the past 180-days. Each difference may be compared to a difference threshold, or it may be determined whether each difference exceeds a determined percentage of the mean of the subsequence from the oldest 24 hours. In further examples, the drift detection logic 1410 may partition the time-series data into subsequences using the seasonality pattern detection discussed above, determine a difference between values of data points within an earliest-in-time subsequence and values of corresponding data points within a latest-in-time subsequence. A count may be performed indicating a number of the differences that exceed a threshold amount or percentage.

In examples comparing values of data points of subsequences, the term "corresponding data points" refers to two data points in two separate subsequences that each correspond to a same time frame within a seasonality, where a first subsequence is earlier-in-time than the other subsequence. As discussed above, a time-series data set is partitioned in subsequences according to a seasonality pattern, which repeats over time, e.g., hourly, 12-hrs, daily, weekly, monthly, etc., such that an earliest-in-time subsequence has a corresponding latest-in-time subsequence that pertains to a hourly, daily, weekly, etc., time frame at a later point in time.

The various examples discussed above result in either a probability, a difference, a count, or a percentage difference, which may be compared to a distinct threshold (e.g., a probability threshold, a difference threshold, a count threshold, or a percentage threshold). Based on a result of the threshold comparison (e.g., the probability exceeds a threshold probability), the drift detection logic 1410 determines that data drift has occurred.

In one example, a drift detection procedure performed by the drift detection logic 1410 includes performing a first operation of piecewise linear approximation (PLA) fit to identify the segments of the time series, where each segment exhibits a substantially similar type of behavior (e.g., constant increasing trend, or staying flat) and performing a second operation of removing outliers through Smoothed Normalized Deviation (SND). As a result of the SND operation, the result of PLA becomes simpler with fewer segments, which reduces the number of drift detections (e.g., reducing false positives that would otherwise have been flagged due to a blip (minor change) in the data compared to a sustained change). A third operation may include performing a window-based level drift detection by comparing two adjacent segments in the PLA and determining whether there is a large change between the adjacent segments (e.g., change that satisfies a threshold comparison, such as meeting or exceeding a threshold). A fourth operation may include splitting the time series each time that a level drift has been identified and also identifying trend drifts such as increasing gradually with a slope of 1 (or other defined slope). A fifth operation may include identifying accumulated drifts (sometimes an individual trend or level drift may not be enough to exceed the threshold, but if we have several of them in a row, cumulatively the set of trends or level drifts exceed the threshold).

Figure 15:
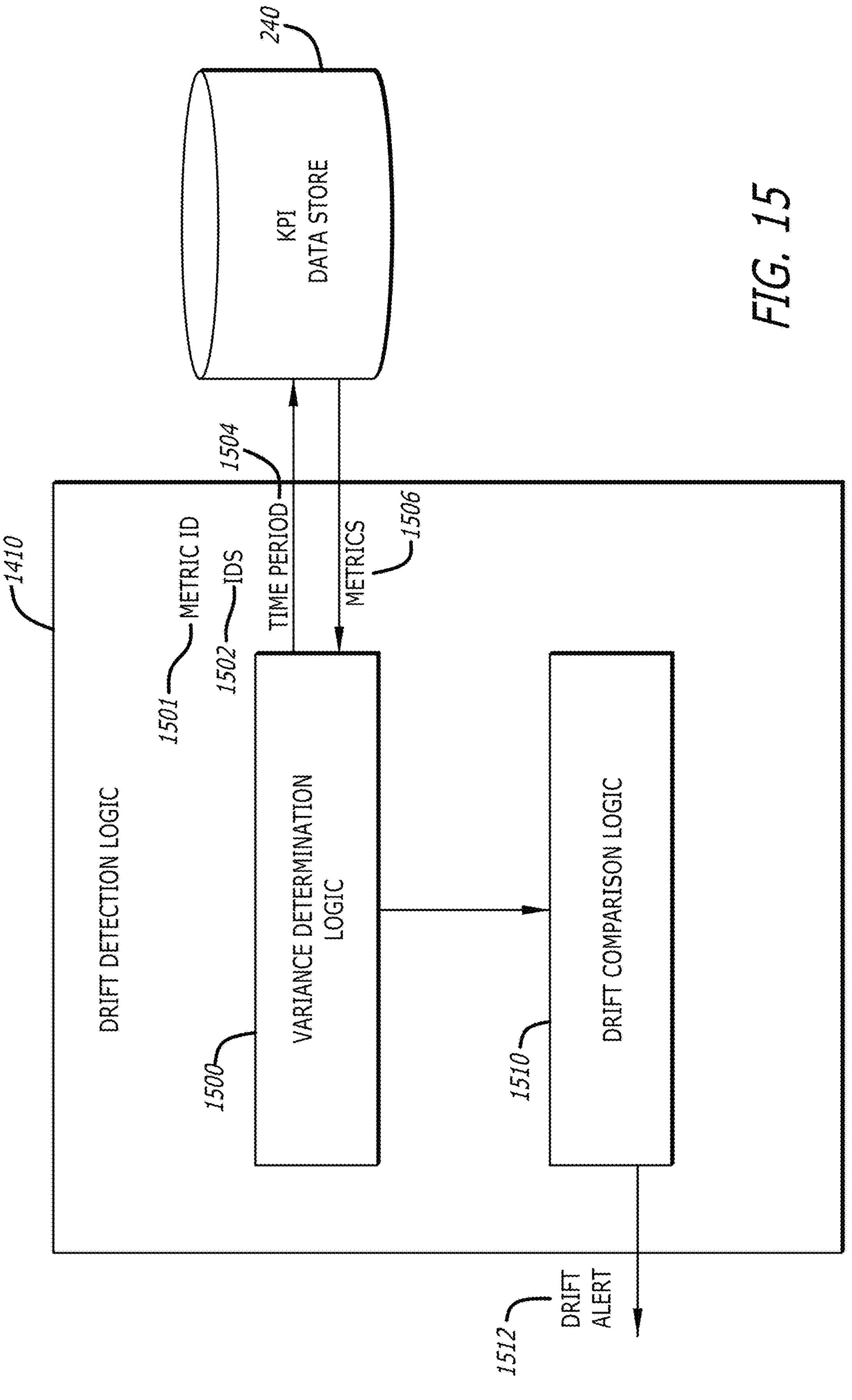
FIG. 15 is a block diagram illustrating an example operational flow of information between logic components within the drift detection logic of FIG. 14 according to some examples.

Referring now to FIG. 15, a block diagram illustrating an example operational flow of information between logic components within the drift detection logic of FIG. 14 is shown according to some examples. FIG. 15 illustrates detail of the logic components forming the drift detection logic 1410 and the operability thereof. In particular, the drift detection logic 1410 is shown to include a threshold variance determination logic 1500 and a drift threshold comparison logic 1510.

The threshold variance determination logic 1500 may be configured, upon execution of one or more processors (not shown) to initiate analysis of a particular metric or KPI. As noted above, the drift detection logic 1410 may execute at regular intervals, e.g., obtain historical time-series data for a particular metric or KPI over an extended period of time on a daily basis, a weekly basis, a monthly basis, etc. As illustrated, the variance determination logic 1500 may be coupled with the KPI data store 240 and configured to query the KPI data store 240 with a metric (or KPI) ID 1501, one or more entity IDs 1502 and a time period 1504. In return, the variance determination logic 1500 receives a set of metrics, e.g., the historical time-series data over the extended period of time corresponding to the metric ID 1501. As discussed above with respect to FIG. 14, the variance determination logic 1500 may partition the historical time-series data into subsequences and utilize a machine learning model to predict whether data drift has occurred. As an alternative, the variance determination logic 1500 may partition the historical time-series data into subsequences and determine differences between the mean values of the corresponding subsequences of the earliest-in-time time-series data set and the latest-in-time time-series data set.

The drift comparison logic 1510 may receive data from the variance determine logic 1500 and determine whether a drift alert 1512 is to be generated. In some instances, the first comparison logic 1510 receives the prediction from a machine learning model of the variance determination logic 1500 and compares the output, e.g., one or more probabilities, to an alert threshold, where the results of the comparison indicate whether the drift alert 1512 is to be generated. In other instances, the drift comparison logic 1510 receives the differences between the means of the subsequences within a most recent 24 hours and the means of the corresponding subsequences within the oldest 24 hours (e.g., 180 days ago), and compares each difference to a difference threshold. When a threshold number of differences is met or exceeded, the drift comparison logic 1510 indicates that the drift alert 1512 is to be generated. Alternatively, the drift comparison logic 1510 may determine whether each difference between means of corresponding subsequences of an earliest-in-time time-series data set and a latest-in-time time-series data set exceeds a determined percentage of the mean of the subsequence of the earliest-in-time time-series data set. When a threshold number or a percentage of the subsequences exceeds the determined percentage, the drift detection logic 1410 determines that data drift has occurred and indicates that a drift alert 1512 is to be generated.

As should be understood, the various threshold implemented by the drift comparison logic 1510 may be predetermined and stored in a configuration file, e.g., stored in the KPI data store 240 or the threshold data store 235. In other examples, the thresholds may be provided or adjusted by a user. For example, a user provides user input that alters the thresholds provided in a configuration file to allow for greater (or less) drift in the metric data before generating an alert indicating that data drift has occurred.

Figure 16:
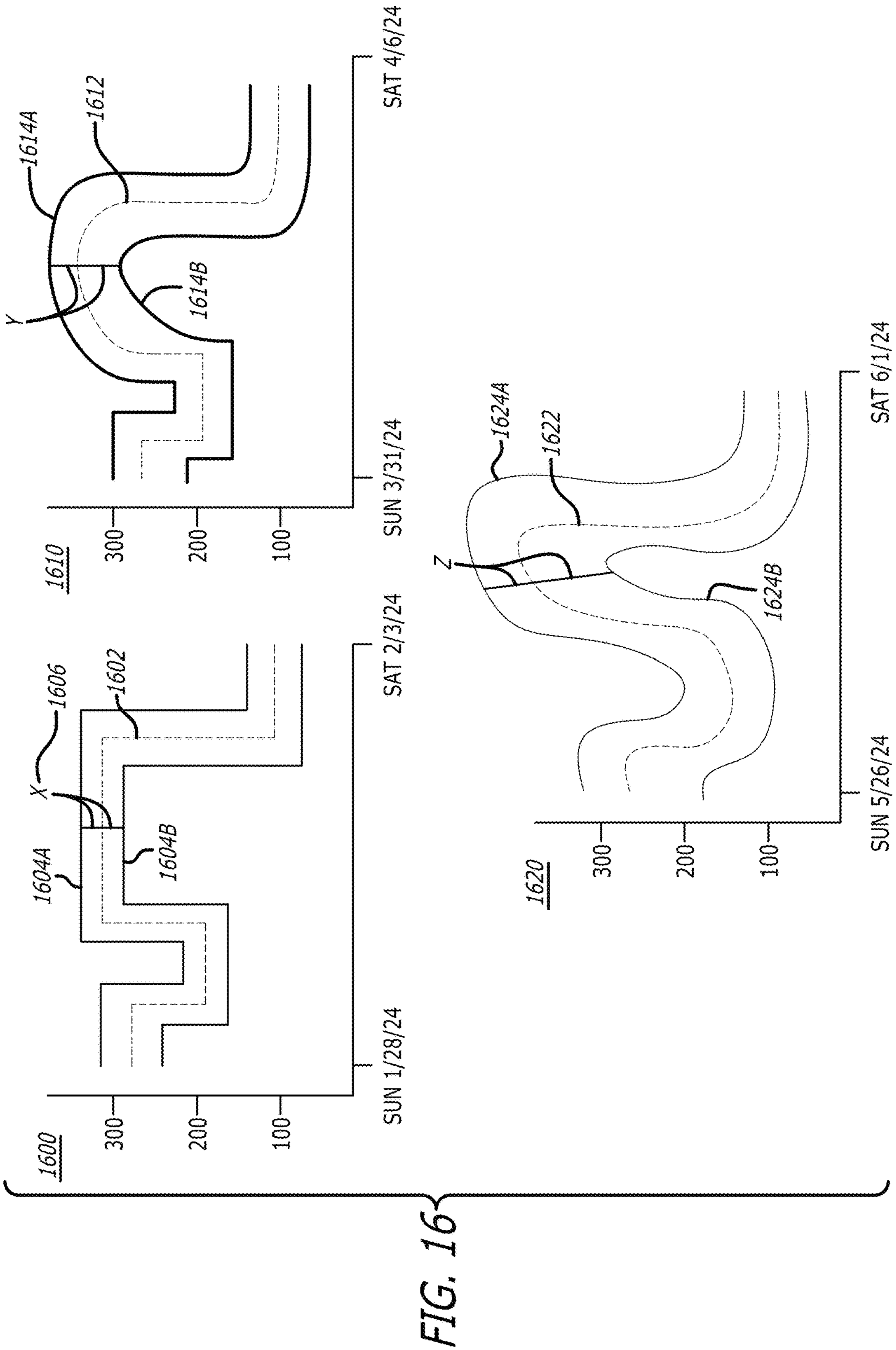
FIG. 16 illustrates an example set of thresholds for a metric represented graphically illustrates drift of the underlying time-series data over an extended historical period of time according to some examples.

Referring now to FIG. 16, an example set of thresholds for a metric represented graphically illustrates drift of the underlying time-series data over an extended historical period of time is shown according to some examples. FIG. 16 illustrates three thresholds represented graphically 1600, 1610, and 1620. A first graphical representation 1600 illustrates an upper and lower threshold 1604A, 1604B generated through the adaptive threshold generation process discussed above for a first metric over a first time period of seven days, e.g., Jan. 28, 2024-Feb. 3, 2024. In the example graphical representation 1600, a first operating range may be established between the upper and lower thresholds 1604A, 1604B with the x representing the distance between the time-series data 1602 of the metric and the thresholds 1604A, 1604B for the first time period.

Referring now to the second graphical representation 1610, an upper and lower threshold 1614A, 1614B generated through the adaptive threshold generation process discussed above for the first metric over a second time period of seven days, e.g., Mar. 31, 2024-Apr. 6, 2024. In the example graphical representation 1610, a first operating range may be established between the upper and lower thresholds 1614A, 1614B with the y representing the distance between the time-series data 1612 of the metric and the thresholds 1614A, 1614B for the second time period. As can be seen, the thresholds 1614A, 1614B have changed slightly as a result of the modification of the historical data used in the generation of the thresholds 1614A, 1614B relative to the historical data used in the generation of the thresholds 1604A, 1604B.

Finally, referring now to the third graphical representation 1620, an upper and lower threshold 1624A, 1624B generated through the adaptive threshold generation process discussed above for the first metric over a third time period of seven days, e.g., May 26, 2024-Jun. 1, 2024. In the example graphical representation 1620, the first operating range is shown between the upper and lower thresholds 1624A, 1624B with z representing the distance between the time-series data 1622 of the metric and the thresholds 1624A, 1624B for the third time period. As can be seen, the thresholds 1614A, 1614B have changed substantially as a result of the modification of the historical data used in the generation of the thresholds 1624A, 1624B relative to the historical data used in the generation of the thresholds 1604A, 1604B. The operations performed by the drift detection logic 1410 would determine whether data drift has occurred.

Figure 17:
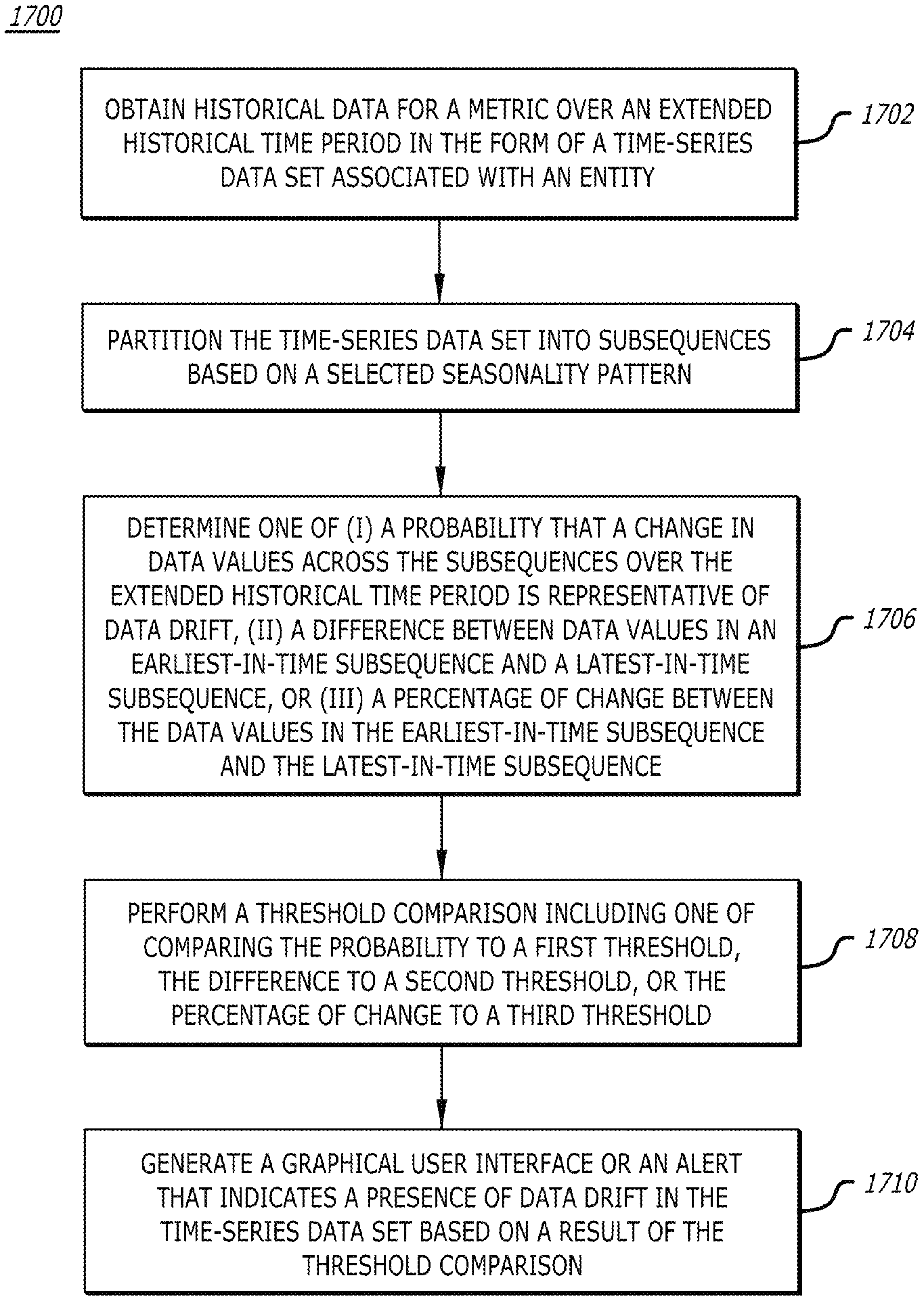
FIG. 17 is a flowchart illustrating example operations for performing a drift detection procedure according to an implementation of the disclosure.

Referring now to FIG. 17, a flowchart illustrating example operations for performing a drift detection procedure is shown according to an implementation of the disclosure. The example process 1700 can be implemented, for example, by a computing device that comprises a processor and a non-transitory computer-readable medium. The non-transitory computer readable medium can be storing instructions that, when executed by the processor, can cause the processor to perform the operations of the illustrated process 1700. Alternatively or additionally, the process 1700 can be implemented using a non-transitory computer-readable medium storing instructions that, when executed by one or more processors, case the one or more processors to perform the operations of the process 1700 of FIG. 17.

Each block illustrated in FIG. 17 represents an operation in the process 1700 performed by, for example, the ITSI system 100 of FIG. 1. It should be understood that not every operation illustrated in FIG. 17 is required. In fact, certain operations may be optional to complete aspects of the process 1700. The discussion of the operations of process 1700 may be done so with reference to any of the previously described figures. The process 1700 begins with operations of obtaining historical data for a metric over a historical time period in the form of a time-series data set associated with an entity and partitioning the time-series data set into subsequences based on a selected seasonality pattern (blocks 1702, 1704).

Following partitioning of the time-series data set, the process 1700 includes determining one of (i) a probability that a change in data values across the subsequences over the extended historical time period is representative of data drift, (ii) a difference between data values in an earliest-in-time subsequence and a latest-in-time subsequence, or (iii) a percentage of change between the data values in the earliest-in-time subsequence and the latest-in-time subsequence (block 1706). Based on the determination, a threshold comparison is performed that includes one of comparing the probability to a first threshold, the difference to a second threshold, or the percentage of change to a third threshold (block 1708). A graphical user interface or an alert that indicates a presence of the drift in values of the first severity level threshold across the time-series data set is then generated when the drift in the values satisfies the threshold comparison (block 1710).

In some examples, the probability is determined by a machine learning model configured to receive as input either (i) the subsequences, or (ii) a computed statistical measure representative of data values comprising the subsequences, and wherein performing the threshold comparison includes comparing the probability to the first threshold. In some instances, determining the difference between the data values in the earliest-in-time subsequence and the latest-in-time subsequence includes: determining a computed statistical measure representative of data values comprising the earliest-in-time subsequence, determining a computed statistical measure representative of data values comprising the latest-in-time subsequence, and determining a difference between the computed statistical measures for the earliest-in-time subsequence and the latest-in-time subsequence. Additionally, performing the threshold comparison may include comparing the difference between the computed statistical measures for the earliest-in-time subsequence and the latest-in-time subsequence to the second threshold.

In some examples, determining the difference between the data values in the earliest-in-time subsequence and the latest-in-time subsequence includes determining a difference between individual data values of the earliest-in-time subsequence and corresponding individual data values of the latest-in-time subsequence. In some instances, the percentage of change between the data values in the earliest-in-time subsequence and the latest-in-time subsequence is determined, and wherein the percentage of change is compared to a third threshold. The selected seasonality pattern may have been previously determined during performance of an adaptive threshold generation process that resulted in generation of a plurality of severity level thresholds for a portion of the time-series data set.

IV. Alert Correlation

Figure 18:
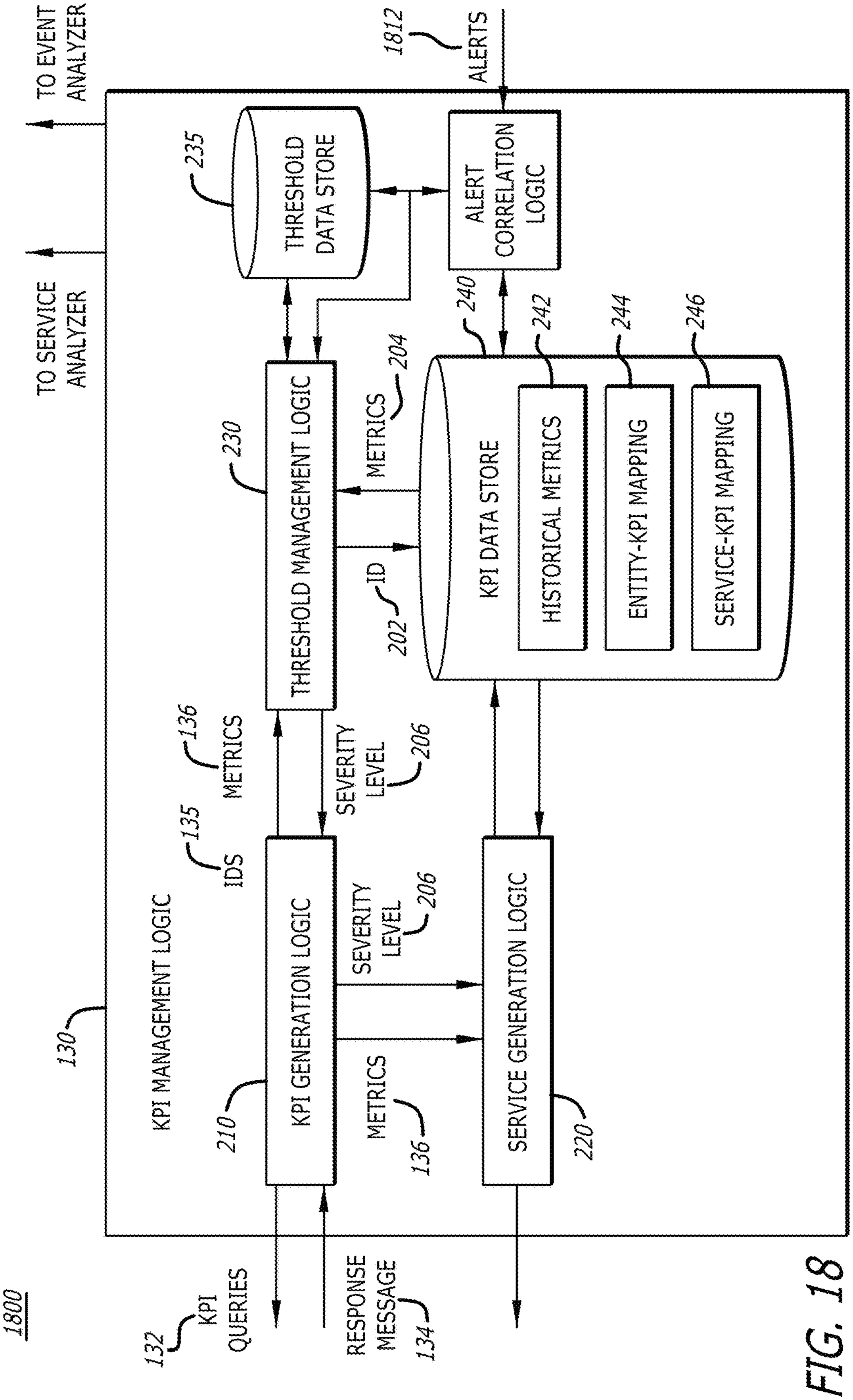
FIG. 18 is a block diagram illustrating an example operational flow of information between logic components within the KPI management logic including an alert correlation logic according to some examples.

Referring to FIG. 18, a block diagram 1800 illustrating an example operational flow of information between logic components within the KPI management logic including an alert correlation logic is shown according to some examples. The KPI management logic (KPI manager) 130 is shown to include the same logic components as discussed in the implementation illustrated in FIG. 2 and is shown to further include an alert correlation logic 1810. The components illustrated in the KPI manager 130 in FIG. 18 having a common reference numeral as those illustrated in FIG. 2 should be understood to have the same functionality and operate in the same manner as discussed above. For example, the KPI manager 130 of FIG. 18 may be configured to (i) transmit KPI queries 132 to the data intake and query system 170, (ii) receive response messages 134 from the data intake and query system 170, and (ii) facilitate processing of metrics 136 by communicating the metrics 136 and corresponding entity IDs 135 to a threshold management logic 230 and/or a service generation logic 220. In addition to the service generation logic 220 and the threshold management logic 230, the KPI manager 130 is shown to include a threshold data store 235 and a KPI data state 240, which is configured to store historical metrics 242, entity-KPI mappings 244, and service-KPI mappings 246.

In addition to the functionality of the KPI manager 130 discussed above or elsewhere in various implementations, the KPI manager 130 of FIG. 18 includes the alert correlation logic 1810 that is configured to correlate one or more alerts to a particular metric or KPI and determine whether the one or more alerts should trigger an alteration of thresholds generated for the metric or KPI. In some examples, the correlation is further utilized in determining whether certain portions of a time-series data set should be excluded from use in generating future thresholds for the metric or KPI.

The alert correlation logic 1810 may operate on predetermined intervals, e.g., executes to correlate one or more alerts to a particular metric or KPI on a daily, weekly, semi-weekly, monthly, etc., basis. In some implementations, the KPI manager 130 may receive user input that prompts the alert correlation logic 1810 to initiate its processing. In yet further implementations, the alert correlation logic 1810 may initiate its processing in response to receipt of one or more alerts 1812. As should be understood, the term metric as used herein refers to a metric generated by or associated with a single entity and an aggregated entity metric formed through an aggregation of metrics generated by or associated with a plurality of entities.

In some implementations, the alert correlation logic 1810 may be communicatively coupled with the threshold management logic 230 and the KPI data store 240. The alert correlation logic 1810 may operate by obtaining alerts 1812 and retrieving historical data for a particular metric or KPI for a period of time associated with the alerts 1812 from the KPI data store 240, which may be characterized as being a period of time prior to the earliest-in-time alert, a period of time subsequent to the latest-in-time alert, and the period of time therebetween. Thus, the alert correlation logic 1810 may be configured to correlate the alerts 1812 with historical metric data to identify a portion of the historical metric data that pertains to the alerts 1812, and determine whether any alterations to thresholds should be made or whether any historical data should be excluded from future threshold generation, such as the adaptive threshold generation process described herein. The alerts 1812 may indicate a change in values of a portion of the time-series data set that differ from expected behavior (e.g., outside of a normal operating range based on adaptive threshold generation using historical data). As one example, the time-series data set for network traffic may experience an expected increase in network traffic to an enterprise website, which would normally be flagged as anomalous behavior; however, an alert 1812 may indicate that around the time of the increase in network traffic, a launch of a new product on the enterprise website occurred, which likely acted as a benign reason for the increase. As a result, the ITSI system 100 may merely forego generating alerts the metric is operating outside of a normal severity range or reduce the number of alerts.

As another example, an aggregated entity metric may pertain to CPU usage of a plurality of CPUs comprising a server. The corresponding aggregated time-series data set may indicate that the server is operating in a high severity level while an alert 1812 that correlates to a similar time frame as the increase in CPU usage may indicate that one of the plurality of CPUs is experiencing unexpected downtime. Thus, the ITSI system 100 may provide intelligent alerts indicating that the server is operating at a high severity level with an indication that the likely root cause is the unexpected downtime of a particular CPU. In some instances, as a result of the determination of the root cause of the server operating at a high severity level being unexpected downtime of a particular CPU, the ITSI system 100 may automatically cause operations to be performed to reroute some processing to an alternative server.

Based on the correlation between the alerts 1812 and the historical metric data, numerous remediation actions may be taken to avoid or minimize unnecessary alerts from the ITSI system 100 of FIG. 1, which serves to improve the ability of the ITSI system 100 to accurately and efficiently provide alerts of anomalous behavior to users. Example remediation actions that may be taken or caused to be performed include expanding or contracting thresholds, foregoing (silencing) or reducing the number of alerts for a period of time that correlates to the alerts 1812, excluding historical data from generation of adaptive thresholds in the future, or altering historical data (e.g., anomalous values correlating to the alerts) to avoid negative effects of the anomalous values on generation of adaptive thresholds in the future.

Figure 22:
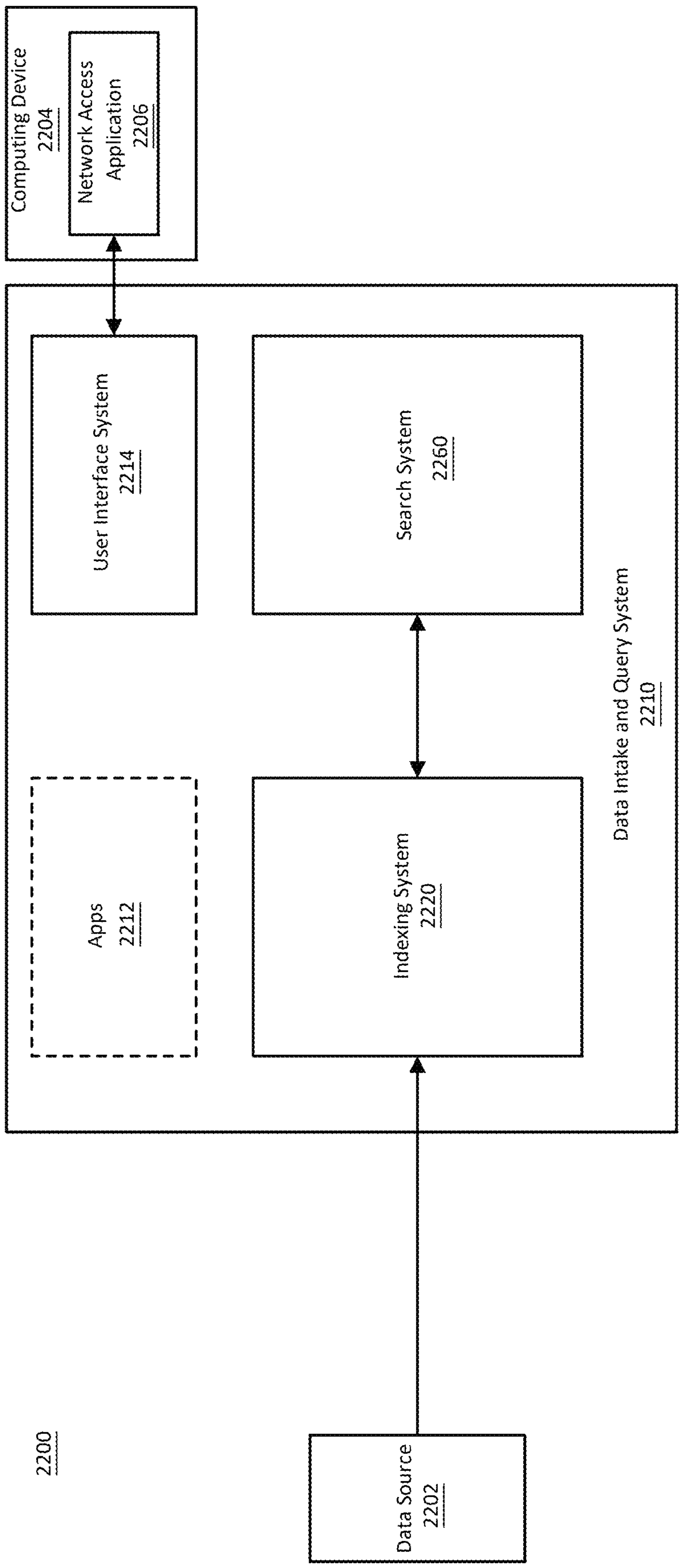
FIG. 22 is a block diagram illustrating an example computing environment that includes a data intake and query system according to an implementation of the disclosure.

In some examples, the alerts 1812 are ingested by way of a data intake and query system 2210 as shown in FIG. 22. Additionally, the alerts 1812 may be ingested from third-party products, such as Nagios and SCOM, into the ITSI system 100, and particularly the alert correlation logic 1810, as notable events.

Figure 19:
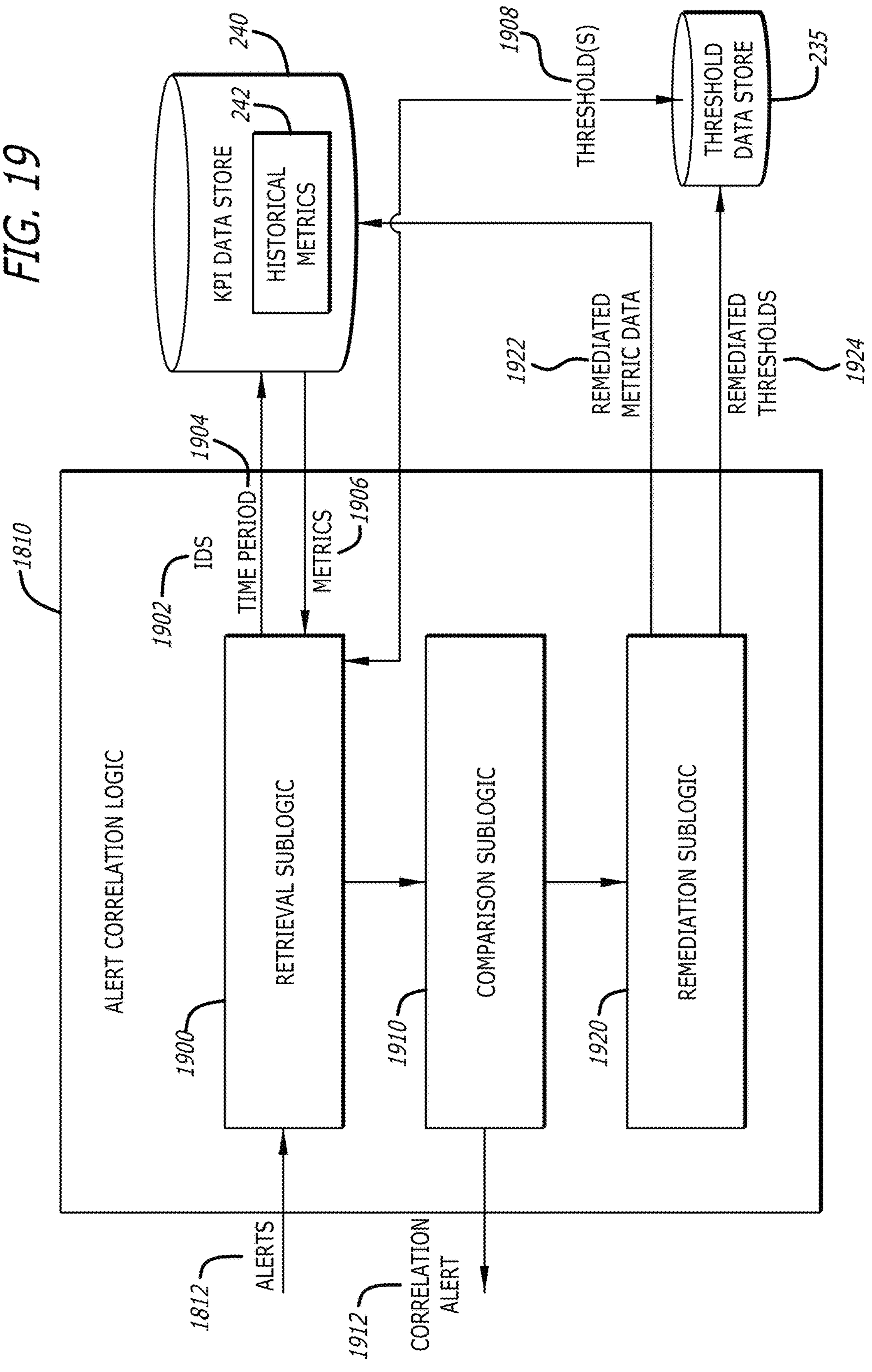
FIG. 19 is a block diagram illustrating an example operational flow of information between logic components within the alert correlation logic of FIG. 18 according to some examples.

Referring now to FIG. 19, a block diagram illustrating an example operational flow of information between logic components within the alert correlation logic of FIG. 18 is shown according to some examples. FIG. 19 illustrates detail of the logic components forming the alert correlation logic 1810 and the operability thereof. In particular, the alert correlation logic 1810 is shown to include a retrieval sublogic 1900, a comparison sublogic 1910, and a remediation sublogic 1920.

The retrieval sublogic 1900 may be configured, upon execution of one or more processors (not shown) to receive one or more alerts 1812 and identify a timestamp associated with the alerts 1812. From the timestamps, the retrieval sublogic 1900 identifies a timeframe corresponding to the alerts 1812, which is highly indicative of a timeframe of an event that may be affect one or more entities, which in turn may affect time-series data generated or associated with the one or more entities. In some examples, the alerts 1812 may include an entity identifier 1902 or other text that may be utilized to identify relevant entities. For example, an alert 1812 may indicate that a particular CPU is experiencing unexpected downtime, in which case an identifier of the CPU may be included in the alert. In such an example, the retrieval sublogic 1900 may extract the entity ID, determine a time period of the unexpected downtime, and transmit a request to the KPI data store 235, where the request includes the entity ID 1902 and a time period 1904. In response, one or more metrics 1906 associated with the entity ID 1902 and the time period 1904 are returned. Additionally, the retrieval sublogic 1900 may query the threshold data store 235 for the thresholds 1908 corresponding to the entity IDs 1902 for the time period 1904.

However, in other examples, an alert 1812 may indicate that a phishing attack on an enterprise has been identified and resolved without providing any identification of relevant entities. In examples when one or more entity identifiers are readily identifiable, the retrieval sublogic 1900 queries the KPI data store 235 for time-series data sets within the time period 1904. In some instances, all time-series data sets are requested. However, in other instances, an alert 1812 may be categorized by the retrieval sublogic 1900 (e.g., based on a tag of the alert 1812 such as a data source or keyword included in text of the alert 1812), where the entity IDs corresponding to each category are predefined. The time-series data sets 1906 and thresholds 1908 retrieved by the retrieval sublogic 1900 are provided to the comparison sublogic 1910.

Figure 20:
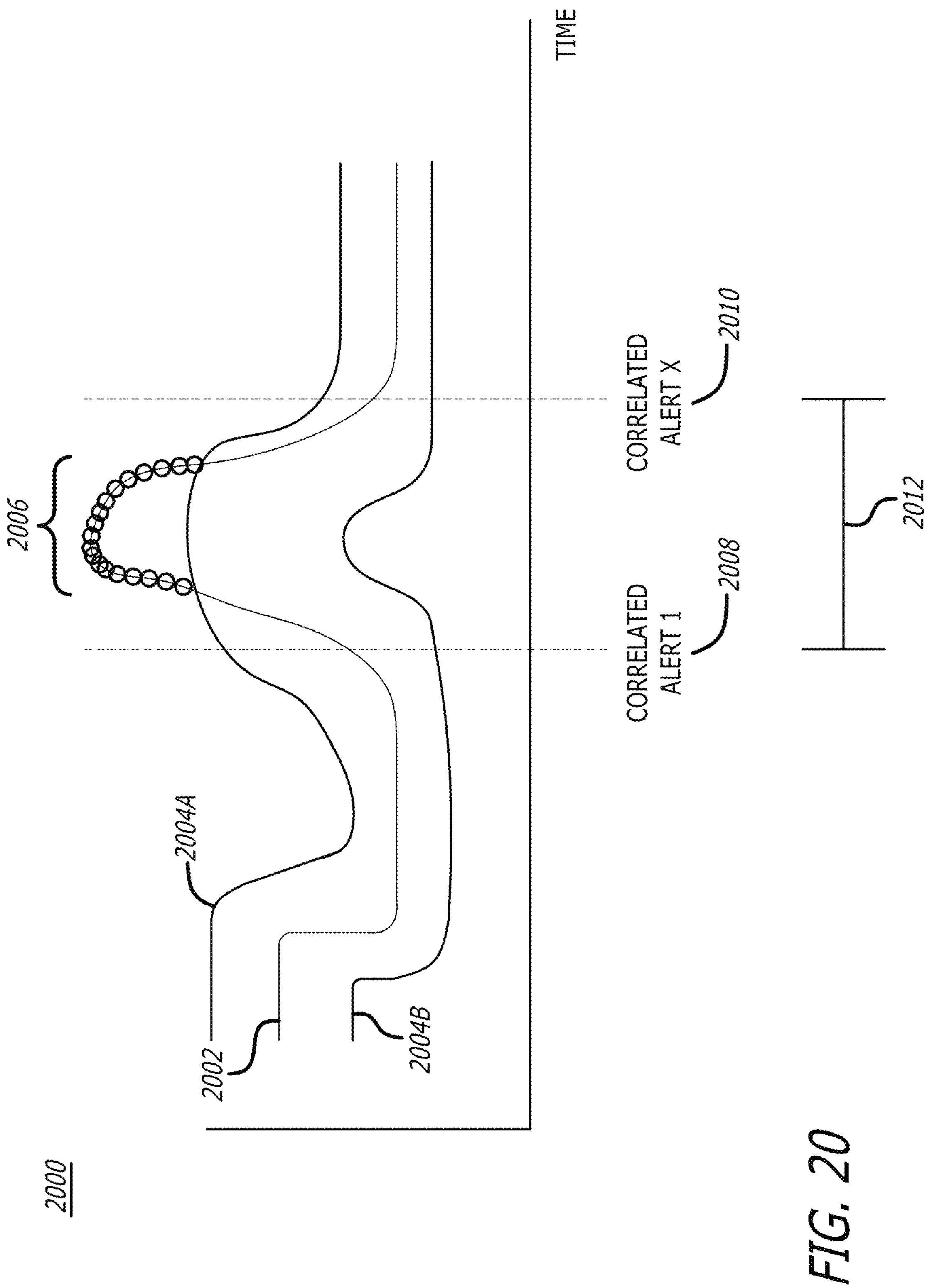
FIG. 20 illustrates an example times-series graph that includes a spike of data points outside of a normal threshold that corresponds to a series of alerts according to some examples.

The comparison sublogic 1910 is configured to receive the data retrieved by the retrieval sublogic 1900 and compare the time-series data set(s) 1906, the severity level thresholds 1908, and the alerts 1812 to identify whether the values of the time-series data set(s) 1906 are outside of a normal operating range immediately prior to, during, or immediately following the alert time period. With reference to FIG. 20, the comparison logic 1910 may determine whether a portion 2006 of the time-series data set 2002 exceeds a first severity level threshold 2004A, 2004B during the alert time period 2012, e.g., the time period between the first alert 2008 and the last alert 2010 that were correlated to the time-series data set 2002. The comparison sublogic 1910 may be configured to provide an indication to the remediation logic 1920 as to whether a portion of a time-series data set 1906 exceeded one or more severity level thresholds and identify the applicable time-series data set(s) 1906 and the relevant time periods 1908. In some instances, the comparison sublogic 1910 may not pass along indications that the values of a time-series data set remained within a normal operating range.

Further, the comparison sublogic 1910 may cause generation of or generate a correlation alert 1912. As an example, a correlation alert 1912 may be provided to the output generation component 160 of FIG. 1, which may get integrated into a UI/dashboard 163 or passed along as an alert 165. Such an alert 1912 may display the portion of a time-series data set 1906 that exceeded one or more severity level thresholds and identify the applicable time-series data set(s) 1906 and the relevant time periods 1908.

The remediation sublogic 1920 may be configured to receive results of comparisons performed by the comparison sublogic 1910, e.g., an indication as to a portion of a time-series data set 1906 that exceeded one or more severity level thresholds and identify the applicable time-series data set(s) 1906 and the relevant time periods 1908. In instances in which the comparison sublogic 1910 indicates that values of a time-series data set have exceeded a severity level threshold and moved outside of a normal operating range, the remediation sublogic 1920 determines what remediation action is to be taken or initiated. Examples of remediation actions as mentioned above include expanding or contracting thresholds resulting in remediated thresholds 1924, foregoing (silencing) or reducing the number of alerts for a period of time that correlates to the alerts 1812, excluding historical data from generation of adaptive thresholds in the future, or altering historical data (e.g., anomalous values correlating to the alerts) to avoid negative effects of the anomalous values on generation of adaptive thresholds in the future resulting in remediated metric data 1922.

In some examples, the remediated thresholds may include altering the multipliers utilized in determining the severity level thresholds discussed above. For example, if the alerts indicate an increase in network traffic (e.g., due to an expected increase in visitors to a website), the multipliers utilized in generating the thresholds for a metric or KPI pertaining to network traffic may be doubled when the network traffic doubles. Of course, other ratios may be utilized such as a 1.5:1 multiplier increase, a 3:1 multiplier increase, etc. Examples of remediating metric data 1922 may include replacing the anomalous values (e.g., see those in portion 2006 of FIG. 20) with alternative values such as values from a prior time-series during the corresponding time frame such as values from the prior day, or an average of the past week.

Referring now to FIG. 20, an example times-series graph that includes a spike of data points outside of a normal threshold that corresponds to a series of alerts is shown according to some examples. As discussed above, the graph 2000 of FIG. 20 illustrates a time-series data set 2002 along with upper and lower thresholds 2004A, 2004B, a portion 2006 of the time-series data set 2002 exceeds the upper threshold 2004A during an alert time period 2012, e.g., the time period between the first alert 2008 and the last alert 2010 that were correlated to the time-series data set 2002. In some instances, the graph 2000 may be provided to the user via the UI/dashboard 163 of FIG. 1.

Figure 21:
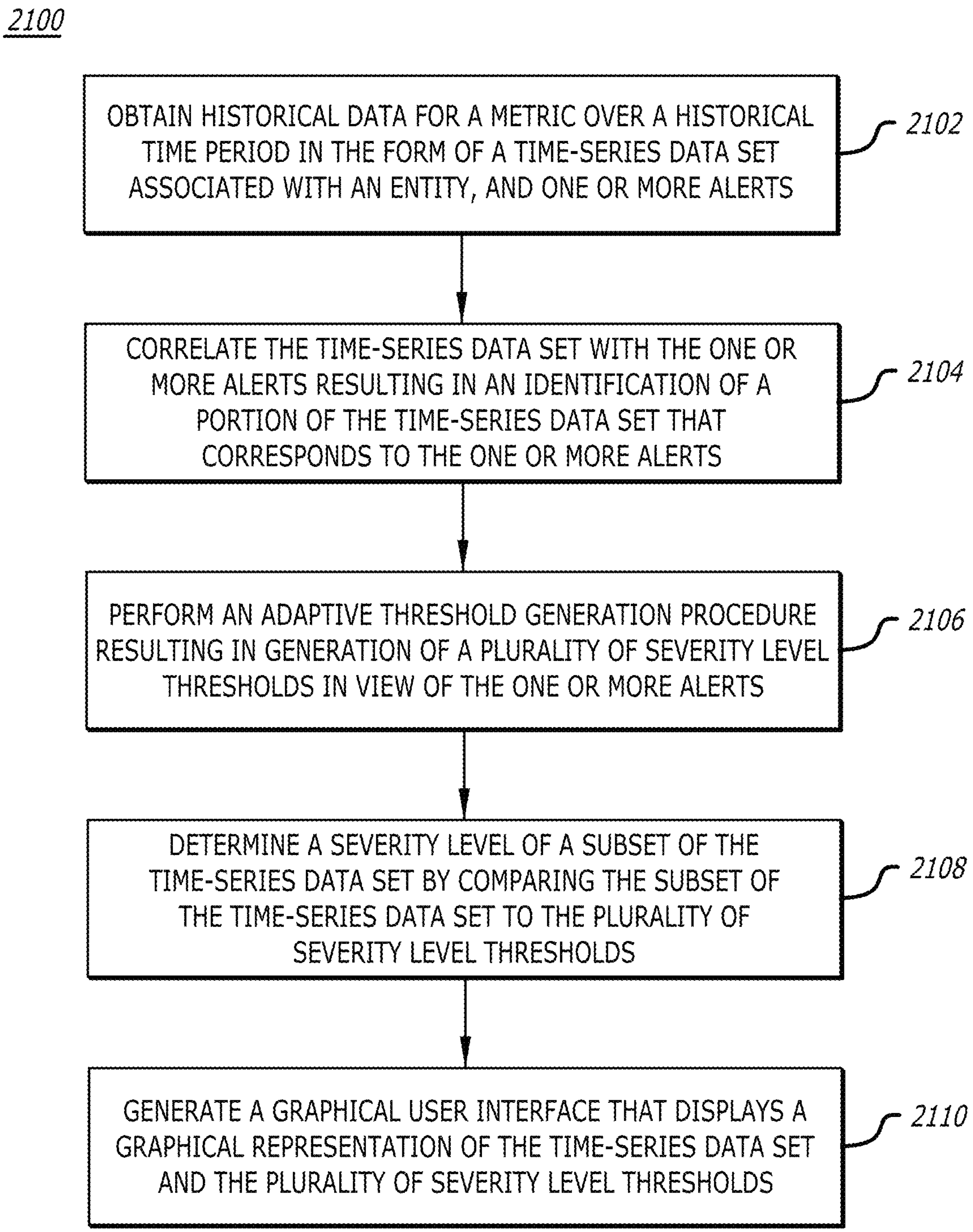
FIG. 21 is a flowchart illustrating example operations for performing [an alert correlation procedure prior to performing an adaptive threshold generation procedure according to an implementation of the disclosure.

Referring now to FIG. 21, a flowchart illustrating example operations for performing an alert correlation procedure prior to performing an adaptive threshold generation procedure is shown according to an implementation of the disclosure. The example process 2100 can be implemented, for example, by a computing device that comprises a processor and a non-transitory computer-readable medium. The non-transitory computer readable medium can be storing instructions that, when executed by the processor, can cause the processor to perform the operations of the illustrated process 2100. Alternatively or additionally, the process 2100 can be implemented using a non-transitory computer-readable medium storing instructions that, when executed by one or more processors, case the one or more processors to perform the operations of the process 2100 of FIG. 21.

Each block illustrated in FIG. 21 represents an operation in the process 2100 performed by, for example, the ITSI system 100 of FIG. 1. It should be understood that not every operation illustrated in FIG. 21 is required. In fact, certain operations may be optional to complete aspects of the process 2100. The discussion of the operations of process 2100 may be done so with reference to any of the previously described figures. The process 2100 begins with an operation of obtaining historical data for a metric over a historical time period in the form of a time-series data set associated with an entity, and one or more alerts (block 2102). The process 2100 continues with correlating the time-series data set with the one or more alerts resulting in an identification of a portion of the time-series data set that corresponds to the one or more alerts and performing an adaptive threshold generation procedure resulting in generation of a plurality of severity level thresholds in view of the one or more alerts (blocks 2104, 2106). A severity level of a subset of the time-series data set is determined by comparing the subset of the time-series data set to the plurality of severity level thresholds (block 2108). Finally, a graphical user interface is generated that displays a graphical representation of the time-series data set and the plurality of severity level thresholds (block 2110).

In some instances, the process 2100 further includes prior to obtaining the historical data, generating an initial graphical user interface configured to prompt a user to initiate the adaptive generation process, and initiating the adaptive generation process in response to receipt of the user input via the initial graphical user interface. In some examples, an additional operation of the process 2100 includes excluding the portion of the time-series data set that corresponds to the one or more alerts during the adaptive generation process.

In some examples, the adaptive threshold generation procedure includes operations of selecting a seasonality pattern from a plurality of candidate seasonality patterns based on partitioning the time-series data set into subsequences in accordance with each of the plurality of candidate seasonality patterns, clustering each set of subsequences, computing a silhouette score for each of the subsequences indicating a quality of the clustering, and selecting the seasonality pattern having a highest silhouette score, computing a mean and a standard deviation of values forming each of the subsequences of the time-series data set as partitioned in accordance with the selected seasonality pattern, and generating the plurality of severity level thresholds by multiplying the standard deviation of the values of the time-series data set by a multiplier.

In some instances, the adaptive generation procedure results in expanding a value of a first severity level threshold of the plurality of severity level thresholds relative to a value of a prior severity level threshold previously generated based on a prior time-series data set associated with the entity. The time-series data set may be an aggregated time-series data generated by aggregating a plurality of time-series data sets each corresponding to a distinct entity of a plurality of entities, wherein the plurality of entities includes the entity.

Entities that operate computing environments need information about their computing environments. For example, an entity may need to know the operating status of the various computing resources in the entity's computing environment, so that the entity can administer the environment, including performing configuration and maintenance, performing repairs or replacements, provisioning additional resources, removing unused resources, or addressing issues that may arise during operation of the computing environment, among other examples. As another example, an entity can use information about a computing environment to identify and remediate security issues that may endanger the data, users, and/or equipment in the computing environment. As another example, an entity may be operating a computing environment for some purpose (e.g., to run an online store, to operate a bank, to manage a municipal railway, etc.) and may want information about the computing environment that can aid the entity in understanding whether the computing environment is operating efficiently and for its intended purpose.

Collection and analysis of the data from a computing environment can be performed by a data intake and query system such as is described herein. A data intake and query system can ingest and store data obtained from the components in a computing environment, and can enable an entity to search, analyze, and visualize the data. Through these and other capabilities, the data intake and query system can enable an entity to use the data for administration of the computing environment, to detect security issues, to understand how the computing environment is performing or being used, and/or to perform other analytics.

FIG. 22 is a block diagram illustrating an example computing environment 2200 that includes a data intake and query system 2210. The data intake and query system 2210 obtains data from a data source 2202 in the computing environment 2200 and ingests the data using an indexing system 2220. A search system 2260 of the data intake and query system 2210 enables users to navigate the indexed data. Though drawn with separate boxes in FIG. 22, in some implementations the indexing system 2220 and the search system 2260 can have overlapping components. A computing device 2204, running a network access application 2206, can communicate with the data intake and query system 2210 through a user interface system 2214 of the data intake and query system 2210. Using the computing device 2204, a user can perform various operations with respect to the data intake and query system 2210, such as administration of the data intake and query system 2210, management and generation of "knowledge objects," (user-defined entities for enriching data, such as saved searches, event types, tags, field extractions, lookups, reports, alerts, data models, workflow actions, and fields), initiating of searches, and generation of reports, among other operations. The data intake and query system 2210 can further optionally include apps 2212 that extend the search, analytics, and/or visualization capabilities of the data intake and query system 2210.

The data intake and query system 2210 can be implemented using program code that can be executed using a computing device. A computing device is an electronic device that has a memory for storing program code instructions and a hardware processor for executing the instructions. The computing device can further include other physical components, such as a network interface or components for input and output. The program code for the data intake and query system 2210 can be stored on a non-transitory computer-readable medium, such as a magnetic or optical storage disk or a flash or solid-state memory, from which the program code can be loaded into the memory of the computing device for execution. "Non-transitory" means that the computer-readable medium can retain the program code while not under power, as opposed to volatile or "transitory" memory or media that requires power in order to retain data.

In various examples, the program code for the data intake and query system 2210 can be executed on a single computing device, or execution of the program code can be distributed over multiple computing devices. For example, the program code can include instructions for both indexing and search components (which may be part of the indexing system 2220 and/or the search system 2260, respectively), which can be executed on a computing device that also provides the data source 2202. As another example, the program code can be executed on one computing device, where execution of the program code provides both indexing and search components, while another copy of the program code executes on a second computing device that provides the data source 2202. As another example, the program code can be configured such that, when executed, the program code implements only an indexing component or only a search component. In this example, a first instance of the program code that is executing the indexing component and a second instance of the program code that is executing the search component can be executing on the same computing device or on different computing devices.

The data source 2202 of the computing environment 2200 is a component of a computing device that produces machine data. The component can be a hardware component (e.g., a microprocessor or a network adapter, among other examples) or a software component (e.g., a part of the operating system or an application, among other examples). The component can be a virtual component, such as a virtual machine, a virtual machine monitor (also referred as a hypervisor), a container, or a container orchestrator, among other examples. Examples of computing devices that can provide the data source 2202 include personal computers (e.g., laptops, desktop computers, etc.), handheld devices (e.g., smart phones, tablet computers, etc.), servers (e.g., network servers, compute servers, storage servers, domain name servers, web servers, etc.), network infrastructure devices (e.g., routers, switches, firewalls, etc.), and "Internet of Things" devices (e.g., vehicles, home appliances, factory equipment, etc.), among other examples. Machine data is electronically generated data that is output by the component of the computing device and reflects activity of the component. Such activity can include, for example, operation status, actions performed, metrics, communications with other components, or communications with users, among other examples. The component can produce machine data in an automated fashion (e.g., through the ordinary course of being powered on and/or executing) and/or as a result of user interaction with the computing device (e.g., through the user's use of input/output devices or applications). The machine data can be structured, semi-structured, and/or unstructured. The machine data may be referred to as raw machine data when the data is unaltered from the format in which the data was output by the component of the computing device. Examples of machine data include operating system logs, web server logs, live application logs, network feeds, metrics, change monitoring, message queues, and archive files, among other examples.

As discussed in greater detail below, the indexing system 2220 obtains machine date from the data source 2202 and processes and stores the data. Processing and storing of data may be referred to as "ingestion" of the data. Processing of the data can include parsing the data to identify individual events, where an event is a discrete portion of machine data that can be associated with a timestamp. Processing of the data can further include generating an index of the events, where the index is a data storage structure in which the events are stored. The indexing system 2220 does not require prior knowledge of the structure of incoming data (e.g., the indexing system 2220 does not need to be provided with a schema describing the data). Additionally, the indexing system 2220 retains a copy of the data as it was received by the indexing system 2220 such that the original data is always available for searching (e.g., no data is discarded, though, in some examples, the indexing system 2220 can be configured to do so).

The search system 2260 searches the data stored by the indexing 2220 system. As discussed in greater detail below, the search system 2260 enables users associated with the computing environment 2200 (and possibly also other users) to navigate the data, generate reports, and visualize search results in "dashboards" output using a graphical interface. Using the facilities of the search system 2260, users can obtain insights about the data, such as retrieving events from an index, calculating metrics, searching for specific conditions within a rolling time window, identifying patterns in the data, and predicting future trends, among other examples. To achieve greater efficiency, the search system 2260 can apply map-reduce methods to parallelize searching of large volumes of data. Additionally, because the original data is available, the search system 2260 can apply a schema to the data at search time. This allows different structures to be applied to the same data, or for the structure to be modified if or when the content of the data changes. Application of a schema at search time may be referred to herein as a late-binding schema technique.

The user interface system 2214 provides mechanisms through which users associated with the computing environment 2200 (and possibly others) can interact with the data intake and query system 2210. These interactions can include configuration, administration, and management of the indexing system 2220, initiation and/or scheduling of queries that are to be processed by the search system 2260, receipt or reporting of search results, and/or visualization of search results. The user interface system 2214 can include, for example, facilities to provide a command line interface or a web-based interface.

Users can access the user interface system 2214 using a computing device 2204 that communicates with data intake and query system 2210, possibly over a network. A "user," in the context of the implementations and examples described herein, is a digital entity that is described by a set of information in a computing environment. The set of information can include, for example, a user identifier, a username, a password, a user account, a set of authentication credentials, a token, other data, and/or a combination of the preceding. Using the digital entity that is represented by a user, a person can interact with the computing environment 2200. For example, a person can log in as a particular user and, using the user's digital information, can access the data intake and query system 2210. A user can be associated with one or more people, meaning that one or more people may be able to use the same user's digital information. For example, an administrative user account may be used by multiple people who have been given access to the administrative user account. Alternatively or additionally, a user can be associated with another digital entity, such as a bot (e.g., a software program that can perform autonomous tasks). A user can also be associated with one or more entities. For example, a company can have associated with it a number of users. In this example, the company may control the users' digital information, including assignment of user identifiers, management of security credentials, control of which persons are associated with which users, and so on.

The computing device 2204 can provide a human-machine interface through which a person can have a digital presence in the computing environment 2200 in the form of a user. The computing device 2204 is an electronic device having one or more processors and a memory capable of storing instructions for execution by the one or more processors. The computing device 2204 can further include input/output (I/O) hardware and a network interface. Applications executed by the computing device 2204 can include a network access application 2206, such as a web browser, which can use a network interface of the client computing device 2204 to communicate, over a network, with the user interface system 2214 of the data intake and query system 2210. The user interface system 2214 can use the network access application 2206 to generate user interfaces that enable a user to interact with the data intake and query system 2210. A web browser is one example of a network access application. A shell tool can also be used as a network access application. In some examples, the data intake and query system 2210 is an application executing on the computing device 2206. In such examples, the network access application 2206 can access the user interface system 2214 without going over a network.

The data intake and query system 2210 can optionally include apps 2212. An app of the data intake and query system 2210 is a collection of configurations, knowledge objects (a user-defined entity that enriches the data in the data intake and query system 2210), views, and dashboards that may provide additional functionality, different techniques for searching the data, and/or additional insights into the data. The data intake and query system 2210 can execute multiple applications simultaneously. Example applications include an information technology service intelligence application, which can monitor and analyze the performance and behavior of the computing environment 2200, and an enterprise security application, which can include content and searches to assist security analysts in diagnosing and acting on anomalous or malicious behavior in the computing environment 2200.

Though FIG. 22 illustrates only one data source, in practical implementations, the computing environment 2200 contains many data sources spread across numerous computing devices. The computing devices may be controlled and operated by a single entity. For example, in an "on the premises" or "on-prem" implementation, the computing devices may physically and digitally be controlled by one entity, meaning that the computing devices are in physical locations that are owned and/or operated by the entity and are within a network domain that is controlled by the entity. In an entirely on-prem implementation of the computing environment 2200, the data intake and query system 2210 executes on an on-prem computing device and obtains machine data from on-prem data sources. An on-prem implementation can also be referred to as an "enterprise" network, though the term "on-prem" refers primarily to physical locality of a network and who controls that location while the term "enterprise" may be used to refer to the network of a single entity. As such, an enterprise network could include cloud components.

"Cloud" or "in the cloud" refers to a network model in which an entity operates network resources (e.g., processor capacity, network capacity, storage capacity, etc.), located for example in a data center, and makes those resources available to users and/or other entities over a network. A "private cloud" is a cloud implementation where the entity provides the network resources only to its own users. A "public cloud" is a cloud implementation where an entity operates network resources in order to provide them to users that are not associated with the entity and/or to other entities. In this implementation, the provider entity can, for example, allow a subscriber entity to pay for a subscription that enables users associated with subscriber entity to access a certain amount of the provider entity's cloud resources, possibly for a limited time. A subscriber entity of cloud resources can also be referred to as a tenant of the provider entity. Users associated with the subscriber entity access the cloud resources over a network, which may include the public Internet. In contrast to an on-prem implementation, a subscriber entity does not have physical control of the computing devices that are in the cloud and has digital access to resources provided by the computing devices only to the extent that such access is enabled by the provider entity.

In some implementations, the computing environment 2200 can include on-prem and cloud-based computing resources, or only cloud-based resources. For example, an entity may have on-prem computing devices and a private cloud. In this example, the entity operates the data intake and query system 2210 and can choose to execute the data intake and query system 2210 on an on-prem computing device or in the cloud. In another example, a provider entity operates the data intake and query system 2210 in a public cloud and provides the functionality of the data intake and query system 2210 as a service, for example under a Software-as-a-Service (SaaS) model, to entities that pay for the user of the service on a subscription basis. In this example, the provider entity can provision a separate tenant (or possibly multiple tenants) in the public cloud network for each subscriber entity, where each tenant executes a separate and distinct instance of the data intake and query system 2210. In some implementations, the entity providing the data intake and query system 2210 is itself subscribing to the cloud services of a cloud service provider. As an example, a first entity provides computing resources under a public cloud service model, a second entity subscribes to the cloud services of the first provider entity and uses the cloud computing resources to operate the data intake and query system 2210, and a third entity can subscribe to the services of the second provider entity in order to use the functionality of the data intake and query system 2210. In this example, the data sources are associated with the third entity, users accessing the data intake and query system 2210 are associated with the third entity, and the analytics and insights provided by the data intake and query system 2210 are for purposes of the third entity's operations.

Figure 23:
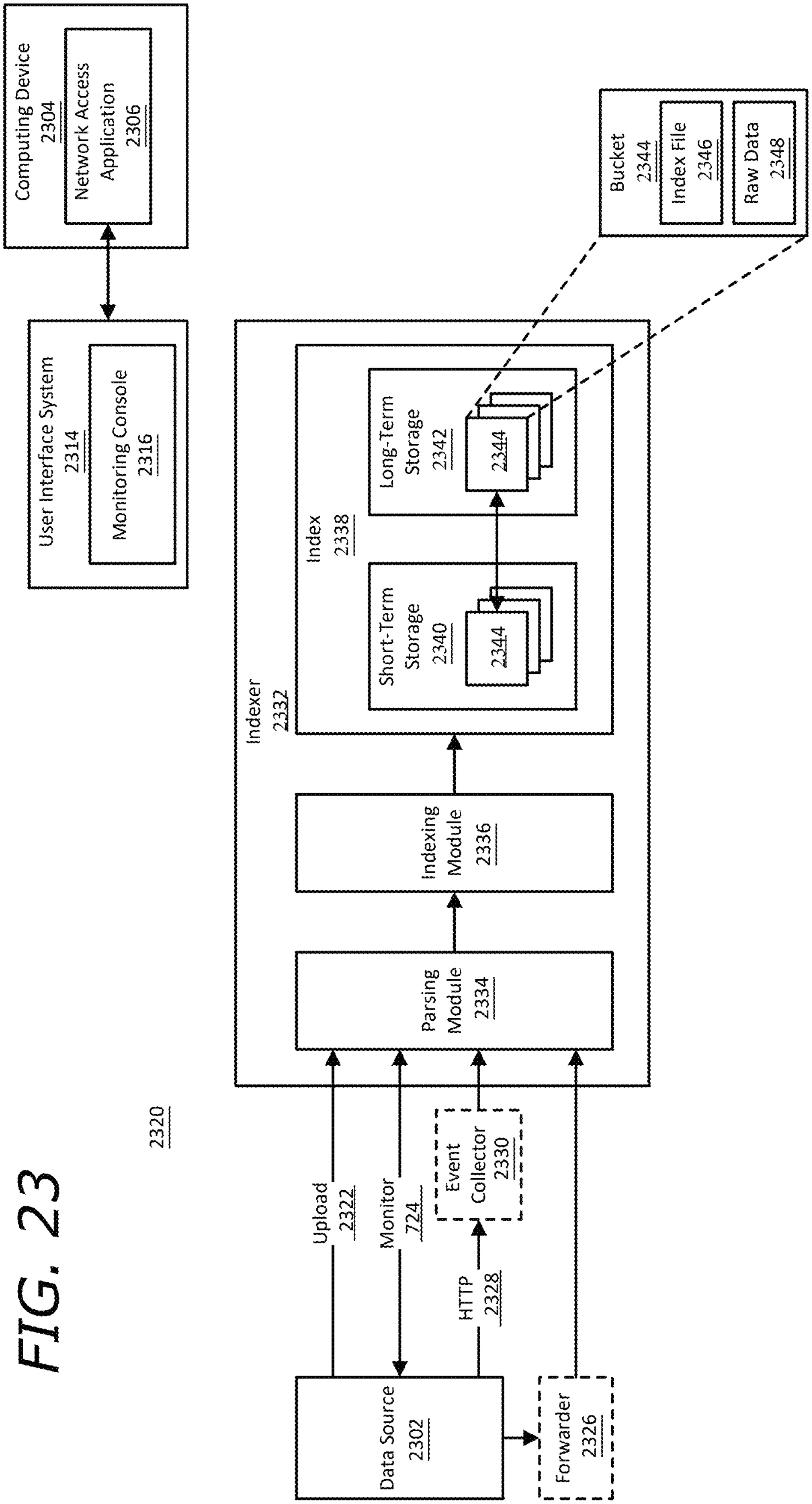
FIG. 23 is a block diagram illustrating in greater detail an example of an indexing system of a data intake and query system, such as the data intake and query system of FIG. 22 according to an implementation of the disclosure.

FIG. 23 is a block diagram illustrating in greater detail an example of an indexing system 2320 of a data intake and query system, such as the data intake and query system 2210 of FIG. 22. The indexing system 2320 of FIG. 23 uses various methods to obtain machine data from a data source 2302 and stores the data in an index 2338 of an indexer 2332. As discussed previously, a data source is a hardware, software, physical, and/or virtual component of a computing device that produces machine data in an automated fashion and/or as a result of user interaction. Examples of data sources include files and directories; network event logs; operating system logs, operational data, and performance monitoring data; metrics; first-in, first-out queues; scripted inputs; and modular inputs, among others. The indexing system 2320 enables the data intake and query system to obtain the machine data produced by the data source 2302 and to store the data for searching and retrieval.

Users can administer the operations of the indexing system 2320 using a computing device 2304 that can access the indexing system 2320 through a user interface system 2314 of the data intake and query system. For example, the computing device 2304 can be executing a network access application 2306, such as a web browser or a terminal, through which a user can access a monitoring console 2316 provided by the user interface system 2314. The monitoring console 2316 can enable operations such as: identifying the data source 2302 for data ingestion; configuring the indexer 2332 to index the data from the data source 2332; configuring a data ingestion method; configuring, deploying, and managing clusters of indexers; and viewing the topology and performance of a deployment of the data intake and query system, among other operations. The operations performed by the indexing system 2320 may be referred to as "index time" operations, which are distinct from "search time" operations that are discussed further below.

The indexer 2332, which may be referred to herein as a data indexing component, coordinates and performs most of the index time operations. The indexer 2332 can be implemented using program code that can be executed on a computing device. The program code for the indexer 2332 can be stored on a non-transitory computer-readable medium (e.g. a magnetic, optical, or solid state storage disk, a flash memory, or another type of non-transitory storage media), and from this medium can be loaded or copied to the memory of the computing device. One or more hardware processors of the computing device can read the program code from the memory and execute the program code in order to implement the operations of the indexer 2332. In some implementations, the indexer 2332 executes on the computing device 2304 through which a user can access the indexing system 2320. In some implementations, the indexer 2332 executes on a different computing device than the illustrated computing device 2304.

The indexer 2332 may be executing on the computing device that also provides the data source 2302 or may be executing on a different computing device. In implementations wherein the indexer 2332 is on the same computing device as the data source 2302, the data produced by the data source 2302 may be referred to as "local data." In other implementations the data source 2302 is a component of a first computing device and the indexer 2332 executes on a second computing device that is different from the first computing device. In these implementations, the data produced by the data source 2302 may be referred to as "remote data." In some implementations, the first computing device is "on-prem" and in some implementations the first computing device is "in the cloud." In some implementations, the indexer 2332 executes on a computing device in the cloud and the operations of the indexer 2332 are provided as a service to entities that subscribe to the services provided by the data intake and query system.

For a given data produced by the data source 2302, the indexing system 2320 can be configured to use one of several methods to ingest the data into the indexer 2332. These methods include upload 2322, monitor 2324, using a forwarder 2326, or using HyperText Transfer Protocol (HTTP 2328) and an event collector 2330. These and other methods for data ingestion may be referred to as "getting data in" (GDI) methods.

Using the upload 2322 method, a user can specify a file for uploading into the indexer 2332. For example, the monitoring console 2316 can include commands or an interface through which the user can specify where the file is located (e.g., on which computing device and/or in which directory of a file system) and the name of the file. The file may be located at the data source 2302 or maybe on the computing device where the indexer 2332 is executing. Once uploading is initiated, the indexer 2332 processes the file, as discussed further below. Uploading is a manual process and occurs when instigated by a user. For automated data ingestion, the other ingestion methods are used.

The monitor 2324 method enables the indexing system 2302 to monitor the data source 2302 and continuously or periodically obtain data produced by the data source 2302 for ingestion by the indexer 2332. For example, using the monitoring console 2316, a user can specify a file or directory for monitoring. In this example, the indexing system 2302 can execute a monitoring process that detects whenever the file or directory is modified and causes the file or directory contents to be sent to the indexer 2332. As another example, a user can specify a network port for monitoring. In this example, a monitoring process can capture data received at or transmitting from the network port and cause the data to be sent to the indexer 2332. In various examples, monitoring can also be configured for data sources such as operating system event logs, performance data generated by an operating system, operating system registries, operating system directory services, and other data sources.

Monitoring is available when the data source 2302 is local to the indexer 2332 (e.g., the data source 2302 is on the computing device where the indexer 2332 is executing). Other data ingestion methods, including forwarding and the event collector 2330, can be used for either local or remote data sources.

A forwarder 2326, which may be referred to herein as a data forwarding component, is a software process that sends data from the data source 2302 to the indexer 2332. The forwarder 2326 can be implemented using program code that can be executed on the computer device that provides the data source 2302. A user launches the program code for the forwarder 2326 on the computing device that provides the data source 2302. The user can further configure the forwarder 2326, for example to specify a receiver for the data being forwarded (e.g., one or more indexers, another forwarder, and/or another recipient system), to enable or disable data forwarding, and to specify a file, directory, network events, operating system data, or other data to forward, among other operations.

The forwarder 2326 can provide various capabilities. For example, the forwarder 2326 can send the data unprocessed or can perform minimal processing on the data before sending the data to the indexer 2332. Minimal processing can include, for example, adding metadata tags to the data to identify a source, source type, and/or host, among other information, dividing the data into blocks, and/or applying a timestamp to the data. In some implementations, the forwarder 2326 can break the data into individual events (event generation is discussed further below) and send the events to a receiver. Other operations that the forwarder 2326 may be configured to perform include buffering data, compressing data, and using secure protocols for sending the data, for example.

Forwarders can be configured in various topologies. For example, multiple forwarders can send data to the same indexer. As another example, a forwarder can be configured to filter and/or route events to specific receivers (e.g., different indexers), and/or discard events. As another example, a forwarder can be configured to send data to another forwarder, or to a receiver that is not an indexer or a forwarder (such as, for example, a log aggregator).

The event collector 2330 provides an alternate method for obtaining data from the data source 2302. The event collector 2330 enables data and application events to be sent to the indexer 2332 using HTTP 2328. The event collector 2330 can be implemented using program code that can be executing on a computing device. The program code may be a component of the data intake and query system or can be a standalone component that can be executed independently of the data intake and query system and operates in cooperation with the data intake and query system.

To use the event collector 2330, a user can, for example using the monitoring console 2316 or a similar interface provided by the user interface system 2314, enable the event collector 2330 and configure an authentication token. In this context, an authentication token is a piece of digital data generated by a computing device, such as a server, which contains information to identify a particular entity, such as a user or a computing device, to the server. The token will contain identification information for the entity (e.g., an alphanumeric string that is unique to each token) and a code that authenticates the entity with the server. The token can be used, for example, by the data source 2302 as an alternative method to using a username and password for authentication.

To send data to the event collector 2330, the data source 2302 is supplied with a token and can then send HTTP 2328 requests to the event collector 2330. To send HTTP 2328 requests, the data source 2302 can be configured to use an HTTP client and/or to use logging libraries such as those supplied by Java, JavaScript, and .NET libraries. An HTTP client enables the data source 2302 to send data to the event collector 2330 by supplying the data, and a Uniform Resource Identifier (URI) for the event collector 2330 to the HTTP client. The HTTP client then handles establishing a connection with the event collector 2330, transmitting a request containing the data, closing the connection, and receiving an acknowledgment if the event collector 2330 sends one. Logging libraries enable HTTP 2328 requests to the event collector 2330 to be generated directly by the data source. For example, an application can include or link a logging library, and through functionality provided by the logging library manage establishing a connection with the event collector 2330, transmitting a request, and receiving an acknowledgement.

An HTTP 2328 request to the event collector 2330 can contain a token, a channel identifier, event metadata, and/or event data. The token authenticates the request with the event collector 2330. The channel identifier, if available in the indexing system 2320, enables the event collector 2330 to segregate and keep separate data from different data sources. The event metadata can include one or more key-value pairs that describe the data source 2302 or the event data included in the request. For example, the event metadata can include key-value pairs specifying a timestamp, a hostname, a source, a source type, or an index where the event data should be indexed. The event data can be a structured data object, such as a JavaScript Object Notation (JSON) object, or raw text. The structured data object can include both event data and event metadata. Additionally, one request can include event data for one or more events.

In some implementations, the event collector 2330 extracts events from HTTP 2328 requests and sends the events to the indexer 2332. The event collector 2330 can further be configured to send events to one or more indexers. Extracting the events can include associating any metadata in a request with the event or events included in the request. In these implementations, event generation by the indexer 2332 (discussed further below) is bypassed, and the indexer 2332 moves the events directly to indexing. In some implementations, the event collector 2330 extracts event data from a request and outputs the event data to the indexer 2332, and the indexer generates events from the event data. In some implementations, the event collector 2330 sends an acknowledgement message to the data source 2302 to indicate that the event collector 2330 has received a particular request form the data source 2302, and/or to indicate to the data source 2302 that events in the request have been added to an index.

The indexer 2332 ingests incoming data and transforms the data into searchable knowledge in the form of events. In the data intake and query system, an event is a single piece of data that represents activity of the component represented in FIG. 23 by the data source 2302. An event can be, for example, a single record in a log file that records a single action performed by the component (e.g., a user login, a disk read, transmission of a network packet, etc.). An event includes one or more fields that together describe the action captured by the event, where a field is a key-value pair (also referred to as a name-value pair). In some cases, an event includes both the key and the value, and in some cases the event includes only the value, and the key can be inferred or assumed.

Transformation of data into events can include event generation and event indexing. Event generation includes identifying each discrete piece of data that represents one event and associating each event with a timestamp and possibly other information (which may be referred to herein as metadata). Event indexing includes storing of each event in the data structure of an index. As an example, the indexer 2332 can include a parsing module 2334 and an indexing module 2336 for generating and storing the events. The parsing module 2334 and indexing module 2336 can be modular and pipelined, such that one component can be operating on a first set of data while the second component is simultaneously operating on a second sent of data. Additionally, the indexer 2332 may at any time have multiple instances of the parsing module 2334 and indexing module 2336, with each set of instances configured to simultaneously operate on data from the same data source or from different data sources. The parsing module 2334 and indexing module 2336 are illustrated in FIG. 23 to facilitate discussion, with the understanding that implementations with other components are possible to achieve the same functionality.

The parsing module 2334 determines information about incoming event data, where the information can be used to identify events within the event data. For example, the parsing module 2334 can associate a source type with the event data. A source type identifies the data source 2302 and describes a possible data structure of event data produced by the data source 2302. For example, the source type can indicate which fields to expect in events generated at the data source 2302 and the keys for the values in the fields, and possibly other information such as sizes of fields, an order of the fields, a field separator, and so on. The source type of the data source 2302 can be specified when the data source 2302 is configured as a source of event data. Alternatively, the parsing module 2334 can determine the source type from the event data, for example from an event field in the event data or using machine learning techniques applied to the event data.

Other information that the parsing module 2334 can determine includes timestamps. In some cases, an event includes a timestamp as a field, and the timestamp indicates a point in time when the action represented by the event occurred or was recorded by the data source 2302 as event data. In these cases, the parsing module 2334 may be able to determine from the source type associated with the event data that the timestamps can be extracted from the events themselves. In some cases, an event does not include a timestamp and the parsing module 2334 determines a timestamp for the event, for example from a name associated with the event data from the data source 2302 (e.g., a file name when the event data is in the form of a file) or a time associated with the event data (e.g., a file modification time). As another example, when the parsing module 2334 is not able to determine a timestamp from the event data, the parsing module 2334 may use the time at which it is indexing the event data. As another example, the parsing module 2334 can use a user-configured rule to determine the timestamps to associate with events.

The parsing module 2334 can further determine event boundaries. In some cases, a single line (e.g., a sequence of characters ending with a line termination) in event data represents one event while in other cases, a single line represents multiple events. In yet other cases, one event may span multiple lines within the event data. The parsing module 2334 may be able to determine event boundaries from the source type associated with the event data, for example from a data structure indicated by the source type. In some implementations, a user can configure rules the parsing module 2334 can use to identify event boundaries.

The parsing module 2334 can further extract data from events and possibly also perform transformations on the events. For example, the parsing module 2334 can extract a set of fields (key-value pairs) for each event, such as a host or hostname, source or source name, and/or source type. The parsing module 2334 may extract certain fields by default or based on a user configuration. Alternatively or additionally, the parsing module 2334 may add fields to events, such as a source type or a user-configured field. As another example of a transformation, the parsing module 2334 can anonymize fields in events to mask sensitive information, such as social security numbers or account numbers. Anonymizing fields can include changing or replacing values of specific fields. The parsing component 2334 can further perform user-configured transformations.

The parsing module 2334 outputs the results of processing incoming event data to the indexing module 2336, which performs event segmentation and builds index data structures.

Event segmentation identifies searchable segments, which may alternatively be referred to as searchable terms or keywords, which can be used by the search system of the data intake and query system to search the event data. A searchable segment may be a part of a field in an event or an entire field. The indexer 2332 can be configured to identify searchable segments that are parts of fields, searchable segments that are entire fields, or both. The parsing module 2334 organizes the searchable segments into a lexicon or dictionary for the event data, with the lexicon including each searchable segment (e.g., the field "src=10.10.1.1") and a reference to the location of each occurrence of the searchable segment within the event data (e.g., the location within the event data of each occurrence of "src=10.10.1.1"). As discussed further below, the search system can use the lexicon, which is stored in an index file 2346, to find event data that matches a search query. In some implementations, segmentation can alternatively be performed by the forwarder 2326. Segmentation can also be disabled, in which case the indexer 2332 will not build a lexicon for the event data. When segmentation is disabled, the search system searches the event data directly.

Building index data structures generates the index 2338. The index 2338 is a storage data structure on a storage device (e.g., a disk drive or other physical device for storing digital data). The storage device may be a component of the computing device on which the indexer 2332 is operating (referred to herein as local storage) or may be a component of a different computing device (referred to herein as remote storage) that the indexer 2338 has access to over a network. The indexer 2332 can manage more than one index and can manage indexes of different types. For example, the indexer 2332 can manage event indexes, which impose minimal structure on stored data and can accommodate any type of data. As another example, the indexer 2332 can manage metrics indexes, which use a highly structured format to handle the higher volume and lower latency demands associated with metrics data.

The indexing module 2336 organizes files in the index 2338 in directories referred to as buckets. The files in a bucket 2344 can include raw data files, index files, and possibly also other metadata files. As used herein, "raw data" means data as when the data was produced by the data source 2302, without alteration to the format or content. As noted previously, the parsing component 2334 may add fields to event data and/or perform transformations on fields in the event data. Event data that has been altered in this way is referred to herein as enriched data. A raw data file 2348 can include enriched data, in addition to or instead of raw data. The raw data file 2348 may be compressed to reduce disk usage. An index file 2346, which may also be referred to herein as a "time-series index" or tsidx file, contains metadata that the indexer 2332 can use to search a corresponding raw data file 2348. As noted above, the metadata in the index file 2346 includes a lexicon of the event data, which associates each unique keyword in the event data with a reference to the location of event data within the raw data file 2348. The keyword data in the index file 2346 may also be referred to as an inverted index. In various implementations, the data intake and query system can use index files for other purposes, such as to store data summarizations that can be used to accelerate searches.

A bucket 2344 includes event data for a particular range of time. The indexing module 2336 arranges buckets in the index 2338 according to the age of the buckets, such that buckets for more recent ranges of time are stored in short-term storage 2340 and buckets for less recent ranges of time are stored in long-term storage 2342. Short-term storage 2340 may be faster to access while long-term storage 2342 may be slower to access. Buckets may be moves from short-term storage 2340 to long-term storage 2342 according to a configurable data retention policy, which can indicate at what point in time a bucket is old enough to be moved.

A bucket's location in short-term storage 2340 or long-term storage 2342 can also be indicated by the bucket's status. As an example, a bucket's status can be "hot," "warm," "cold," "frozen," or "thawed." In this example, hot bucket is one to which the indexer 2332 is writing data and the bucket becomes a warm bucket when the index 2332 stops writing data to it. In this example, both hot and warm buckets reside in short-term storage 2340. Continuing this example, when a warm bucket is moved to long-term storage 2342, the bucket becomes a cold bucket. A cold bucket can become a frozen bucket after a period of time, at which point the bucket may be deleted or archived. An archived bucket cannot be searched. When an archived bucket is retrieved for searching, the bucket becomes thawed and can then be searched.

The indexing system 2320 can include more than one indexer, where a group of indexers is referred to as an index cluster. The indexers in an index cluster may also be referred to as peer nodes. In an index cluster, the indexers are configured to replicate each other's data by copying buckets from one indexer to another. The number of copies of a bucket can be configured (e.g., three copies of each buckets must exist within the cluster), and indexers to which buckets are copied may be selected to optimize distribution of data across the cluster.

A user can view the performance of the indexing system 2320 through the monitoring console 2316 provided by the user interface system 2314. Using the monitoring console 2316, the user can configure and monitor an index cluster, and see information such as disk usage by an index, volume usage by an indexer, index and volume size over time, data age, statistics for bucket types, and bucket settings, among other information.

Figure 24:
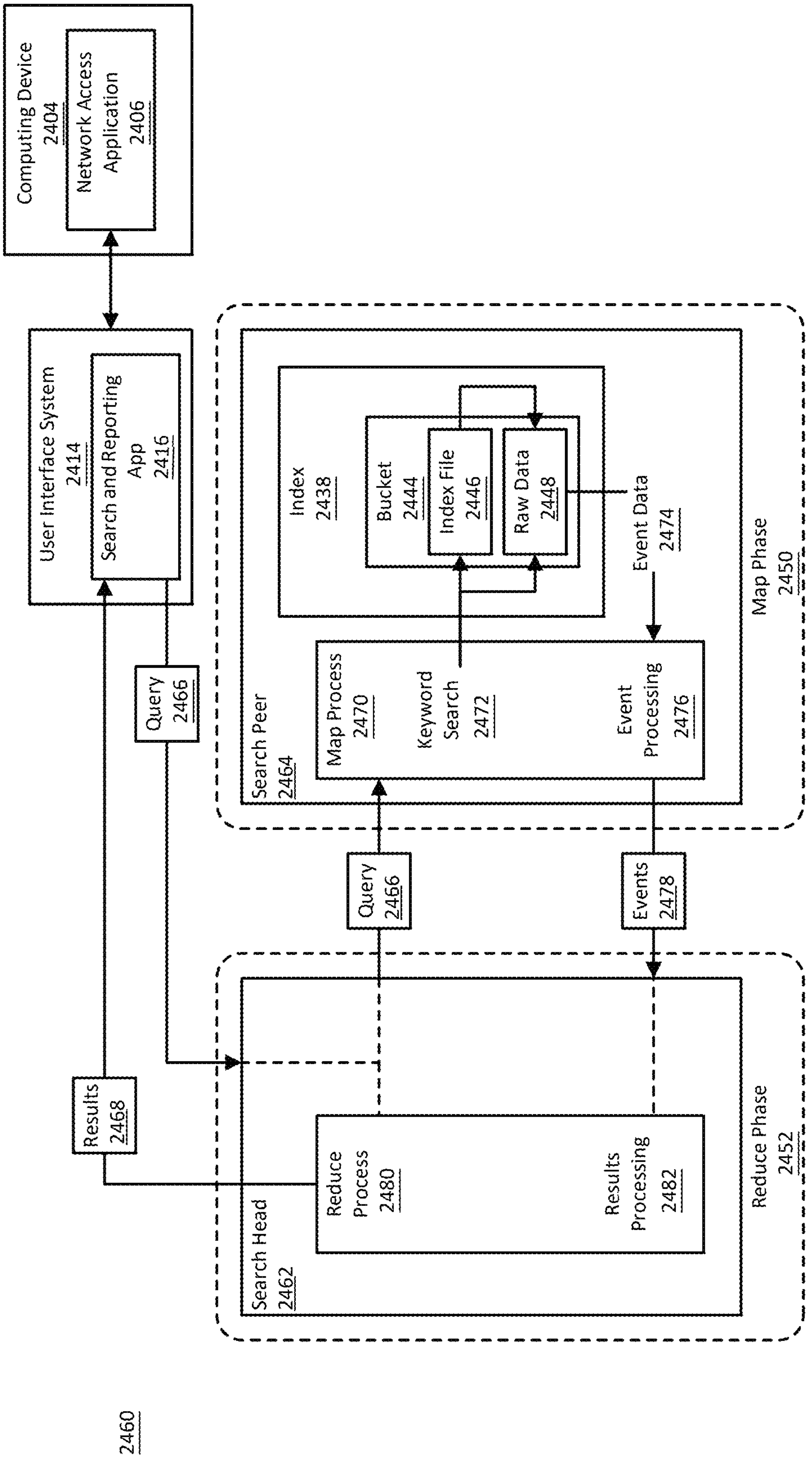
FIG. 24 is a block diagram illustrating in greater detail an example of the search system of a data intake and query system, such as the data intake and query system of FIG. 22 according to an implementation of the disclosure.

FIG. 24 is a block diagram illustrating in greater detail an example of the search system 2460 of a data intake and query system, such as the data intake and query system 2210 of FIG. 22. The search system 2460 of FIG. 24 issues a query 2466 to a search head 2462, which sends the query 2466 to a search peer 2464. Using a map process 2470, the search peer 2464 searches the appropriate index 2438 for events identified by the query 2466 and sends events 2478 so identified back to the search head 2462. Using a reduce process 2482, the search head 2462 processes the events 2478 and produces results 2468 to respond to the query 2466. The results 2468 can provide useful insights about the data stored in the index 2438. These insights can aid in the administration of information technology systems, in security analysis of information technology systems, and/or in analysis of the development environment provided by information technology systems.

The query 2466 that initiates a search is produced by a search and reporting app 2416 that is available through the user interface system 2414 of the data intake and query system. Using a network access application 2406 executing on a computing device 2404, a user can input the query 2466 into a search field provided by the search and reporting app 2416. Alternatively or additionally, the search and reporting app 2416 can include pre-configured queries or stored queries that can be activated by the user. In some cases, the search and reporting app 2416 initiates the query 2466 when the user enters the query 2466. In these cases, the query 2466 maybe referred to as an "ad-hoc" query. In some cases, the search and reporting app 2416 initiates the query 2466 based on a schedule. For example, the search and reporting app 2416 can be configured to execute the query 2466 once per hour, once per day, at a specific time, on a specific date, or at some other time that can be specified by a date, time, and/or frequency. These types of queries maybe referred to as scheduled queries.

The query 2466 is specified using a search processing language. The search processing language includes commands or search terms that the search peer 2464 will use to identify events to return in the search results 2468. The search processing language can further include commands for filtering events, extracting more information from events, evaluating fields in events, aggregating events, calculating statistics over events, organizing the results, and/or generating charts, graphs, or other visualizations, among other examples. Some search commands may have functions and arguments associated with them, which can, for example, specify how the commands operate on results and which fields to act upon. The search processing language may further include constructs that enable the query 2466 to include sequential commands, where a subsequent command may operate on the results of a prior command. As an example, sequential commands may be separated in the query 2466 by a vertical line ("|" or "pipe") symbol.

In addition to one or more search commands, the query 2466 includes a time indicator. The time indicator limits searching to events that have timestamps described by the indicator. For example, the time indicator can indicate a specific point in time (e.g., 10:00:00 am today), in which case only events that have the point in time for their timestamp will be searched. As another example, the time indicator can indicate a range of time (e.g., the last 24 hours), in which case only events whose timestamps fall within the range of time will be searched. The time indicator can alternatively indicate all of time, in which case all events will be searched.

Processing of the search query 2466 occurs in two broad phases: a map phase 2450 and a reduce phase 2452. The map phase 2450 takes place across one or more search peers. In the map phase 2450, the search peers locate event data that matches the search terms in the search query 2466 and sorts the event data into field-value pairs. When the map phase 2450 is complete, the search peers send events that they have found to one or more search heads for the reduce phase 2452. During the reduce phase 2452, the search heads process the events through commands in the search query 2466 and aggregate the events to produce the final search results 2468.

A search head, such as the search head 2462 illustrated in FIG. 24, is a component of the search system 2460 that manages searches. The search head 2462, which may also be referred to herein as a search management component, can be implemented using program code that can be executed on a computing device. The program code for the search head 2462 can be stored on a non-transitory computer-readable medium and from this medium can be loaded or copied to the memory of a computing device. One or more hardware processors of the computing device can read the program code from the memory and execute the program code in order to implement the operations of the search head 2462.

Upon receiving the search query 2466, the search head 2462 directs the query 2466 to one or more search peers, such as the search peer 2464 illustrated in FIG. 24. "Search peer" is an alternate name for "indexer" and a search peer may be largely similar to the indexer described previously. The search peer 2464 may be referred to as a "peer node" when the search peer 2464 is part of an indexer cluster. The search peer 2464, which may also be referred to as a search execution component, can be implemented using program code that can be executed on a computing device. In some implementations, one set of program code implements both the search head 2462 and the search peer 2464 such that the search head 2462 and the search peer 2464 form one component. In some implementations, the search head 2462 is an independent piece of code that performs searching and no indexing functionality. In these implementations, the search head 2462 may be referred to as a dedicated search head.

The search head 2462 may consider multiple criteria when determining whether to send the query 2466 to the particular search peer 2464. For example, the search system 2460 may be configured to include multiple search peers that each have duplicative copies of at least some of the event data and are implanted using different hardware resources q. In this example, the sending the search query 2466 to more than one search peer allows the search system 2460 to distribute the search workload across different hardware resources. As another example, search system 2460 may include different search peers for different purposes (e.g., one has an index storing a first type of data or from a first data source while a second has an index storing a second type of data or from a second data source). In this example, the search query 2466 may specify which indexes to search, and the search head 2462 will send the query 2466 to the search peers that have those indexes.

To identify events 2478 to send back to the search head 2462, the search peer 2464 performs a map process 2470 to obtain event data 2474 from the index 2438 that is maintained by the search peer 2464. During a first phase of the map process 2470, the search peer 2464 identifies buckets that have events that are described by the time indicator in the search query 2466. As noted above, a bucket contains events whose timestamps fall within a particular range of time. For each bucket 2444 whose events can be described by the time indicator, during a second phase of the map process 2470, the search peer 2464 performs a keyword search 2474 using search terms specified in the search query 2466. The search terms can be one or more of keywords, phrases, fields, Boolean expressions, and/or comparison expressions that in combination describe events being searched for. When segmentation is enabled at index time, the search peer 2464 performs the keyword search 2472 on the bucket's index file 2446. As noted previously, the index file 2446 includes a lexicon of the searchable terms in the events stored in the bucket's raw data 2448 file. The keyword search 2472 searches the lexicon for searchable terms that correspond to one or more of the search terms in the query 2466. As also noted above, the lexicon incudes, for each searchable term, a reference to each location in the raw data 2448 file where the searchable term can be found. Thus, when the keyword search identifies a searchable term in the index file 2446 that matches a search term in the query 2466, the search peer 2464 can use the location references to extract from the raw data 2448 file the event data 2474 for each event that include the searchable term.

In cases where segmentation was disabled at index time, the search peer 2464 performs the keyword search 2472 directly on the raw data 2448 file. To search the raw data 2448, the search peer 2464 may identify searchable segments in events in a similar manner as when the data was indexed. Thus, depending on how the search peer 2464 is configured, the search peer 2464 may look at event fields and/or parts of event fields to determine whether an event matches the query 2466. Any matching events can be added to the event data 2474 read from the raw data 2448 file. The search peer 2464 can further be configured to enable segmentation at search time, so that searching of the index 2438 causes the search peer 2464 to build a lexicon in the index file 2446.

The event data 2474 obtained from the raw data 2448 file includes the full text of each event found by the keyword search 2472. During a third phase of the map process 2470, the search peer 2464 performs event processing 2476 on the event data 2474, with the steps performed being determined by the configuration of the search peer 2464 and/or commands in the search query 2466. For example, the search peer 2464 can be configured to perform field discovery and field extraction. Field discovery is a process by which the search peer 2464 identifies and extracts key-value pairs from the events in the event data 2474. The search peer 2464 can, for example, be configured to automatically extract the first 100 fields (or another number of fields) in the event data 2474 that can be identified as key-value pairs. As another example, the search peer 2464 can extract any fields explicitly mentioned in the search query 2466. The search peer 2464 can, alternatively or additionally, be configured with particular field extractions to perform.

Other examples of steps that can be performed during event processing 2476 include: field aliasing (assigning an alternate name to a field); addition of fields from lookups (adding fields from an external source to events based on existing field values in the events); associating event types with events; source type renaming (changing the name of the source type associated with particular events); and tagging (adding one or more strings of text, or a "tags" to particular events), among other examples.

The search peer 2464 sends processed events 2478 to the search head 2462, which performs a reduce process 2480. The reduce process 2480 potentially receives events from multiple search peers and performs various results processing 2482 steps on the received events. The results processing 2482 steps can include, for example, aggregating the events received from different search peers into a single set of events, deduplicating and aggregating fields discovered by different search peers, counting the number of events found, and sorting the events by timestamp (e.g., newest first or oldest first), among other examples. Results processing 2482 can further include applying commands from the search query 2466 to the events. The query 2466 can include, for example, commands for evaluating and/or manipulating fields (e.g., to generate new fields from existing fields or parse fields that have more than one value). As another example, the query 2466 can include commands for calculating statistics over the events, such as counts of the occurrences of fields, or sums, averages, ranges, and so on, of field values. As another example, the query 2466 can include commands for generating statistical values for purposes of generating charts of graphs of the events.

The reduce process 2480 outputs the events found by the search query 2466, as well as information about the events. The search head 2462 transmits the events and the information about the events as search results 2468, which are received by the search and reporting app 2416. The search and reporting app 2416 can generate visual interfaces for viewing the search results 2468. The search and reporting app 2416 can, for example, output visual interfaces for the network access application 2406 running on a computing device 2404 to generate.

The visual interfaces can include various visualizations of the search results 2468, such as tables, line or area charts, Choropleth maps, or single values. The search and reporting app 2416 can organize the visualizations into a dashboard, where the dashboard includes a panel for each visualization. A dashboard can thus include, for example, a panel listing the raw event data for the events in the search results 2468, a panel listing fields extracted at index time and/or found through field discovery along with statistics for those fields, and/or a timeline chart indicating how many events occurred at specific points in time (as indicated by the timestamps associated with each event). In various implementations, the search and reporting app 2416 can provide one or more default dashboards. Alternatively or additionally, the search and reporting app 2416 can include functionality that enables a user to configure custom dashboards.

The search and reporting app 2416 can also enable further investigation into the events in the search results 2416. The process of further investigation may be referred to as drill-down. For example, a visualization in a dashboard can include interactive elements, which, when selected, provide options for finding out more about the data being displayed by the interactive elements. To find out more, an interactive element can, for example, generate a new search that includes some of the data being displayed by the interactive element, and thus may be more focused than the initial search query 2466. As another example, an interactive element can launch a different dashboard whose panels include more detailed information about the data that is displayed by the interactive element. Other examples of actions that can be performed by interactive elements in a dashboard include opening a link, playing an audio or video file, or launching another application, among other examples.

Figure 25:
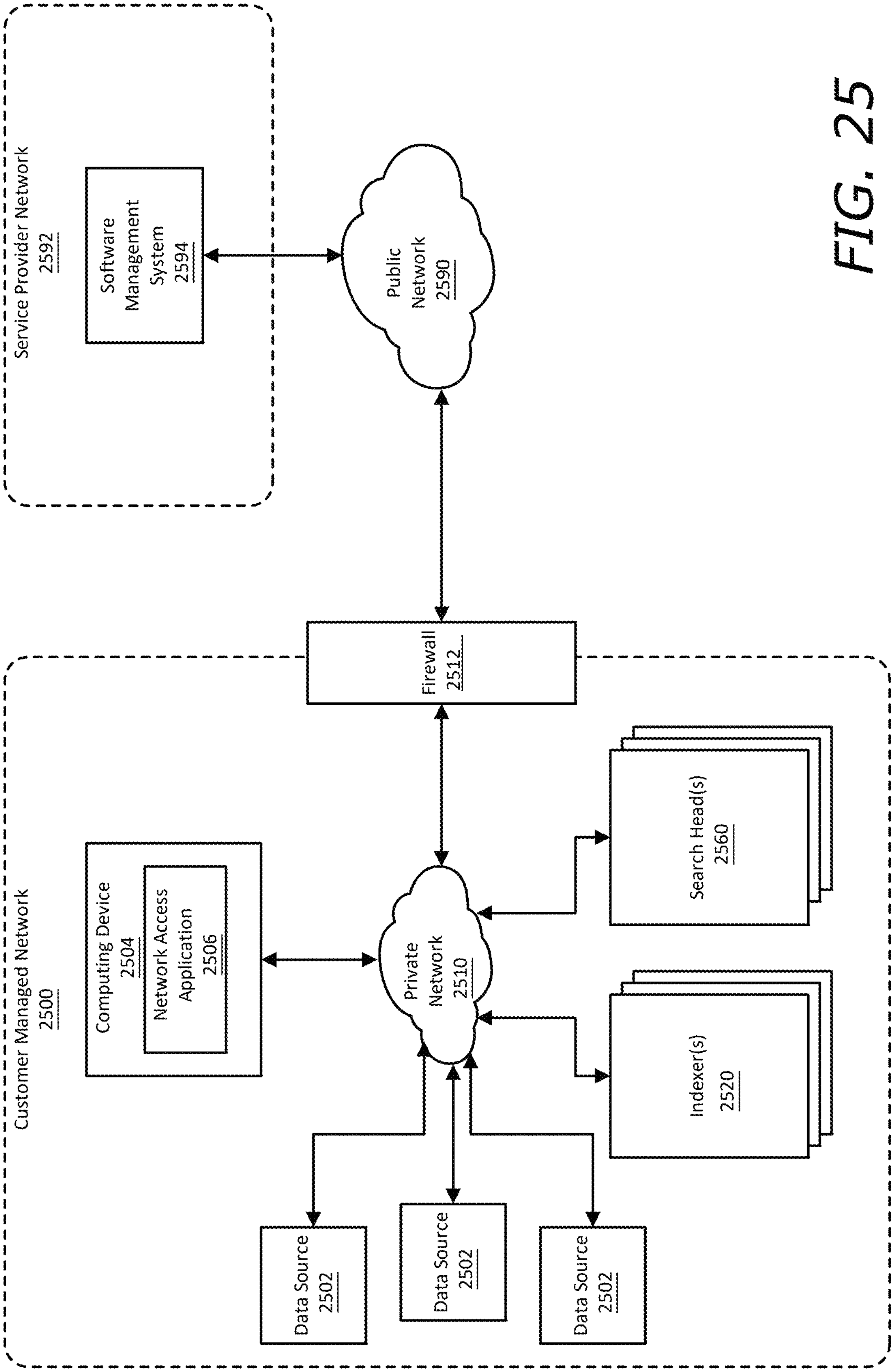
FIG. 25 illustrates an example of a self-managed network 2500 that includes a data intake and query system according to an implementation of the disclosure

FIG. 25 illustrates an example of a self-managed network 2500 that includes a data intake and query system. "Self-managed" in this instance means that the entity that is operating the self-managed network 2500 configures, administers, maintains, and/or operates the data intake and query system using its own compute resources and people. Further, the self-managed network 2500 of this example is part of the entity's on-premises network and comprises a set of compute, memory, and networking resources that are located, for example, within the confines of an entity's data center. These resources can include software and hardware resources. The entity can, for example, be a company or enterprise, a school, government entity, or other entity. Since the self-managed network 2500 is located within the customer's on-prem environment, such as in the entity's data center, the operation and management of the self-managed network 2500, including of the resources in the self-managed network 2500, is under the control of the entity. For example, administrative personnel of the entity have complete access to and control over the configuration, management, and security of the self-managed network 2500 and its resources.

The self-managed network 2500 can execute one or more instances of the data intake and query system. An instance of the data intake and query system may be executed by one or more computing devices that are part of the self-managed network 2500. A data intake and query system instance can comprise an indexing system and a search system, where the indexing system includes one or more indexers 2520 and the search system includes one or more search heads 2560.

As depicted in FIG. 25, the self-managed network 2500 can include one or more data sources 2502. Data received from these data sources may be processed by an instance of the data intake and query system within self-managed network 2500. The data sources 2502 and the data intake and query system instance can be communicatively coupled to each other via a private network 2510.

Users associated with the entity can interact with and avail themselves of the functions performed by a data intake and query system instance using computing devices. As depicted in FIG. 25, a computing device 2504 can execute a network access application 2506 (e.g., a web browser), that can communicate with the data intake and query system instance and with data sources 2502 via the private network 2510. Using the computing device 2504, a user can perform various operations with respect to the data intake and query system, such as management and administration of the data intake and query system, generation of knowledge objects, and other functions. Results generated from processing performed by the data intake and query system instance may be communicated to the computing device 2504 and output to the user via an output system (e.g., a screen) of the computing device 2504.

The self-managed network 2500 can also be connected to other networks that are outside the entity's on-premises environment/network, such as networks outside the entity's data center. Connectivity to these other external networks is controlled and regulated through one or more layers of security provided by the self-managed network 2500. One or more of these security layers can be implemented using firewalls 2512. The firewalls 2512 form a layer of security around the self-managed network 2500 and regulate the transmission of traffic from the self-managed network 2500 to the other networks and from these other networks to the self-managed network 2500.

Networks external to the self-managed network can include various types of networks including public networks 2590, other private networks, and/or cloud networks provided by one or more cloud service providers. An example of a public network 2590 is the Internet. In the example depicted in FIG. 25, the self-managed network 2500 is connected to a service provider network 2592 provided by a cloud service provider via the public network 2590.

In some implementations, resources provided by a cloud service provider may be used to facilitate the configuration and management of resources within the self-managed network 2500. For example, configuration and management of a data intake and query system instance in the self-managed network 2500 may be facilitated by a software management system 2594 operating in the service provider network 2592. There are various ways in which the software management system 2594 can facilitate the configuration and management of a data intake and query system instance within the self-managed network 2500. As one example, the software management system 2594 may facilitate the download of software including software updates for the data intake and query system. In this example, the software management system 2594 may store information indicative of the versions of the various data intake and query system instances present in the self-managed network 2500. When a software patch or upgrade is available for an instance, the software management system 2594 may inform the self-managed network 2500 of the patch or upgrade. This can be done via messages communicated from the software management system 2594 to the self-managed network 2500.

The software management system 2594 may also provide simplified ways for the patches and/or upgrades to be downloaded and applied to the self-managed network 2500. For example, a message communicated from the software management system 2594 to the self-managed network 2500 regarding a software upgrade may include a Uniform Resource Identifier (URI) that can be used by a system administrator of the self-managed network 2500 to download the upgrade to the self-managed network 2500. In this manner, management resources provided by a cloud service provider using the service provider network 2592 and which are located outside the self-managed network 2500 can be used to facilitate the configuration and management of one or more resources within the entity's on-prem environment. In some implementations, the download of the upgrades and patches may be automated, whereby the software management system 2594 is authorized to, upon determining that a patch is applicable to a data intake and query system instance inside the self-managed network 2500, automatically communicate the upgrade or patch to self-managed network 2500 and cause it to be installed within self-managed network 2500.

Various examples and possible implementations have been described above, which recite certain features and/or functions. Although these examples and implementations have been described in language specific to structural features and/or functions, it is understood that the subject matter defined in the appended claims is not necessarily limited to the specific features or functions described above. Rather, the specific features and functions described above are disclosed as examples of implementing the claims, and other equivalent features and acts are intended to be within the scope of the claims. Further, any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Processing of the various components of systems illustrated herein can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Examples have been described with reference to flow chart illustrations and/or block diagrams of methods, apparatus (systems), and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

What is claimed is:

1. A computerized method, comprising:

obtaining historical data for a metric including a time-series data set;

selecting a seasonality pattern for the time-series data set from a plurality of candidate seasonality patterns by computing a silhouette score for each of the plurality of candidate seasonality patterns in view of the time-series data set, wherein a selected seasonality pattern has a highest silhouette score;

partitioning the time-series data set into subsequences according to the selected seasonality patterns;

generating a plurality of severity level thresholds for each subsequence;

determining a severity level of a subset of the time-series data set by comparing the subset of the time-series data set to the plurality of severity level thresholds of one or more of the subsequences; and generating a graphical user interface that displays a graphical representation of the time-series data set and the plurality of severity level thresholds.

2. The computerized method of claim 1, wherein selecting the seasonality pattern for the time-series data includes, for each of the candidate seasonality patterns:

partitioning the time-series data set into subsequences according to a corresponding candidate seasonality pattern, clustering the subsequences, and computing the silhouette score representing a quality of the clustering of the subsequences.

3. The computerized method of claim 2, wherein the corresponding candidate seasonality pattern is a daily pattern, and the subsequences correspond to 24-hour blocks.

4. The computerized method of claim 2, wherein the corresponding candidate seasonality pattern is a weekly pattern, and the subsequences correspond to 7-day blocks.

5. The computerized method of claim 2, wherein the subset of the time-series data set corresponds to a most recent time period of a time span covered by the time-series data set.

6. The computerized method of claim 5, wherein the time span covered by the time-series data set is a 30-day period and the most recent time period is a most recent 24-hour block.

7. The computerized method of claim 1, wherein generating the plurality of severity level thresholds for each subsequence is performed based on one of a standard deviation, a quantile algorithm, or a range algorithm.

8. A computing device, comprising:

a processor; and a non-transitory computer-readable medium having stored thereon instructions that, when executed by the processor, cause the processor to perform operations including:

obtaining historical data for a metric including a time-series data set, selecting a seasonality pattern for the time-series data set from a plurality of candidate seasonality patterns by computing a silhouette score for each of the plurality of candidate seasonality patterns in view of the time-series data set, wherein a selected seasonality pattern has a highest silhouette score, partitioning the time-series data set into subsequences according to the selected seasonality pattern, generating a plurality of severity level thresholds for each subsequence, determining a severity level of a subset of the time-series data set by comparing the subset of the time-series data set to the plurality of severity level thresholds of one or more of the subsequences, and generating a graphical user interface that displays a graphical representation of the time-series data set and the plurality of severity level thresholds.

9. The computing device of claim 8, wherein selecting the seasonality pattern for the time-series data includes, for each of the candidate seasonality patterns:

partitioning the time-series data set into subsequences according to a corresponding candidate seasonality pattern, clustering the subsequences, and computing the silhouette score representing a quality of the clustering of the subsequences.

10. The computing device of claim 9, wherein the corresponding candidate seasonality pattern is a daily pattern, and the subsequences correspond to 24-hour blocks.

11. The computing device of claim 9, wherein the corresponding candidate seasonality pattern is a weekly pattern, and the subsequences correspond to 7-day blocks.

12. The computing device of claim 9, wherein the subset of the time-series data set corresponds to a most recent time period of a time span covered by the time-series data set.

13. The computing device of claim 12, wherein the time span covered by the time-series data set is a 30-day period and the most recent time period is a most recent 24-hour block.

14. The computing device of claim 8, wherein generating the plurality of severity level thresholds for each subsequence is performed based on one of a standard deviation, a quantile algorithm, or a range algorithm.

15. A non-transitory computer-readable medium having stored thereon instructions that, when executed by one or more processors, cause the one or more processor to perform operations including:

obtaining historical data for a metric including a time-series data set;

selecting a seasonality pattern for the time-series data set from a plurality of candidate seasonality patterns by computing a silhouette score for each of the plurality of candidate seasonality patterns in view of the time-series data set, wherein a selected seasonality pattern has a highest silhouette score;

partitioning the time-series data set into subsequences according to the selected seasonality pattern;

generating a plurality of severity level thresholds for each subsequence;

determining a severity level of a subset of the time-series data set by comparing the subset of the time-series data set to the plurality of severity level thresholds of one or more of the subsequences; and generating a graphical user interface that displays a graphical representation of the time-series data set and the plurality of severity level thresholds.

16. The non-transitory computer-readable medium of claim 15, wherein selecting the seasonality pattern for the time-series data includes, for each of the candidate seasonality patterns:

partitioning the time-series data set into subsequences according to a corresponding candidate seasonality pattern, clustering the subsequences, and computing the silhouette score representing a quality of the clustering of the subsequences.

17. The non-transitory computer-readable medium of claim 16, wherein the corresponding candidate seasonality pattern is a daily pattern, and the subsequences correspond to 24-hour blocks.

18. The non-transitory computer-readable medium of claim 16, wherein the corresponding candidate seasonality pattern is a weekly pattern, and the subsequences correspond to 7-day blocks.

19. The non-transitory computer-readable medium of claim 15, wherein the subset of the time-series data set corresponds to a most recent time period of a time span covered by the time-series data set.

20. The non-transitory computer-readable medium of claim 15, wherein generating the plurality of severity level thresholds for each subsequence is performed based on one of a standard deviation, a quantile algorithm, or a range algorithm.

* * * * *